United States Patent
Holtcamp et al.

(10) Patent No.: US 10,927,204 B2
(45) Date of Patent: Feb. 23, 2021

(54) IRON TRIDENTATE CARBENE SINGLE SITE CATALYSTS

(71) Applicant: ExxonMobil Chemical Patents Inc., Baytown, TX (US)

(72) Inventors: Matthew W. Holtcamp, Huffman, TX (US); Subramaniam Kuppuswamy, Mont Belvieu, TX (US); Matthew S. Bedoya, Humble, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 110 days.

(21) Appl. No.: 16/153,116

(22) Filed: Oct. 5, 2018

(65) Prior Publication Data
US 2019/0144577 A1     May 16, 2019

Related U.S. Application Data

(60) Provisional application No. 62/585,625, filed on Nov. 14, 2017.

(51) Int. Cl.
| | |
|---|---|
| *C08F 210/16* | (2006.01) |
| *C08F 4/70* | (2006.01) |
| *C07F 15/02* | (2006.01) |
| *C08F 2/02* | (2006.01) |

(52) U.S. Cl.
CPC ......... *C08F 210/16* (2013.01); *C07F 15/02* (2013.01); *C08F 4/7052* (2013.01); *C08F 2/02* (2013.01); *C08F 2800/20* (2013.01)

(58) Field of Classification Search
CPC .............................. C07F 15/02; C08F 4/7052
See application file for complete search history.

(56) References Cited

U.S. PATENT DOCUMENTS

| | | | |
|---|---|---|---|
| 7,666,959 B2 | 2/2010 | Razavi | |
| 8,252,875 B2 | 8/2012 | Mihan et al. | |

OTHER PUBLICATIONS

H. Z. Kaplan, B. Li, J. A. Byers, Organometallics, 2012, 31, 7343-7350.*
SciFinder Search (Jun. 5, 2020).*
Zhang, et al., "Tailoring iron complexes for ethylene oligomerization and/or polymerization," Dalton Transactions, 2013, vol. 42, No. 25, pp. 8988-8997.

(Continued)

*Primary Examiner* — Vu A Nguyen

(57) ABSTRACT

The present disclosure provides iron-containing catalyst compounds having a carbene ligand. Catalyst compounds of the present disclosure can be asymmetric, having an electron donating side of the catalyst and an electron deficient side of the catalyst. In some embodiments, catalysts of the present disclosure provide catalyst productivity values of 500 gPg-cat-1hr-1 or greater and polyolefins, such as polyethylene copolymers, having comonomer content of 8 wt % or greater, a g' vis value of 0.95 or greater, internal unsaturation content greater than 0.2 unsaturations per 1,000 carbons, broad orthogonal composition distribution, an Mn of 20,000 g/mol or greater, an Mw of 200,000 g/mol or greater, and an Mz/Mw from 2 to 5 or greater.

32 Claims, 1 Drawing Sheet

(56) References Cited

OTHER PUBLICATIONS

Boere et al., "Synthesis of some very bulky N,N'-disubstituted amidines and initial studies of their coordination chemistry," Journal of Chemical Society, Dalton. Transactions, 1998, No. 24, pp. 4147-4154.

Liu et al., "Elusive Free Bisimino-N-heterocyclic Carbene and Its Rearrangement by C—C Coupling. Characterization of Relevant Iridium(I) and Chromium(II) Complexes," Organometallics, 2013, vol. 32, No. 21, pp. 6286-6297.

Kaplan et al., "Synthesis and Characterization of a Bis(imino)-N-heterocyclic Carbene Analogue to Bis(imino)pyridine Iron Complexes," Organometalics, 2012, vol. 31, No. 21, pp. 7343-7350.

Radcliffe et al., "Phosphanyl Methanimine (PCN) Ligands for the Selective Trimerization/Tetramerization of Ethylene with Chromium," ACS Catalysis, 2015, vol. 5, vol. 12, pp. 7095-7098.

Small, "Discovery and Development of Pyridine-bis(imine) and Related Catalysts for Olefin Polymerization and Oligomerization," Accounts of Chemical Research, 2015, vol. 48, No. 9, pp. 2599-2611.

Schaefer et al., "Cationic Pyridine(diimine) Iron Tethered Alkene Complexes: Synthetic Models for Elusive Intermediates in Iron-Catalyzed Ethylene Polymerization," Bulletin of Japan Society of Coordination Chemistry, 2016, vol. 67, pp. 19-29.

Schaefer et al., "Synthesis and Electronic Structure of Iron Borate Betaine Complexes as a Route to Single-Component Iron Ethylene Oligomerization and Polymerization Catalysts," Organometallics, 2015, vol. 34, No. 23, pp. 5615-5623.

Baker et al., "Magnetic Circular Dichroism and Density Functional Theory Studies of Iron(II)-Pincer Complexes: Insight into Electronic Structure and Bonding Effects of Pincer N-Heterocyclic Carbene Moieties," Organometallics, 2016, vol. 35, No. 21, pp. 3692-3700.

Kaplan et al., "Electron-donating capabilities and evidence for redox activity in low oxidation state iron complexes bearing bis(amidine)pyrimidylidene ligands," Journal of Coordination Chemistry, 2016, vol. 69, No. 11-13, pp. 2047-2058.

Drake et al., "Spin transitions in bis(amidinato)-N-heterocyciic carbine iron(II) and iron(III) complexes," Dalton Transactions, 2015, vol. 44, No. 38, pp. 16703-16707.

Manna et al., "High molecular weight poly(lactic acid) produced by an efficient iron catalyst bearing a bis(amidinato)-N-heterocyclic carbine ligand," Polyhedron, 2014, vol. 84, pp. 160-167.

Thagfi et al., "Preparation and Reactivity Study of Chromium(III), Iron(II), and Cobalt(II) Complexes of 1,3-Bis(imino)benzimidazol-2-ylidene and 1,3-Bis(imino)pyrimidin-2-ylidene," Organometallics, 2012, vol. 31, No. 21, pp. 7351-7358.

Brown et al., "Ammonia Activation by a Nickel NCN-Pincer Complex featuring a Non-Innocent N-Keterocyclic Carbene: Ammine and Amido Complexes in Equilibrium," Angewandte, Communications, 2015, vol. 54, No. 21, pp. 6274-6277.

\* cited by examiner

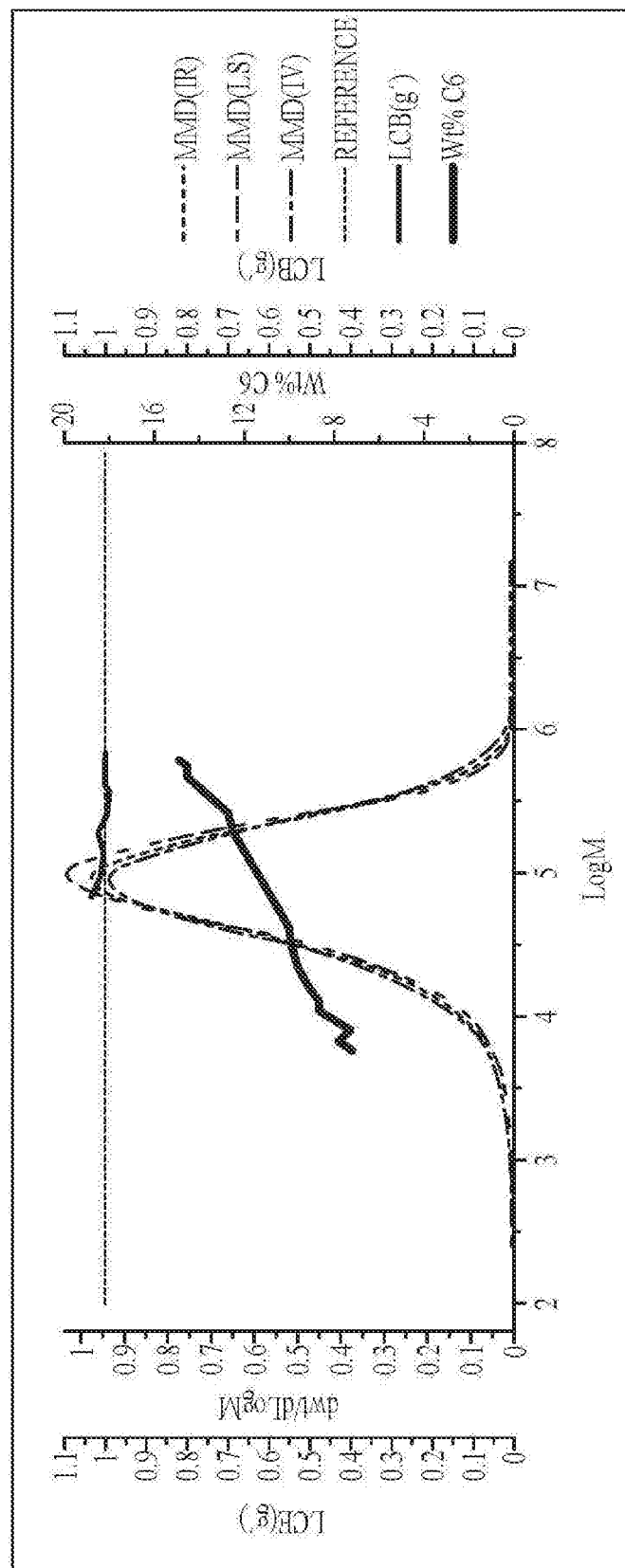

US 10,927,204 B2

IRON TRIDENTATE CARBENE SINGLE SITE CATALYSTS

PRIORITY CLAIM

This application claims priority to and the benefit of U.S. Ser. No. 62/585,625, filed Nov. 14, 2017 and is incorporated by reference in its entirety.

FIELD OF THE INVENTION

The present disclosure provides catalyst compounds comprising tridentate carbene transition metal complexes, production, and use thereof.

BACKGROUND OF THE INVENTION

Polyolefins are widely used commercially because of their robust physical properties. For example, various types of polyethylenes, including high density, low density, and linear low density polyethylenes, are some of the most commercially useful. Polyolefins are typically prepared with a catalyst that polymerizes olefin monomers. Therefore, there is interest in finding new catalysts and catalyst systems that provide polymers having improved properties.

Low density polyethylene is generally prepared at high pressure using free radical initiators, or in gas phase processes using Ziegler-Natta or vanadium catalysts. Low density polyethylene typically has a density in the range of 0.916 g/cm$^3$ to 0.950 g/cm$^3$. Typical low density polyethylene produced using free radical initiators is known in the industry as "LDPE". LDPE is also known as "branched" or "heterogeneously branched" polyethylene because of the relatively large number of long chain branches extending from the main polymer backbone. Polyethylene in the same density range, e.g., 0.916 g/cm$^3$ to 0.940 g/cm$^3$, which is linear and does not contain long chain branching, is known as "linear low density polyethylene" ("LLDPE") and is typically produced by conventional Ziegler-Natta catalysts or with metallocene catalysts. "Linear" means that the polyethylene has few, if any, long chain branches, typically referred to as a g'$_{vis}$ value of 0.97 or above, such as 0.98 or above. Polyethylenes having still greater density are the high density polyethylenes ("HDPEs"), e.g., polyethylenes having densities greater than 0.940 g/cm$^3$, and are generally prepared with Ziegler-Natta catalysts or chrome catalysts. Very low density polyethylenes ("VLDPEs") can be produced by a number of different processes yielding polyethylenes having a density less than 0.916 g/cm$^3$, typically 0.890 g/cm$^3$ to 0.915 g/cm$^3$ or 0.900 g/cm$^3$ to 0.915 g/cm$^3$.

Polyolefins, such as polyethylene, which have high molecular weight, generally have desirable mechanical properties over their lower molecular weight counterparts. However, high molecular weight polyolefins can be difficult to process and can be costly to produce. Polyolefin compositions having a bimodal molecular weight distribution are desirable because they can combine the advantageous mechanical properties of a high molecular weight fraction of the composition with the improved processing properties of a low molecular weight fraction of the composition. Unless otherwise indicated, as used herein, "high molecular weight" is defined as a number average molecular weight (Mn) value of 100,000 g/mol or more. "Low molecular weight" is defined as an Mn value of less than 100,000 g/mol.

Useful polyolefins, such as polyethylene, typically have a comonomer, such as hexene, incorporated into the polyethylene backbone. These copolymers provide varying physical properties compared to polyethylene alone and are typically produced in a low pressure reactor, utilizing, for example, solution, slurry, or gas phase polymerization processes. Polymerization may take place in the presence of catalyst systems such as those employing a Ziegler-Natta catalyst, a chromium based catalyst, or a metallocene catalyst. The comonomer content of a polyolefin (e.g., wt % of comonomer incorporated into a polyolefin backbone) influences the properties of the polyolefin (and composition of the copolymers) and is influenced by the polymerization catalyst. Unless otherwise indicated, as used herein, "low comonomer content" is defined as a polyolefin having less than 8 wt % of comonomer based upon the total weight of the polyolefin. As used herein, "high comonomer content" is defined as a polyolefin having greater than or equal to 8 wt % of comonomer based upon the total weight of the polyolefin.

A copolymer composition, such as a resin, has a composition distribution, which refers to the distribution of comonomer that forms short chain branches along the copolymer backbone. When the amount of short chain branches varies among the copolymer molecules, the composition is said to have a "broad" composition distribution. When the amount of comonomer per 1000 carbons is similar among the copolymer molecules of different chain lengths, the composition distribution is said to be "narrow".

Like comonomer content, the composition distribution influences the properties of a copolymer composition, for example, stiffness, toughness, environmental stress crack resistance, and heat sealing, among other properties. The composition distribution of a polyolefin composition may be readily measured by, for example, Temperature Rising Elution Fractionation (TREF) or Crystallization Analysis Fractionation (CRYSTAF).

Polyolefin compositions preferably have broad composition distributions that include a first polyolefin component having low molecular weight and low comonomer content while a second polyolefin component has a high molecular weight and high comonomer content. Compositions having this broad orthogonal composition distribution (BOCD) in which the comonomer is incorporated predominantly in the high molecular weight chains can provide improved physical properties, for example toughness properties and environmental stress crack resistance (ESCR).

Also, like comonomer content, a composition distribution of a copolymer composition is influenced by the identity of the catalyst used to form the polyolefins of the composition. Ziegler-Natta catalysts and chromium based catalysts generally produce compositions with broad composition distributions, whereas metallocene catalysts typically produce compositions with narrow composition distributions.

Nonetheless, polyolefin compositions formed by catalysts capable of forming high molecular weight polyolefins typically also have a broad molecular weight distribution (MWD), as indicated by high polydispersity indices, and/or the polyolefins are of such high molecular weight (e.g., Mw of 1,500,000) as to have processing difficulties due to hardness. Furthermore, catalysts capable of forming high molecular weight polyolefins typically have low activity (e.g., amount of desirable polymer produced per a period of time).

Iron-containing catalysts have been shown to be high activity catalysts capable of forming polyethylene. Typical iron-containing catalysts have a nitrogen atom of a heterocyclic moiety (such as pyridine) that chelates the iron atom. More specifically, iron-containing catalysts are typically tridentate in that they have a pyridyl ligand and two imine ligands that each chelate the iron atom. Chelation of a nitrogen atom of the pyridyl and imine ligands to the iron atom occurs via the lone pair of n-electrons on each of the nitrogen atoms. Such iron-containing catalysts, for example 2,6-bis(imino)pyridyliron(II) dihalide, typically provide low molecular weight polymers. (W. Zhang, et al., *Dalton Trans.*, 2013, 42, pp. 8988-8997; B. L. Small, *Acc. Chem. Res.*, 2015, 48, pp. 2599-2611). Other iron-containing catalysts include 2-[1-(2,6-dibenzhydryl-4-methylphenylimino)ethyl]-6-[1-(aryl-imino)-ethyl]pyridyl iron catalysts. Some of these catalysts have relatively high activity but produce low molecular weight polymers and don't incorporate linear alpha olefins with narrow molecular weight distribution. Other of these catalysts produce high molecular weight polymers with broad molecular weight distribution but have low activity. (Id.) Attempts to substitute the pyridyl moiety of the iron-containing catalysts with, for example, pyrrole (e.g., fluorene) or carbazole results in catalyst inactivity. (Id., at 8990.) In addition, substituting the pyridyl moiety of the iron-containing catalysts with diphenylamide or phosphinebisimine provides very low catalyst activity. (Id.) Furthermore, syntheses involving thiophene, triazine, bis(imino)diphenylether, or bis(imino)diphenylthioether (as a replacement for the pyridyl moiety) do not form iron complexes.

There is a need for iron-containing catalysts having high activity and capable of forming polyolefins, for example, with high molecular weight and high comonomer content.

References of interest include: B. L. Small, *Acc. Chem. Res.*, 2015, 48, pp. 2599-2611; W. Zhang, et al., *Dalton Trans.*, 2013, 42, pp. 8988-8997; U.S. Pat. Nos. 7,666,959; 8,252,875; and B. A. Schaefer, G. W. Margulieux, P. J. Chrik, *Bull. Jpn. Soc. Coord. Chem.*, 2016, 67, pp. 19-29; B. A. Schaefer, G. W. Margulieux, M. A. Tiedemann, B. L. Small, P. J. Chrik, *Organometallics*, 2015, 34, pp. 5615-5623.

SUMMARY OF THE INVENTION

The present disclosure provides catalyst compounds represented by Formula (I):

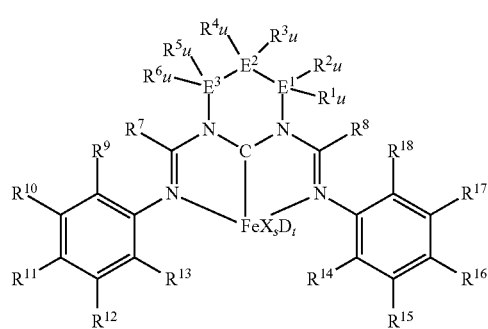

(I)

wherein:

each of $R^1$, $R^2$, $R^3$, $R^4$, $R^5$, $R^6$, $R^9$, $R^{10}$, $R^{11}$, $R^{12}$, $R^{13}$, $R^{14}$, $R^{15}$, $R^{16}$, $R^{17}$, and $R^{18}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, alkylaryl wherein alkyl has from 1 to 10 carbon atoms and aryl has from 6 to 20 carbon atoms, —NR'$_2$, —OR', halogen, —NO$_2$, —SiR"$_3$, or five-, six-, or seven-membered heterocyclyl comprising at least one atom selected from N, P, O, and S, wherein $R^1$, $R^2$, $R^3$, $R^4$, $R^5$, $R^6$, $R^9$, $R^{10}$, $R^{11}$, $R^{12}$, $R^{13}$, $R^{14}$, $R^{15}$, $R^{16}$, $R^{17}$, and $R^{18}$ are optionally substituted by halogen, —NO$_2$, —CF$_3$, —CF$_2$CF$_3$, —CH$_2$CF$_3$, —NR'$_2$, —OR', or —SiR"$_3$, wherein each R' is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —SiR"$_3$, wherein R' is optionally substituted by halogen, or two R' radicals optionally bond to form a five- or six-membered ring, wherein each R" is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or two R" radicals optionally bond to form a five- or six-membered ring;

each of $R^7$ and $R^8$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or five-, six- or seven-membered heterocyclyl comprising at least one atom selected from N, P, O, and S, wherein each of $R^7$ and $R^8$ is optionally substituted by halogen, —NR'$_2$, —OR' or —SiR"$_3$, wherein $R^7$ optionally bonds with $R^5$ or $R^6$, and $R^8$ optionally bonds with $R^1$ or $R^2$, in each case to independently form a five-, six-, or seven-membered ring;

each of $E^1$, $E^2$, and $E^3$ is independently carbon, nitrogen, or phosphorus;

u is 1 for $R^1u$ and $R^2u$ if $E^1$ is carbon, u is 1 for $R^3u$ and $R^4u$ if $E^2$ is carbon, and u is 1 for $R^5u$ and $R^6u$ if $E^3$ is carbon;

u is 0 for $R^2u$ and 1 for $R^1u$ if $E^1$ is nitrogen or phosphorus, u is 0 for $R^4u$ and 1 for $R^3u$ if $E^2$ is nitrogen or phosphorus, and u is 0 for $R^6u$ and 1 for $R^5u$ if $E^3$ is nitrogen or phosphorus;

each X is independently fluorine, chlorine, bromine, iodine, hydrogen, $C_1$-$C_{20}$-alkyl, $C_2$-$C_{10}$-alkenyl, $C_6$-$C_{20}$-aryl, arylalkyl wherein alkyl has from 1 to 10 carbon atoms and aryl has from 6 to 20 carbon atoms, —NR'''$_2$, —OR''', —SR''', —SO$_3$R''', —OC(O)R''', —CN, —SCN, β-diketonate, —CO, —BF$_4^-$, —PF$_6^-$ or bulky non-coordinating anions, or the radicals X are bonded with one another, wherein each R''' is independently hydrogen, $C_1$-$C_{20}$-alkyl, $C_2$-$C_{20}$-alkenyl, $C_6$-$C_{20}$-aryl, arylalkyl where alkyl has from 1 to 10 carbon atoms and aryl has from 6 to 20 carbon atoms, or —SiR''''$_3$, wherein R''' can be substituted by halogen or nitrogen- or oxygen-containing groups or two R''' radicals optionally bond to form a five- or six-membered ring, wherein each R'''' is independently hydrogen, $C_1$-$C_{20}$-alkyl, $C_2$-$C_{20}$-alkenyl, $C_6$-$C_{20}$-aryl or arylalkyl where alkyl has from 1 to 10 carbon atoms and aryl has from 6 to 20 carbon atoms, wherein R'''' can be substituted by halogen or nitrogen- or oxygen-containing groups or two R'''' radicals optionally bond to form a five- or six-membered ring;

s is 1, 2, or 3;

D is a neutral donor; and t is 0, 1, or 2.

In yet another embodiment, the present disclosure provides a catalyst system comprising an activator and a catalyst of the present disclosure.

In yet another embodiment, the present disclosure provides a catalyst system comprising an activator, a catalyst support, and a catalyst of the present disclosure.

In still another embodiment, the present disclosure provides a polymerization process comprising a) contacting one or more olefin monomers with a catalyst system comprising: i) an activator and ii) a catalyst of the present disclosure.

In still another embodiment, the present disclosure provides a polyolefin formed by a catalyst system and or method of the present disclosure.

BRIEF DESCRIPTION OF THE DRAWING

The FIGURE is a GPC spectrum of an ethylene hexene copolymer formed by a catalyst system, according to one embodiment.

DETAILED DESCRIPTION

Catalyst compounds of the present disclosure are iron-containing compounds having a carbene ligand. Catalyst compounds of the present disclosure are also asymmetric, having an electron donating side of the catalyst and an electron deficient side of the catalyst. In some embodiments, catalysts of the present disclosure provide catalyst productivity values of 500 gPgsupported cat$^{-1}$hr$^{-1}$ or greater and polyolefins, such as polyethylene copolymers, having comonomer content of 8 wt % or greater, a g' vis value of 0.95 or greater, internal unsaturation content greater than 0.2 unsaturations per 1,000 carbons, broad orthogonal composition distribution, an Mn of 10,000 g/mol or greater, an Mw of 100,000 g/mol or greater, and an Mz/Mw from 2 to 5 or greater.

The specification describes catalysts that can be transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which is believed to create a cation as a result of the removal of an anionic group, often referred to as a leaving group, from the transition metal.

As used herein, an "electron deficient side" or "electron withdrawing side" of a catalyst can be a portion of a catalyst that has one or more electron withdrawing groups (such as one, two, three, or more) such that the electron deficient side withdraws electron density toward it and away from an opposing, electron rich side of the catalyst.

As used herein, an "electron rich side" or "electron donating side" of a catalyst can be a portion of a catalyst that has one or more electron donating groups (such as one, two, three, or more) such that the electron rich side donates electron density toward an opposing, electron deficient side of the catalyst.

For the purposes of the present disclosure, the numbering scheme for the Periodic Table Groups is used as described in Chemical and Engineering News, 63(5), pg. 27 (1985). Therefore, a "Group 8 metal" is an element from Group 8 of the Periodic Table, e.g., Fe.

The following abbreviations are used through this specification: o-biphenyl is an ortho-biphenyl moiety represented by the structure

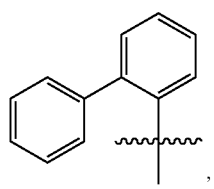 [SMILES: *c1ccccc1-c1ccccc1]

, dme is 1,2-dimethoxyethane, Me is methyl, Ph is phenyl, Et is ethyl, Pr is propyl, iPr is isopropyl, n-Pr is normal propyl, cPr is cyclopropyl, Bu is butyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, p-Me is para-methyl, Ph is phenyl, Bn is benzyl (i.e., CH$_2$Ph), THF (also referred to as thf) is tetrahydrofuran, RT is room temperature (and is 23° C. unless otherwise indicated), tol is toluene, EtOAc is ethyl acetate, and Cy is cyclohexyl.

The term "substituted" means that at least one hydrogen atom has been replaced with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a hydrocarbyl ring.

The terms "hydrocarbyl radical," "hydrocarbyl," "hydrocarbyl group," "alkyl radical," and "alkyl" are used interchangeably throughout this disclosure. Likewise, the terms "group," "radical," and "substituent" are also used interchangeably in this disclosure. For purposes of this disclosure, "hydrocarbyl radical" is defined to be C$_1$-C$_{100}$ radicals, that may be linear, branched, or cyclic, and when cyclic, aromatic or non-aromatic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least a non-hydrogen group, such as a hydrocarbyl group, a heteroatom, or a heteroatom containing group, such as halogen (such as Br, Cl, F, or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, or where at least one heteroatom has been inserted within a hydrocarbyl ring.

The term "alkenyl" means a straight-chain, branched-chain, or cyclic hydrocarbon radical having one or more carbon-carbon double bonds. These alkenyl radicals may be substituted. Examples of suitable alkenyl radicals can include ethenyl, propenyl, allyl, 1,4-butadienyl, cyclopropenyl, cyclobutenyl, cyclopentenyl, cyclohexenyl, cyclooctenyl, and the like including their substituted analogues.

The term "arylalkenyl" means an aryl group where a hydrogen has been replaced with an alkenyl or substituted alkenyl group. For example, styryl indenyl is an indene substituted with an arylalkenyl group (a styrene group).

The term "alkoxy," "alkoxyl," or "alkoxide" means an alkyl ether or aryl ether radical wherein the term alkyl is as defined above. Examples of suitable alkyl ether radicals can include methoxy, ethoxy, n-propoxy, iso-propoxy, n-butoxy, iso-butoxy, sec-butoxy, tert-butoxy, phenoxy, and the like.

The term "aryl" or "aryl group" means a carbon-containing aromatic ring and the substituted variants thereof can include phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

The term "arylalkyl" means an aryl group where a hydrogen has been replaced with an alkyl or substituted alkyl group. For example, 3,5'-di-tert-butyl-phenyl indenyl is an indene substituted with an arylalkyl group.

The term "alkylaryl" means an alkyl group where a hydrogen has been replaced with an aryl or substituted aryl group. For example, phenethyl indenyl is an indene substituted with an ethyl group bound to a benzene group.

Reference to an alkyl, alkenyl, alkoxide, or aryl group without specifying a particular isomer (e.g., butyl) expressly discloses all isomers (e.g., n-butyl, iso-butyl, sec-butyl, and tert-butyl), unless otherwise indicated.

The term "ring atom" means an atom that is part of a cyclic ring structure. Accordingly, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

For purposes of the present disclosure, a "catalyst system" is a combination of at least one catalyst compound, an activator, and an optional support material. The catalyst systems may further comprise one or more additional catalyst compounds. For the purposes of the present disclosure, when catalyst systems are described as comprising neutral stable forms of the components, it is well understood by one of ordinary skill in the art, that the ionic form of the component is the form that reacts with the monomers to produce polymers. Catalysts represented by Formula (I), Formula (II), and Formula (III) of the present disclosure are intended to embrace ionic (e.g., cationic) forms, alkyl migration products, and neutral radical anionic products (see B. A. Schaefer, G. W. Margulieux, P. J. Chrik, Bull. *Jpn. Soc. Coord. Chem.*, 2016, 67, 19-29; B. A. Schaefer, G. W. Margulieux, M. A. Tiedemann, B. L. Small, P. J. Chrik, *Organometallics*, 2015, 34, 5615-5623) thereof of the compounds in addition to the neutral forms of the compounds.

"Neutral radical anionic product" is a neutral complex containing a radical anion (e.g., a radical anion may reside on the ligand structure).

"Complex" as used herein, is also often referred to as catalyst precursor, precatalyst, catalyst, catalyst compound, transition metal compound, or transition metal complex. These words are used interchangeably. Activator and cocatalyst are also used interchangeably.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound.

Noncoordinating anion (NCA) means an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metalloids can include boron, aluminum, phosphorus, and silicon. The term noncoordinating anion activator includes neutral activators, ionic activators, and Lewis acid activators.

In the description herein, a catalyst may be described as a catalyst precursor, a pre-catalyst compound, catalyst compound or a transition metal compound, and these terms are used interchangeably. A polymerization catalyst system is a catalyst system that can polymerize monomers into polymer. An "anionic ligand" is a negatively charged ligand which donates one or more pairs of electrons to a metal ion. A "neutral donor ligand" is a neutrally charged ligand which donates one or more pairs of electrons to a metal ion.

A metallocene catalyst is defined as an organometallic compound with at least one π-bound cyclopentadienyl moiety or substituted cyclopentadienyl moiety (such as indene or fluorine, and substituted variants thereof) and more frequently two π-bound cyclopentadienyl moieties or substituted cyclopentadienyl moieties (such as indene or fluorine, and substituted variants thereof).

For purposes of the present disclosure, in relation to catalyst compounds, the term "substituted" means that a hydrogen group has been replaced with a hydrocarbyl group, a heteroatom, or a heteroatom containing group. For example, methyl phenyl is a phenyl group substituted with a methyl group.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$hr$^{-1}$. "Conversion" is the amount of monomer that is converted to polymer product, and is reported as mol % and is calculated based on the polymer yield and the amount of monomer fed into the reactor. "Catalyst activity" is a measure of the level of activity of the catalyst and is reported as the mass of product polymer (P) produced per mole (or mmol) of catalyst (cat) used (kgP/molcat or gP/mmolCat), and catalyst activity can also be expressed per unit of time, for example, per hour (hr).

For purposes herein an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have a "propylene" content of 35 wt % to 55 wt %, it is understood that the mer unit in the copolymer is derived from propylene in the polymerization reaction and the derived units are present at 35 wt % to 55 wt %, based upon the weight of the copolymer.

For purposes herein a "polymer" has two or more of the same or different monomer ("mer") units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, copolymer, as used herein, can include terpolymers and the like. An oligomer is typically a polymer having a low molecular weight, such an Mn of less than 25,000 g/mol, or less than 2,500 g/mol, or a low number of mer units, such as 75 mer units or less or 50 mer units or less. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn.

The term "continuous" means a system that operates without interruption or cessation for a period of time, preferably where reactants are continually fed into a reaction zone and products are continually or regularly withdrawn without stopping the reaction in the reaction zone. For example, a continuous process to produce a polymer would be one where the reactants are continually introduced into one or more reactors and polymer product is continually withdrawn.

A "solution polymerization" means a polymerization process in which the polymerization is conducted in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, *Ind. Eng. Chem. Res.*, 2000, 29, 4627.

A bulk polymerization means a polymerization process in which the monomers and/or comonomers being polymerized are used as a solvent or diluent using little or no other inert solvent or diluent. A small fraction of inert solvent might be used as a carrier for catalyst and scavenger. A bulk polymerization system contains less than about 25 wt % of inert solvent or diluent, such as less than about 10 wt %, such as less than about 1 wt %, such as 0 wt %.

Catalysts

In at least one embodiment, the present disclosure provides iron-containing catalysts having a carbene ligand. Catalysts of the present disclosure are also asymmetric, having electronically different substitutions on each side of the catalyst.

In at least one embodiment, the present disclosure provides a catalyst compound, and catalyst systems comprising such compounds, represented by formula (I):

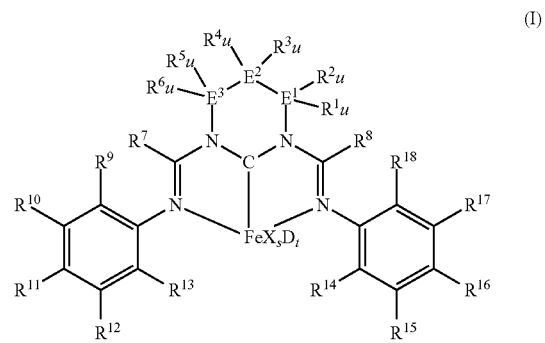

Each of $R^1$, $R^2$, $R^3$, $R^4$, $R^5$, $R^6$, $R^9$, $R^{10}$, $R^{11}$, $R^{12}$, $R^{13}$, $R^{14}$, $R^{15}$, $R^{16}$, $R^{17}$ and $R^{18}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, alkylaryl where alkyl has from 1 to 10 carbon atoms and aryl has from 6 to 20 carbon atoms, —$NR'_2$, —$OR'$, halogen, —$NO_2$, —$SiR''_3$ or five-, six-, or seven-membered heterocyclyl comprising at least one atom selected from N, P, O and S; wherein $R^1$, $R^2$, $R^3$, $R^4$, $R^5$, $R^6$, $R^9$, $R^{10}$, $R^{11}$, $R^{12}$, $R^{13}$, $R^{14}$, $R^{15}$, $R^{16}$, $R^{17}$, and $R^{18}$ are optionally substituted by halogen, —$CF_3$, —$CF_2CF_3$, —$CH_2CF_3$, —$NO_2$, —$NR'_2$, —$OR'$, or —$SiR''_3$.

Each R' is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —$SiR''_3$, wherein R' is optionally substituted by halogen, or two R' radicals optionally bond to form a five- or six-membered ring. Each R" is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two R" radicals optionally bond to form a five- or six-membered ring.

Each of $R^7$ and $R^8$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or five-, six-, or seven-membered heterocyclyl comprising at least one atom selected from N, P, O, and S; wherein each of $R^7$ and $R^8$ is optionally substituted by halogen, —$NR'_2$, —$OR'$, or —$SiR''_3$. $R^7$ optionally bonds with $R^5$ or $R^6$, and $R^8$ optionally bonds with $R^1$ or $R^2$, in each case to independently form a five-, six- or seven-membered ring.

Each of $E^1$, $E^2$, and $E^3$ is independently carbon, nitrogen, or phosphorus. u is 1 for $R^1u$ and $R^2u$ if $E^1$ is carbon, u is 1 for $R^3u$ and $R^4u$ if $E^2$ is carbon, and u is 1 for $R^5u$ and $R^6u$ if $E^3$ is carbon. u is 0 for $R^2u$ and 1 for $R^1u$ if $E^1$ is nitrogen or phosphorus, u is 0 for $R^4u$ and 1 for $R^3u$ if $E^2$ is nitrogen or phosphorus, and u is 0 for $R^6u$ and 1 for $R^5u$ if $E^3$ is nitrogen or phosphorus. In at least one embodiment, each of $E^1$, $E^2$, and $E^3$ is carbon, u is 1 for $R^1u$, $R^2u$, $R^3u$, $R^4u$, $R^5u$ and $R^6u$. Each of $R^1$, $R^2$, $R^3$, $R^4$, $R^5$, and $R^6$ can be independently hydrogen or $C_1$-$C_{22}$-alkyl. In at least one embodiment, each of $R^1$, $R^2$, $R^3$, $R^4$, $R^5$, and $R^6$ is hydrogen.

Each X is independently fluorine, chlorine, bromine, iodine, hydrogen, $C_1$-$C_{20}$-alkyl, $C_2$-$C_{10}$-alkenyl, $C_6$-$C_{20}$-aryl, arylalkyl where alkyl has from 1 to 10 carbon atoms and aryl has from 6 to 20 carbon atoms, —$NR'''_2$, —$OR'''$, —SR''', —SO$_3$R''', —OC(O)R''', —CN, —SCN, β-diketonate, —CO, —BF$_4^-$, —PF$_6^-$ or bulky non-coordinating anions, and the radicals X can be bonded with one another. In at least one embodiment, each X is independently fluorine, chlorine, bromine, iodine, or C$_1$-C$_{20}$-alkyl. In at least one embodiment, C$_1$-C$_{20}$-alkyl is selected from methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl.

Each R''' is independently hydrogen, C$_1$-C$_{20}$-alkyl, C$_2$-C$_{20}$-alkenyl, C$_6$-C$_{20}$-aryl, arylalkyl where alkyl has from 1 to 10 carbon atoms and aryl has from 6 to 20 carbon atoms, or —SiR''''$_3$, wherein R''' can be substituted by halogen or nitrogen- or oxygen-containing groups or two R''' radicals optionally bond to form a five- or six-membered ring. Each R'''' is independently hydrogen, C$_1$-C$_{20}$-alkyl, C$_2$-C$_{20}$-alkenyl, C$_6$-C$_{20}$-aryl or arylalkyl where alkyl has from 1 to 10 carbon atoms and aryl has from 6 to 20 carbon atoms, wherein R'''' can be substituted by halogen or nitrogen- or oxygen-containing groups or two R'''' radicals optionally bond to form a five- or six-membered ring.

s is 1, 2, or 3. D is a neutral donor, and t is 0, 1 or 2. Preferably, t is 0, in which case D is absent. In at least one embodiment, D is a neutral donor such as a neutral Lewis base or Lewis acid, such as, for example, amines, alcohols, ethers, ketones, aldehydes, esters, sulfides or phosphines, which can be bonded with the iron center or can still be contained in the complex as residual solvent from the preparation of the iron complexes.

Without being bound by theory, it is thought that the carbon atom (of the pyrimidine moiety) bonded to the iron atom is in the form of divalent carbon or a carbene with a lone pair of electrons that when bound to the iron atom is stabilized by the nitrogen atoms in the alpha positions relative to the carbon atom. σ-orbital electrons of the carbene carbon donate electron density to the metal center, unlike the weak σ-donation and π-acceptor character of pyridyl-iron complexes.

In at least one embodiment, the present disclosure provides a catalyst compound, and catalyst systems comprising such compounds, represented by formula (Ia):

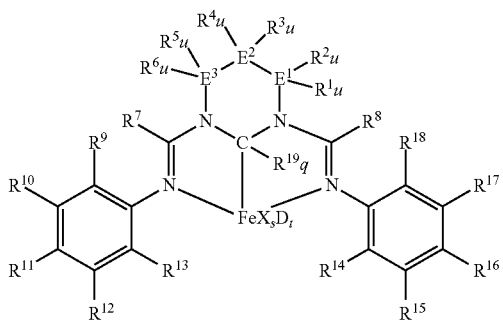

(Ia)

Each of R$^1$, R$^2$, R$^3$, R$^4$, R$^5$, R$^6$, R$^9$, R$^{10}$, R$^{11}$, R$^{12}$, R$^{13}$, R$^{14}$, R$^{15}$, R$^{16}$, R$^{17}$ and R$^{18}$ is independently hydrogen, C$_1$-C$_{22}$-alkyl, C$_2$-C$_{22}$-alkenyl, C$_6$-C$_{22}$-aryl, arylalkyl where alkyl has from 1 to 10 carbon atoms and aryl has from 6 to 20 carbon atoms, alkylaryl where alkyl has from 1 to 10 carbon atoms and aryl has from 6 to 20 carbon atoms, —NR'$_2$, —OR', halogen, —NO$_2$, —SiR''$_3$ or five-, six- or seven-membered heterocyclyl comprising at least one atom selected from N, P, O and S; wherein R$^1$, R$^2$, R$^3$, R$^4$, R$^5$, R$^6$, R$^9$, R$^{10}$, R$^{11}$, R$^{12}$, R$^{13}$, R$^{14}$, R$^{15}$, R$^{16}$, R$^{17}$ and R$^{18}$ are optionally substituted by halogen, —CF$_3$, —CF$_2$CF$_3$, —CH$_2$CF$_3$, —NO$_2$, —NR'$_2$, —OR' or —SiR''$_3$.

Each R' is independently hydrogen, C$_1$-C$_{22}$-alkyl, C$_2$-C$_{22}$-alkenyl, C$_6$-C$_{22}$-aryl, arylalkyl where alkyl has from 1 to 10 carbon atoms and aryl has from 6 to 20 carbon atoms, or —SiR''$_3$, wherein R' is optionally substituted by halogen, or two R' radicals optionally bond to form a five- or six-membered ring. Each R'' is independently hydrogen, C$_1$-C$_{22}$-alkyl, C$_2$-C$_{22}$-alkenyl, C$_6$-C$_{22}$-aryl, arylalkyl where alkyl has from 1 to 10 carbon atoms and aryl has from 6 to 20 carbon atoms, or two R'' radicals optionally bond to form a five- or six-membered ring.

R$^{19}$ is a C$_1$-C$_{20}$ alkyl. q is 1 or 0. If q is 1, R$^{19}$ is preferably methyl.

Each of R$^7$ and R$^8$ is independently hydrogen, C$_1$-C$_{22}$-alkyl, C$_2$-C$_{22}$-alkenyl, C$_6$-C$_{22}$-aryl, arylalkyl where alkyl has from 1 to 10 carbon atoms and aryl has from 6 to 20 carbon atoms, or five-, six-, or seven-membered heterocyclyl comprising at least one atom selected from N, P, O, and S; wherein each of R$^7$ and R$^8$ is optionally substituted by halogen, —NR'$_2$, —OR' or —SiR''$_3$. R$^7$ optionally bonds with R$^5$ or R$^6$, and R$^8$ optionally bonds with R$^1$ or R$^2$, in each case to independently form a five-, six- or seven-membered ring.

Each of E$^1$, E$^2$, and E$^3$ is independently carbon, nitrogen, or phosphorus. u is 1 for R$^1$u and R$^2$u if E$^1$ is carbon, u is 1 for R$^3$u and R$^4$u if E$^2$ is carbon, and u is 1 for R$^5$u and R$^6$u if E$^3$ is carbon. u is 0 for R$^2$u and 1 for R$^1$u if E$^1$ is nitrogen or phosphorus, u is 0 for R$^4$u and 1 for R$^3$u if E$^2$ is nitrogen or phosphorus, and u is 0 for R$^6$u and 1 for R$^5$u if E$^3$ is nitrogen or phosphorus. In at least one embodiment, each of E$^1$, E$^2$, and E$^3$ is carbon, u is 1 for R$^1$u, R$^2$u, R$^3$u, R$^4$u, R$^5$u and R$^6$u. Each of R$^1$, R$^2$, R$^3$, R$^4$, R$^5$, and R$^6$ can be independently hydrogen or C$_1$-C$_{22}$-alkyl. In at least one embodiment, each of R$^1$, R$^2$, R$^3$, R$^4$, R$^5$, and R$^6$ is hydrogen.

Each X is independently fluorine, chlorine, bromine, iodine, hydrogen, C$_1$-C$_{20}$-alkyl, C$_2$-C$_{10}$-alkenyl, C$_6$-C$_{20}$-aryl, arylalkyl where alkyl has from 1 to 10 carbon atoms and aryl has from 6 to 20 carbon atoms, —NR'''$_2$, —OR''', —SR''', —SO$_3$R''', —OC(O)R''', —CN, —SCN, β-diketonate, —CO, —BF$_4^-$, —PF$_6^-$ or bulky non-coordinating anions, and the radicals X can be bonded with one another. In at least one embodiment, each X is independently fluorine, chlorine, bromine, iodine, or C$_1$-C$_{20}$-alkyl. In at least one embodiment, C$_1$-C$_{20}$-alkyl is selected from methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl.

Each R''' is independently hydrogen, C$_1$-C$_{20}$-alkyl, C$_2$-C$_{20}$-alkenyl, C$_6$-C$_{20}$-aryl, arylalkyl where alkyl has from 1 to 10 carbon atoms and aryl has from 6 to 20 carbon atoms, or —SiR''''$_3$, wherein R''' can be substituted by halogen or nitrogen- or oxygen-containing groups or two R''' radicals optionally bond to form a five- or six-membered ring. Each R'''' is independently hydrogen, C$_1$-C$_{20}$-alkyl, C$_2$-C$_{20}$-alkenyl, C$_6$-C$_{20}$-aryl or arylalkyl where alkyl has from 1 to 10 carbon atoms and aryl has from 6 to 20 carbon atoms, wherein R'''' can be substituted by halogen or nitrogen- or oxygen-containing groups or two R'''' radicals optionally bond to form a five- or six-membered ring.

s is 1, 2, or 3. D is a neutral donor and t is 0, 1 or 2. Preferably, t is 0, in which case D is absent. In at least one embodiment, D is a neutral donor such as a neutral Lewis base or Lewis acid, such as, for example, amines, alcohols, ethers, ketones, aldehydes, esters, sulfides or phosphines, which can be bonded with the iron center or can still be contained in the complex as residual solvent from the preparation of the iron complexes.

In at least one embodiment, the catalyst represented by formula (I) or formula (Ia) has an electron donating side. Each of $R^9$, $R^{10}$, $R^{11}$, $R^{12}$, and $R^{13}$ can be independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, alkylaryl where alkyl has from 1 to 10 carbon atoms and aryl has from 6 to 20 carbon atoms, —NR'$_2$, —OR', —SiR"$_3$, or five-, six-, or seven-membered heterocyclyl comprising at least one atom selected from N, P, O, and S. Preferably, each of $R^9$, $R^{10}$, $R^{11}$, $R^{12}$, and $R^{13}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or alkylaryl where alkyl has from 1 to 10 carbon atoms and aryl has from 6 to 20 carbon atoms. $R^9$, $R^{10}$, $R^{11}$, $R^{12}$, and $R^{13}$ can be substituted by —NR'$_2$, —OR', or —SiR"$_3$.

Each R' is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —SiR"$_3$, wherein R' is optionally substituted by halogen, or two R' radicals optionally bond to form a five- or six-membered ring. Each R" is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two R" radicals optionally bond to form a five- or six-membered ring.

$R^7$ is hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or five-, six-, or seven-membered heterocyclyl comprising at least one atom selected from N, P, O, and S; wherein $R^7$ is optionally substituted by —NR'$_2$, —OR', or —SiR"$_3$. In at least one embodiment, $R^7$ is phenyl or $C_1$-$C_{10}$-alkyl (e.g., methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl). In at least one embodiment, $R^7$ is methyl.

In at least one embodiment, the catalyst represented by formula (I) or formula (Ia) has an electron withdrawing side. Each of $R^{14}$, $R^{15}$, $R^{16}$, $R^{17}$ and $R^{18}$ can be independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, alkylaryl where alkyl has from 1 to 10 carbon atoms and aryl has from 6 to 20 carbon atoms, —NR'$_2$, —OR', halogen, —NO$_2$, —SiR"$_3$, or five-, six-, or seven-membered heterocyclyl comprising at least one atom selected from N, P, O, and S. $R^{14}$, $R^{15}$, $R^{16}$, $R^{17}$, and $R^{18}$ can be independently substituted by —NO$_2$, —CF$_3$, —CF$_2$CF$_3$, —CH$_2$CF$_3$, halogen, —NR'$_2$, —OR', or —SiR"$_3$. Preferably, each of $R^{14}$, $R^{15}$, $R^{16}$, $R^{17}$, and $R^{18}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or alkylaryl where alkyl has from 1 to 10 carbon atoms and aryl has from 6 to 20 carbon atoms, where at least one of $R^{14}$, $R^{15}$, $R^{16}$, $R^{17}$, and $R^{18}$ is substituted by —NO$_2$, —CF$_3$, —CF$_2$CF$_3$, —CH$_2$CF$_3$, halogen, —NR'$_2$, —OR', or —SiR"$_3$ (where R' and R" are as defined above). In at least one embodiment, at least one of $R^{14}$, $R^{15}$, $R^{16}$, $R^{17}$, and $R^{18}$ is halogen or $C_1$-$C_{22}$-alkyl substituted with one or more halogen atoms. In at least one embodiment, each of $R^{14}$, $R^{15}$, $R^{16}$, $R^{17}$, and $R^{18}$ is halogen or trihalomethyl, such as trichloromethyl or trifluoromethyl.

$R^8$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, alkylaryl where alkyl has from 1 to 10 carbon atoms and aryl has from 6 to 20 carbon atoms, or five-, six- or seven-membered heterocyclyl comprising at least one atom selected from N, P, O, and S, wherein $R^8$ is optionally substituted by —NO$_2$, —CF$_3$, —CF$_2$CF$_3$, —CH$_2$CF$_3$, halogen, —NR'$_2$, —OR', or —SiR"$_3$ (where R' and R" are as defined above). In at least one embodiment, $R^8$ is $C_6$-aryl substituted with one, two, three, four, or five halogen atoms, such as fluorine or chlorine. In at least one embodiment, $R^8$ is arylalkyl substituted with one, two, three, four, or five halogen atoms (the substitutions occurring on the aryl and or the alkyl of the arylalkyl). In at least one embodiment, $R^8$ is -Ph(X)$_n$, where each X is independently haloalkyl, such as trichloromethyl or trifluoromethyl, n is 1, 2, 3, 4, or 5, and Ph is phenyl.

In at least one embodiment, the present disclosure provides a catalyst compound, and catalyst systems comprising such compounds, represented by formula (II):

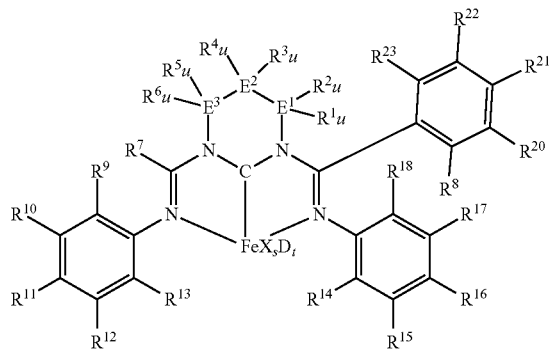

(II)

Each of $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{20}$, $R^{21}$, $R^{22}$, and $R^{23}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, alkylaryl where alkyl has from 1 to 10 carbon atoms and aryl has from 6 to 20 carbon atoms, —NR'$_2$, —OR', halogen, —NO$_2$, —SiR"$_3$ or five-, six-, or seven-membered heterocyclyl comprising at least one atom selected from N, P, O, and S; wherein $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{20}$, $R^{21}$, $R^{22}$, and $R^{23}$ are optionally substituted by halogen, —NO$_2$, —CF$_3$, —CF$_2$CF$_3$, —CH$_2$CF$_3$, —NR'$_2$, —OR', or —SiR"$_3$.

Each R' is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —SiR"$_3$, wherein R' is optionally substituted by halogen, or two R' radicals optionally bond to form a five- or six-membered ring. Each R" is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two R" radicals optionally bond to form a five- or six-membered ring.

$R^7$ is hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or five-, six-, or seven-membered heterocyclyl comprising at least one atom selected from N, P, O, and S; wherein $R^7$ is optionally substituted by halogen, $-NR'_2$, $-OR'$, or $-SiR''_3$. $R^7$ optionally bonds with $R^5$ or $R^6$ to independently form a five-, six-, or seven-membered ring.

Each of $E^1$, $E^2$, and $E^3$ is independently carbon, nitrogen or phosphorus. u is 1 for $R^1u$ and $R^2u$ if $E^1$ is carbon, u is 1 for $R^3u$ and $R^4u$ if $E^2$ is carbon, and u is 1 for $R^5u$ and $R^6u$ if $E^3$ is carbon. u is 0 for $R^2u$ and 1 for $R^1u$ if $E^1$ is nitrogen or phosphorus, u is 0 for $R^4u$ and 1 for $R^3u$ if $E^2$ is nitrogen or phosphorus, and u is 0 for $R^6u$ and 1 for $R^5u$ if $E^3$ is nitrogen or phosphorus. In at least one embodiment, each of $E^1$, $E^2$, and $E^3$ is carbon, u is 1 for $R^1u$, $R^2u$, $R^3u$, $R^4u$, $R^5u$, and $R^6u$. Each of $R^1$, $R^2$, $R^3$, $R^4$, $R^5$, and $R^6$ can be independently hydrogen or $C_1$-$C_{22}$-alkyl. In at least one embodiment, each of $E^1$, $E^2$, and $E^3$ is carbon and each of $R^1$, $R^2$, $R^3$, $R^4$, $R^5$, and $R^6$ is hydrogen.

Each X is independently fluorine, chlorine, bromine, iodine, hydrogen, $C_1$-$C_{20}$-alkyl, $C_2$-$C_{10}$-alkenyl, $C_6$-$C_{20}$-aryl, arylalkyl where alkyl has from 1 to 10 carbon atoms and aryl has from 6 to 20 carbon atoms, $-NR'''_2$, $-OR'''$, $-SR'''$, $-SO_3R'''$, $-OC(O)R'''$, $-CN$, $-SCN$, β-diketonate, $-CO$, $-BF_4^-$, $-PF_6^-$, or bulky non-coordinating anions, and the radicals X can be bonded with one another. In at least one embodiment, each X is independently fluorine, chlorine, bromine, iodine, or $C_1$-$C_{20}$-alkyl. In at least one embodiment, $C_1$-$C_{20}$-alkyl is selected from methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl.

Each $R'''$ is independently hydrogen, $C_1$-$C_{20}$-alkyl, $C_2$-$C_{20}$-alkenyl, $C_6$-$C_{20}$-aryl, arylalkyl where alkyl has from 1 to 10 carbon atoms and aryl has from 6 to 20 carbon atoms, or $-SiR''''_3$, wherein $R'''$ can be substituted by halogen or nitrogen- or oxygen-containing groups or two $R'''$ radicals optionally bond to form a five- or six-membered ring. Each $R''''$ is independently hydrogen, $C_1$-$C_{20}$-alkyl, $C_2$-$C_{20}$-alkenyl, $C_6$-$C_{20}$-aryl or arylalkyl where alkyl has from 1 to 10 carbon atoms and aryl has from 6 to 20 carbon atoms, wherein $R''''$ can be substituted by halogen or nitrogen- or oxygen-containing groups or two $R''''$ radicals optionally bond to form a five- or six-membered ring.

s is 1, 2, or 3. D is a neutral donor and t is 0, 1, or 2. Preferably, t is 0, in which case D is absent.

In at least one embodiment, the catalyst represented by formula (II) has an electron donating side. Each of $R^9$, $R^1$, $R^{11}$, $R^{12}$, and $R^{13}$ can be independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, alkylaryl where alkyl has from 1 to 10 carbon atoms and aryl has from 6 to 20 carbon atoms, $-NR'_2$, $-OR'$, $-SiR'_3$, or five-, six-, or seven-membered heterocyclyl comprising at least one atom selected from N, P, O, and S. Preferably, each of $R^9$, $R^1$, $R^{11}$, $R^{12}$, and $R^{13}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or alkylaryl where alkyl has from 1 to 10 carbon atoms and aryl has from 6 to 20 carbon atoms. $R^9$, $R^{10}$, $R^{11}$, $R^{12}$, and $R^{13}$ can be substituted by $-NR'_2$, $-OR'$, or $-SiR''_3$.

Each $R'$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or $-SiR''_3$, wherein $R'$ is optionally substituted by halogen, or two $R'$ radicals optionally bond to form a five- or six-membered ring. Each $R''$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two $R''$ radicals optionally bond to form a five- or six-membered ring.

$R^7$ is hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or five-, six-, or seven-membered heterocyclyl comprising at least one atom selected from N, P, O, and S; wherein $R^7$ is optionally substituted by $-NR'_2$, $-OR'$, or $-SiR''_3$. In at least one embodiment, $R^7$ is substituted or unsubstituted phenyl or $C_1$-$C_{10}$-alkyl (e.g., methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl). In at least one embodiment, $R^7$ is methyl. In at least one embodiment, $R^7$ is substituted phenyl represented by the structure:

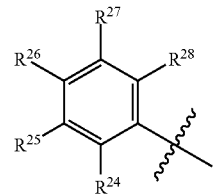

where each of $R^{24}$, $R^{25}$, $R^{26}$, $R^{27}$, and $R^{28}$ is independently hydrogen, $C_1$-$C_{10}$-alkyl, $-OR'$, where R' is hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or $-SiR''_3$, wherein R' is optionally substituted by halogen, or two R' radicals optionally bond to form a five- or six-membered ring. Each $R''$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two $R''$ radicals optionally bond to form a five- or six-membered ring.

In at least one embodiment, each of $R^{24}$, $R^{25}$, $R^{26}$, $R^{27}$, and $R^{28}$ is independently hydrogen or $C_1$-$C_{10}$-alkyl selected from methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl.

In at least one embodiment, the catalyst represented by formula (II) has an electron deficient side. Each of $R^8$, $R^{14}$, $R^{15}$, $R^{16}$, $R^{17}$, $R^{18}$, $R^{20}$, $R^{21}$, $R^{22}$, and $R^{23}$ can be independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, alkylaryl where alkyl has from 1 to 10 carbon atoms and aryl has from 6 to 20 carbon atoms, $-NR'_2$, $-OR'$, halogen, $-NO_2$, $-SiR''_3$, or five-, six-, or seven-membered heterocyclyl comprising at least one atom selected from N, P, O, and S. $R^8$, $R^{14}$, $R^{15}$, $R^{16}$, $R^{17}$, $R^{18}$, $R^{20}$, $R^{21}$, $R^{22}$, and $R^{23}$ can be independently substituted by $-NO_2$, $-CF_3$, $-CF_2CF_3$, $-CH_2CF_3$, halogen, $-NR'_2$, $-OR'$, or $-SiR''_3$ (where R' and R'' are as defined above). Preferably, each of $R^8$, $R^{14}$, $R^{15}$, $R^{16}$, $R^{17}$, $R^{18}$, $R^{20}$, $R^{21}$, $R^{22}$, and $R^{23}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or alkylaryl where alkyl has from 1 to 10 carbon atoms and aryl has from 6 to 20 carbon atoms, where at least one of $R^8$, $R^{14}$, $R^{15}$, $R^{16}$, $R^{17}$, $R^{18}$, $R^{20}$, $R^{21}$, $R^{22}$, and $R^{23}$ is substituted by —$NO_2$, halogen, —$NR'_2$, —OR', or —$SiR''_3$ (where R' and R'' are as defined above). In at least one embodiment, $R^8$, $R^{14}$, $R^{15}$, $R^{16}$, $R^{17}$, $R^{18}$, $R^{20}$, $R^{21}$, $R^{22}$, and $R^{23}$ is independently halogen, hydrogen, or $C_1$-$C_{22}$-alkyl substituted with one or more halogen atoms. In at least one embodiment, each of $R^8$, $R^{14}$, $R^{15}$, $R^{16}$, $R^{17}$, $R^{18}$, $R^{20}$, $R^{21}$, $R^{22}$, $R^{23}$ is hydrogen, $C_1$-$C_{10}$ alkyl, halogen or trihalomethyl, such as trichloromethyl or trifluoromethyl. In at least one embodiment, each of $R^8$, $R^{20}$, $R^{21}$, $R^{22}$, and $R^{23}$ is halogen or trihalomethyl, such as trichloromethyl or trifluoromethyl, and each of $R^{14}$, $R^{15}$, $R^{16}$, $R^{17}$, and $R^{18}$ is hydrogen, $C_1$-$C_{10}$ alkyl, or halogen. In at least one embodiment, at least one of $R^8$, $R^{20}$, $R^{21}$, $R^{22}$, and $R^{23}$ is halogen or trihalomethyl, such as trichloromethyl or trifluoromethyl, and at least one of $R^{14}$, $R^{15}$, $R^{16}$, $R^{17}$, and $R^{18}$ is $C_1$-$C_{10}$ alkyl or halogen.

In at least one embodiment, the present disclosure provides a catalyst compound, and catalyst systems comprising such compounds, represented by the formula (III):

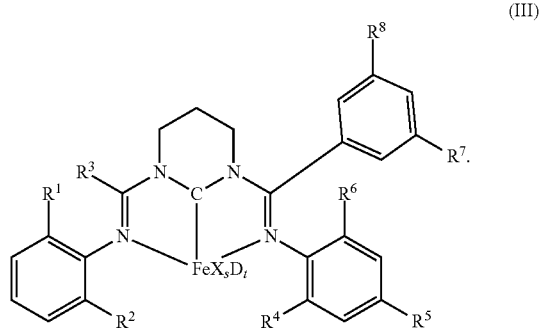

(III)

Each of $R^1$, $R^2$, $R^4$, $R^5$, $R^6$, $R^7$, and $R^8$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, alkylaryl where alkyl has from 1 to 10 carbon atoms and aryl has from 6 to 20 carbon atoms, —$NR'_2$, —OR', halogen, —$NO_2$, —$SiR''_3$, or five-, six-, or seven-membered heterocyclyl comprising at least one atom selected from N, P, O and S. $R^1$, $R^2$, $R^4$, $R^5$, $R^6$, $R^7$, and $R^8$ are optionally substituted by halogen, —$NO_2$, —$CF_3$, —$CF_2CF_3$, —$CH_2CF_3$, —$NR'_2$, —OR', or —$SiR''_3$.

Each R' is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —$SiR''_3$, wherein R' is optionally substituted by halogen, or two R' radicals optionally bond to form a five- or six-membered ring. Each R'' is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two R'' radicals optionally bond to form a five- or six-membered ring.

$R^3$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or five-, six-, or seven-membered heterocyclyl comprising at least one atom selected from N, P, O, and S. $R^3$ is optionally substituted by halogen, —$NR'_2$, —OR', or —$SiR''_3$. $R^3$ optionally bonds with the carbon at the 4-position (which can also be numbered as the 6-position) of the bisamino (carbene) ring to form a five-, six-, or seven-membered ring.

Each X is independently fluorine, chlorine, bromine, iodine, hydrogen, $C_1$-$C_{20}$-alkyl, $C_2$-$C_{10}$-alkenyl, $C_6$-$C_{20}$-aryl, arylalkyl where alkyl has from 1 to 10 carbon atoms and aryl has from 6 to 20 carbon atoms, —$NR'''_2$, —OR''', —SR''', —$SO_3R'''$, —OC(O)R''', —CN, —SCN, β-diketonate, —CO, —$BF_4^-$, —$PF_6^-$ or bulky non-coordinating anions, and the radicals X can be bonded with one another. In at least one embodiment, each X is independently fluorine, chlorine, bromine, iodine, or $C_1$-$C_{20}$-alkyl. In at least one embodiment, $C_1$-$C_{20}$-alkyl is selected from methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl.

Each R''' is independently hydrogen, $C_1$-$C_{20}$-alkyl, $C_2$-$C_{20}$-alkenyl, $C_6$-$C_{20}$-aryl, arylalkyl where alkyl has from 1 to 10 carbon atoms and aryl has from 6 to 20 carbon atoms, or —$SiR''''_3$, wherein R''' can be substituted by halogen or nitrogen- or oxygen-containing groups or two R''' radicals optionally bond to form a five- or six-membered ring. Each R'''' is independently hydrogen, $C_1$-$C_{20}$-alkyl, $C_2$-$C_{20}$-alkenyl, $C_6$-$C_{20}$-aryl or arylalkyl where alkyl has from 1 to 10 carbon atoms and aryl has from 6 to 20 carbon atoms, wherein R'''' can be substituted by halogen or nitrogen- or oxygen-containing groups or two R'''' radicals optionally bond to form a five- or six-membered ring.

s is 1, 2, or 3. D is a neutral donor and t is 0, 1, or 2. Preferably, t is 0, in which case D is absent.

In at least one embodiment, the catalyst represented by formula (III) has an electron donating side. Each of $R^1$ and $R^2$ can be independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, alkylaryl where alkyl has from 1 to 10 carbon atoms and aryl has from 6 to 20 carbon atoms, —$NR'_2$, —OR', —$SiR''_3$, or five-, six-, or seven-membered heterocyclyl comprising at least one atom selected from N, P, O and S. Preferably, each of $R^1$ and $R^2$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or alkylaryl where alkyl has from 1 to 10 carbon atoms and aryl has from 6 to 20 carbon atoms. $R^1$ and $R^2$ can be substituted by —$NR'_2$, —OR', or —$SiR''_3$.

Each R' is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —$SiR''_3$, wherein R' is optionally substituted by halogen, or two R' radicals optionally bond to form a five- or six-membered ring. Each R'' is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two R'' radicals optionally bond to form a five- or six-membered ring.

$R^3$ is hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or five-, six-, or seven-membered heterocyclyl comprising at least one atom selected from N, P, O, and S; wherein $R^7$ is optionally substituted by —$NR'_2$, —OR', or —$SiR''_3$. In at least one embodiment, $R^3$ is substituted or unsubstituted phenyl or $C_1$-$C_{10}$-alkyl (e.g., methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl). In at least one embodiment, $R^3$ is methyl. In at least one embodiment, $R^3$ is substituted phenyl represented by the structure:

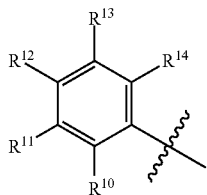

where each of $R^{10}$, $R^{11}$, $R^{12}$, $R^{13}$, and $R^{14}$ is independently hydrogen, $C_1$-$C_{10}$-alkyl, —OR', where R' is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —SiR"$_3$, wherein R' is optionally substituted by halogen, or two R' radicals optionally bond to form a five- or six-membered ring. Each R" is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two R" radicals optionally bond to form a five- or six-membered ring.

In at least one embodiment, each of $R^{10}$, $R^{11}$, $R^{12}$, $R^{13}$, and $R^{14}$ is independently hydrogen or $C_1$-$C_{10}$-alkyl selected from methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl.

In at least one embodiment, the catalyst represented by formula (III) has an electron deficient side. Each of $R^4$, $R^5$, $R^6$, $R^7$, and $R^8$ can be independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, alkylaryl where alkyl has from 1 to 10 carbon atoms and aryl has from 6 to 20 carbon atoms, —NR'$_2$, —OR', halogen, —NO$_2$, —SiR"$_3$ (where R' and R" are as defined above) or five-, six-, or seven-membered heterocyclyl comprising at least one atom selected from N, P, O, and S. $R^4$, $R^5$, $R^6$, $R^7$, and $R^8$ can be independently substituted by —NO$_2$, —CF$_3$, —CF$_2$CF$_3$, —CH$_2$CF$_3$, halogen, —NR'$_2$, —OR', or —SiR"$_3$ (where R' and R" are as defined above). Preferably, each of $R^4$, $R^5$, $R^6$, $R^7$, and $R^8$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or alkylaryl where alkyl has from 1 to 10 carbon atoms and aryl has from 6 to 20 carbon atoms, where at least one of $R^4$, $R^5$, $R^6$, $R^7$, and $R^8$ is substituted by —NO$_2$, halogen, —NR'$_2$, —OR', or —SiR"$_3$ (where R' and R" are as defined above). In at least one embodiment, $R^4$, $R^5$, $R^6$, $R^7$, and $R^8$ is independently halogen, hydrogen, or $C_1$-$C_{22}$-alkyl substituted with one or more halogen atoms. In at least one embodiment, each of $R^4$, $R^5$, $R^6$, $R^7$, and $R^8$ is $C_1$-$C_{10}$ alkyl, halogen or trihalomethyl, such as trichloromethyl or trifluoromethyl. In at least one embodiment, at least one of $R^4$, $R^5$, $R^6$, $R^7$, and $R^8$ is $C_1$-$C_{10}$ alkyl, halogen or trihalomethyl, such as trichloromethyl or trifluoromethyl. In at least one embodiment, each of $R^7$ and $R^8$ is halogen or trihalomethyl, such as trichloromethyl or trifluoromethyl, and each of $R^4$, $R^5$, and $R^6$ is hydrogen, $C_1$-$C_{10}$ alkyl, or halogen. In at least one embodiment, each of $R^7$ and $R^8$ is halogen or trihalomethyl, such as trichloromethyl or trifluoromethyl, and each of $R^4$, $R^5$, and $R^6$ is $C_1$-$C_{10}$ alkyl or halogen.

Preferably, the catalyst compound represented by formula (I), formula (II), or formula (III) is one or more of:

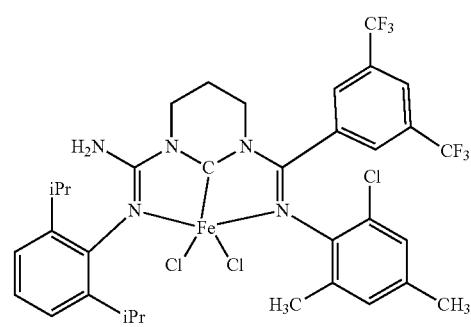

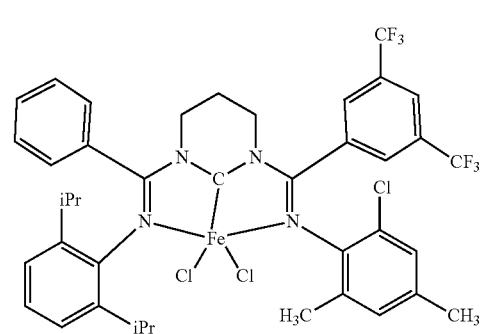

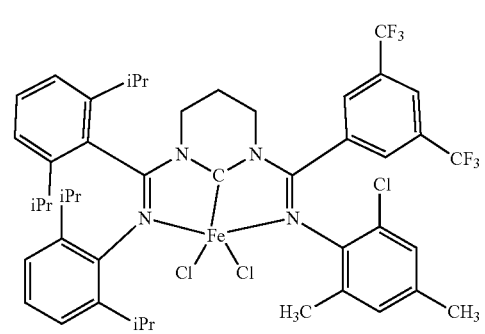

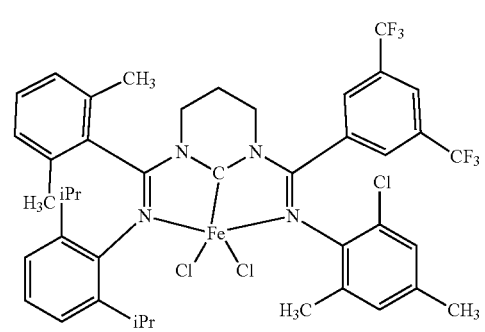

-continued
5
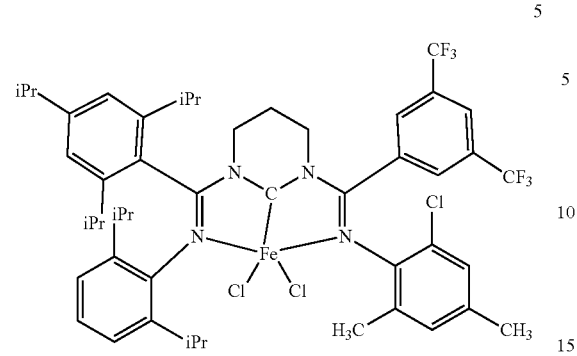
6
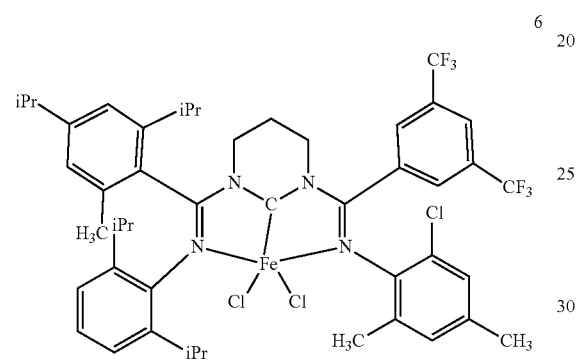
7
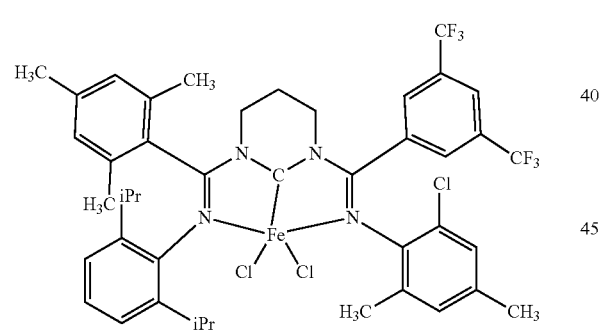
8
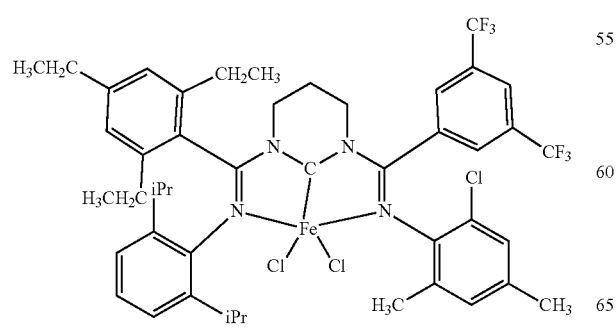
-continued
9
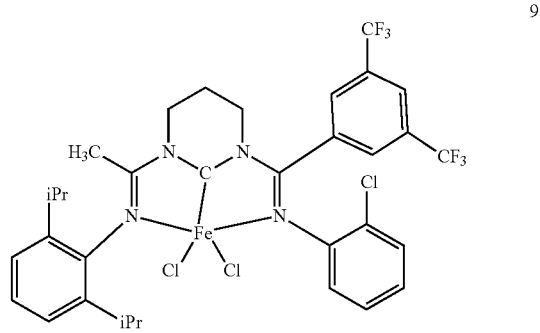
10
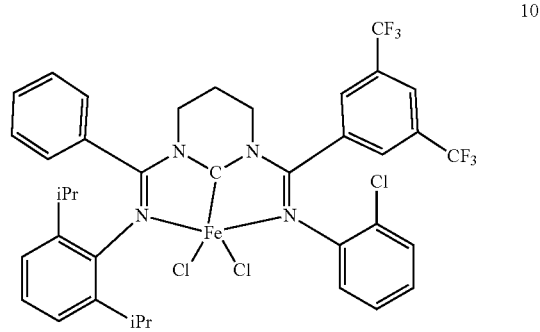
11
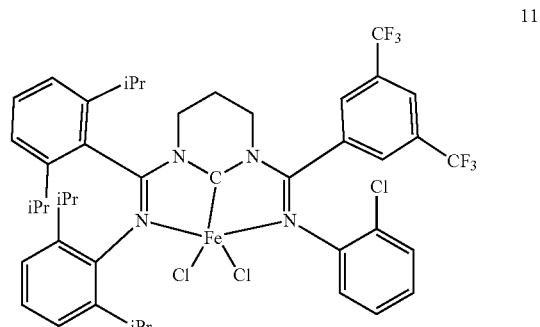
12
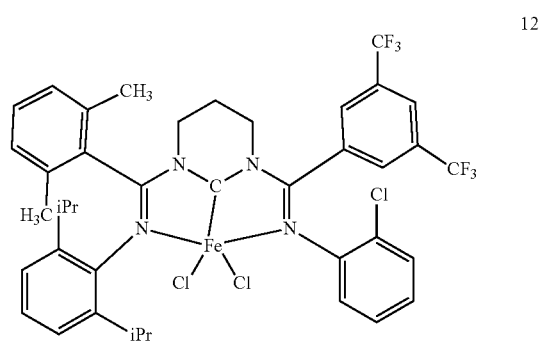
13
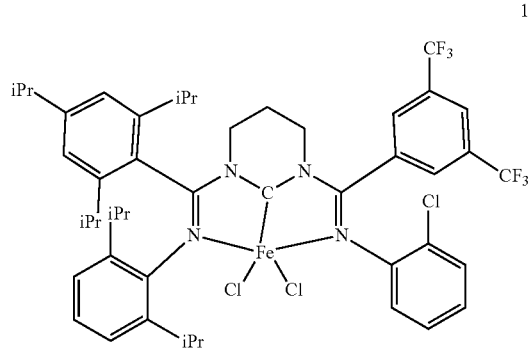

-continued
14
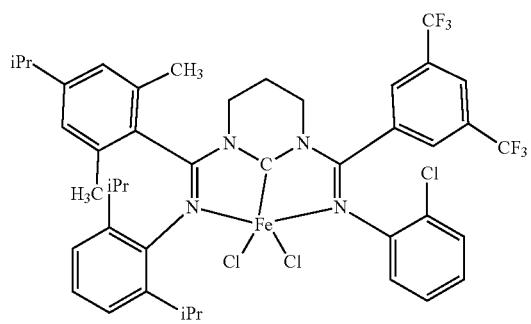
15
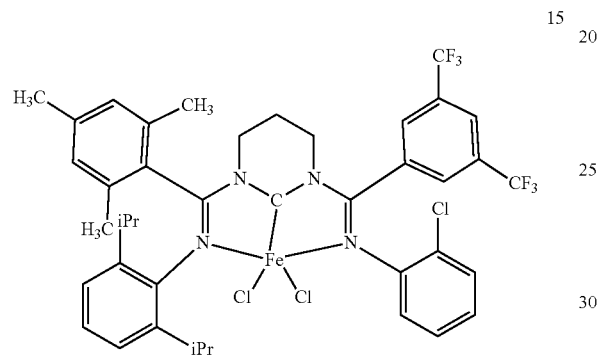
16
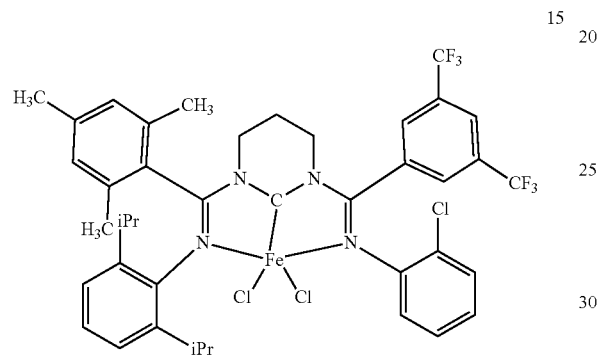
-continued
18
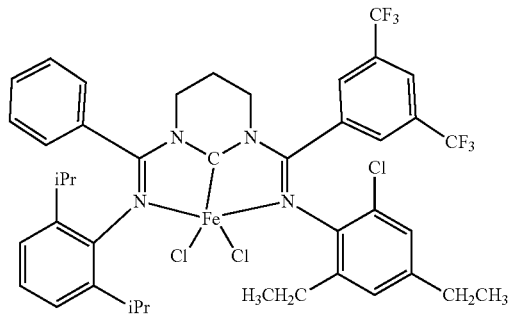
19
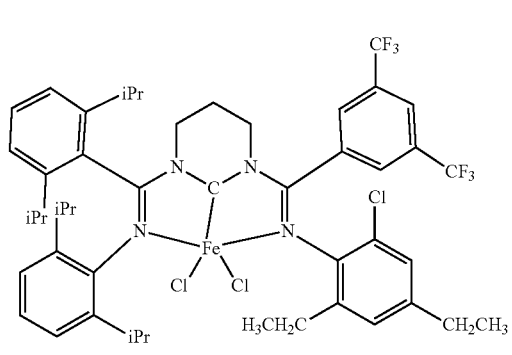
20
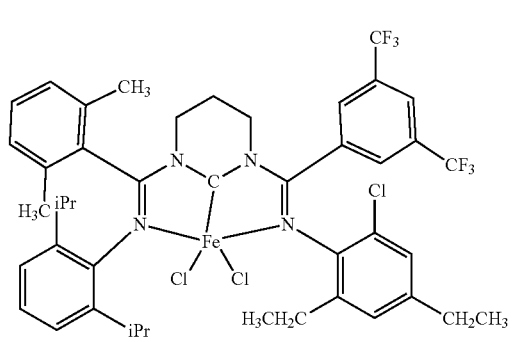
17
21
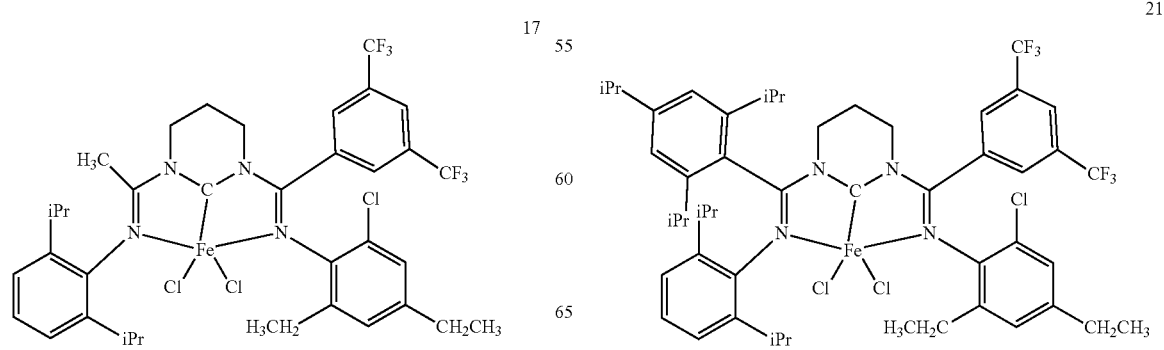

-continued
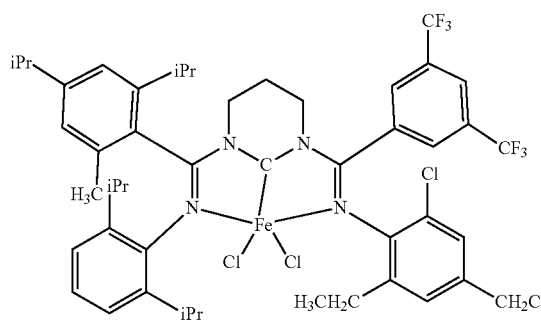
22
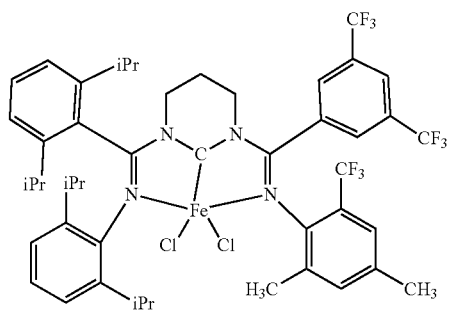
27
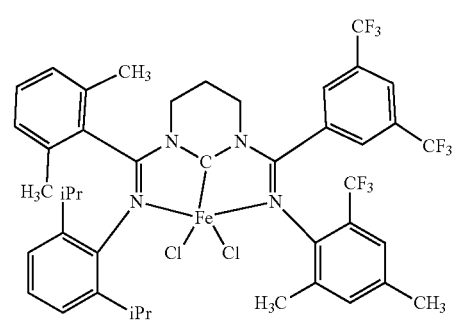
28
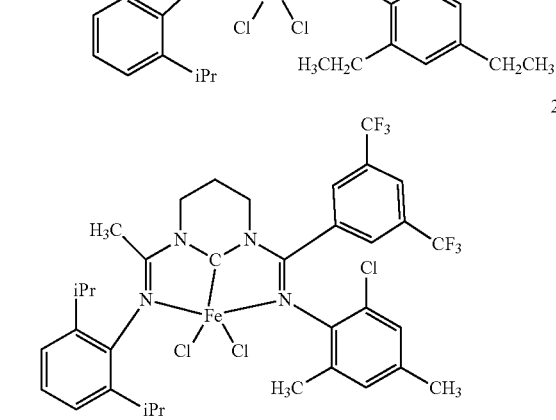
23
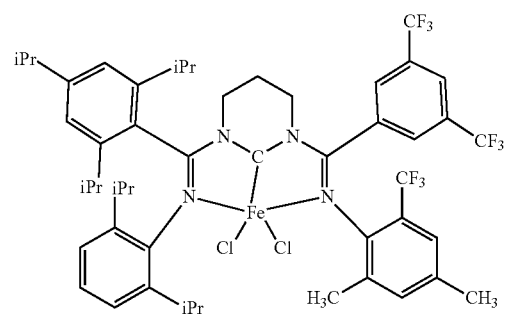
29
24
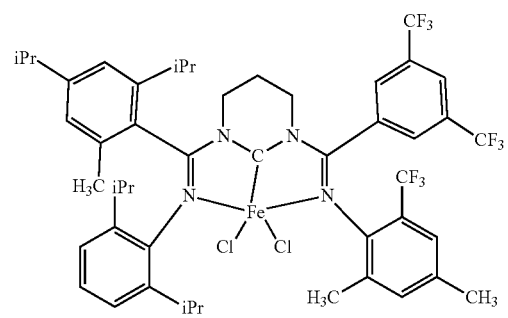
30
25
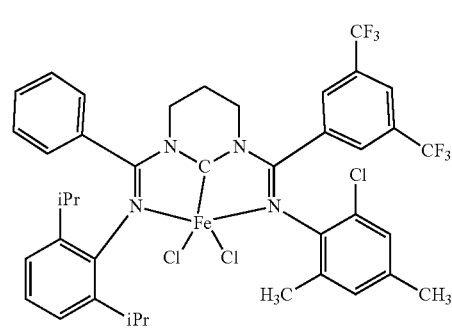
26
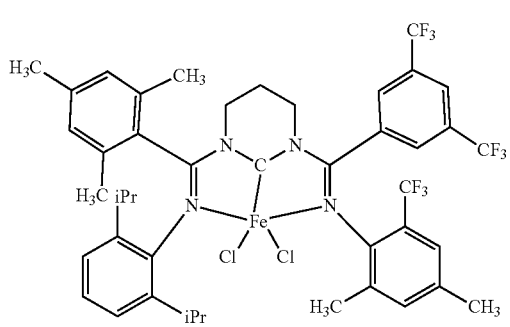
31

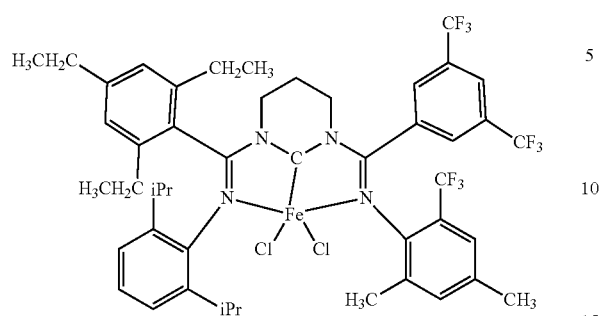
32
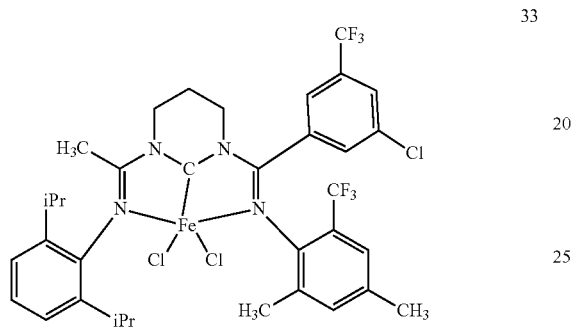
33
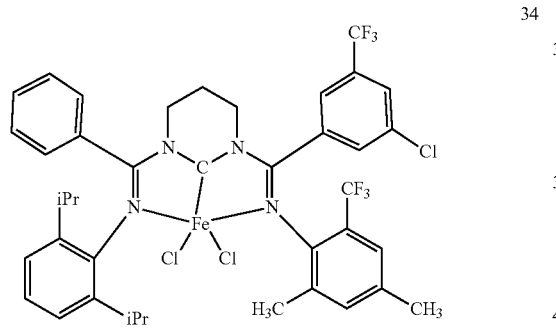
34
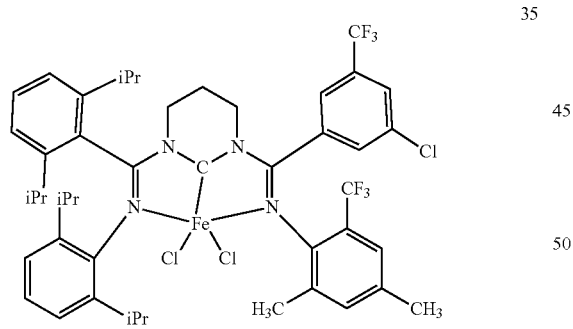
35
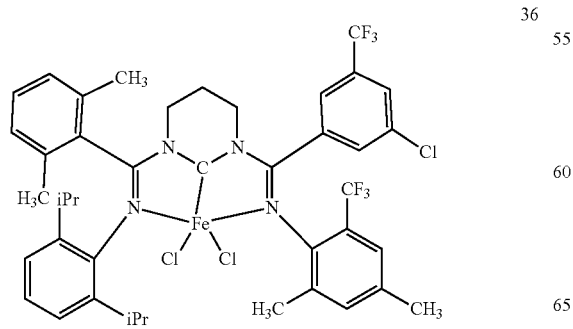
36
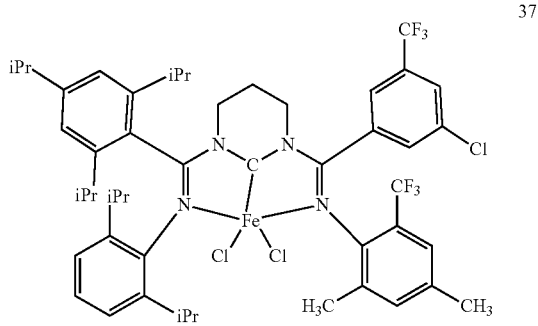
37
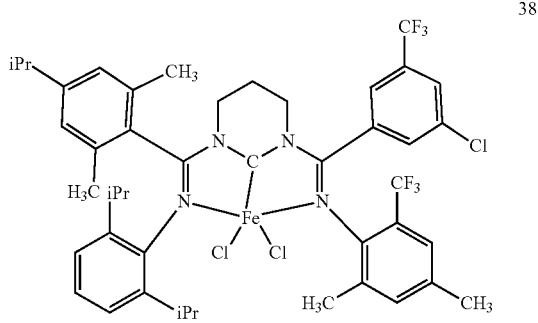
38
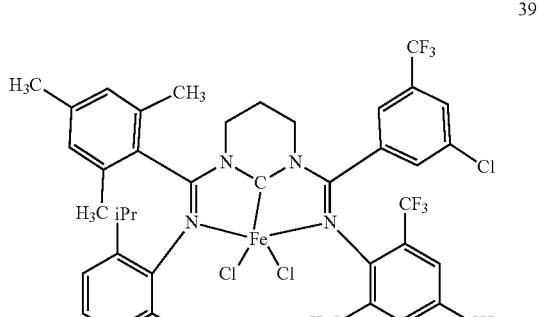
39
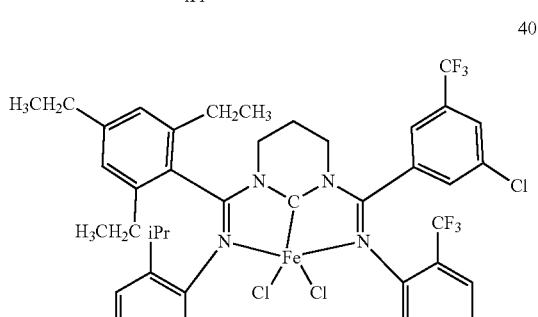
40
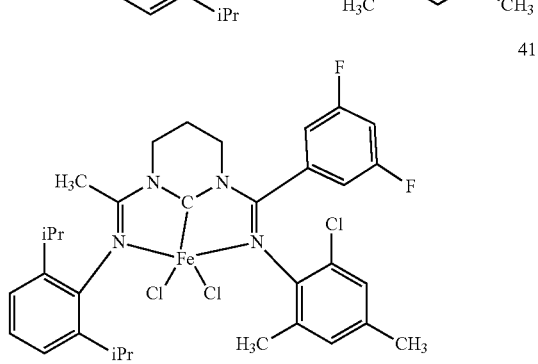
41

42
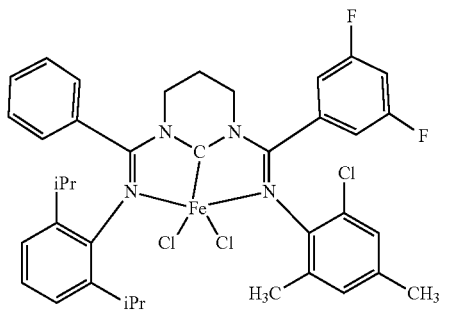
43
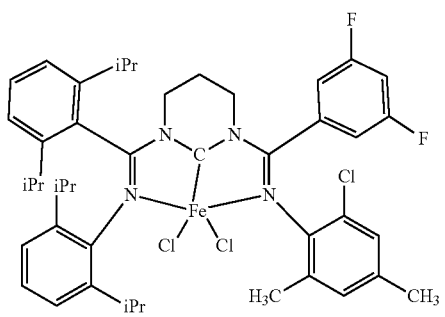
44
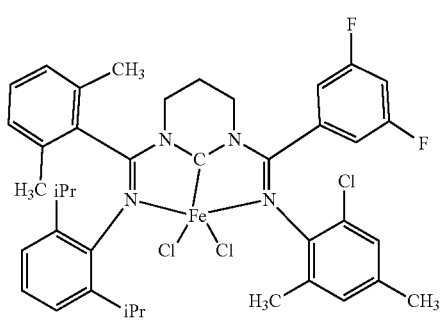
45
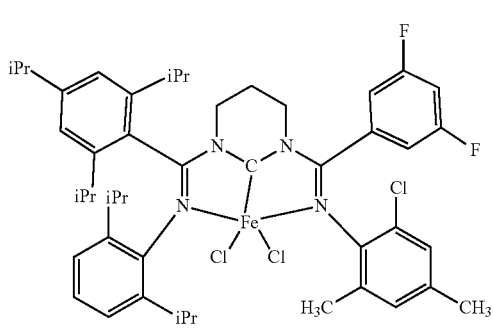
46
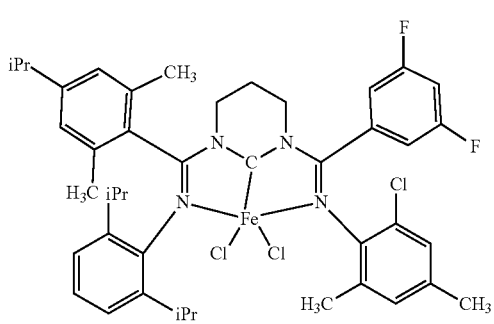
47
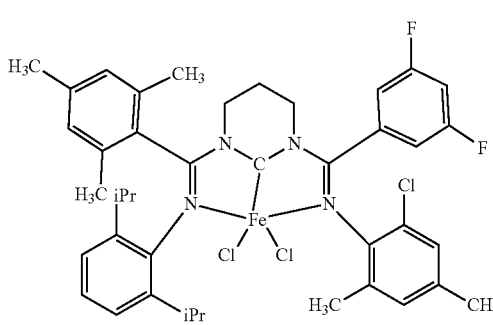
48
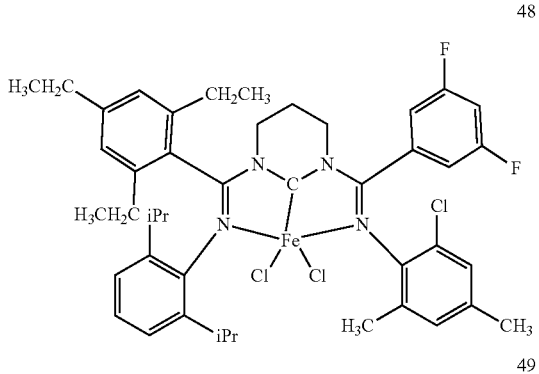
49
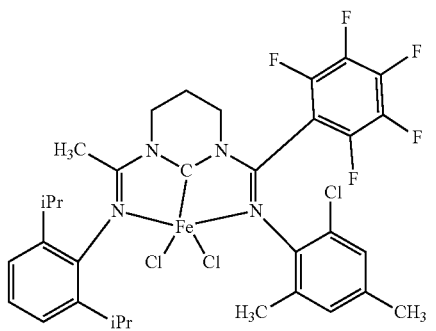
50
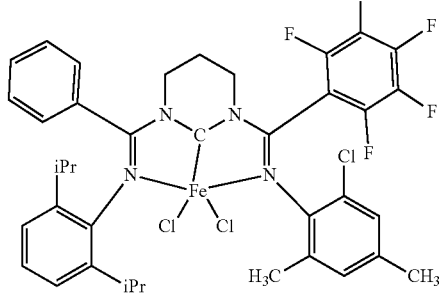
51
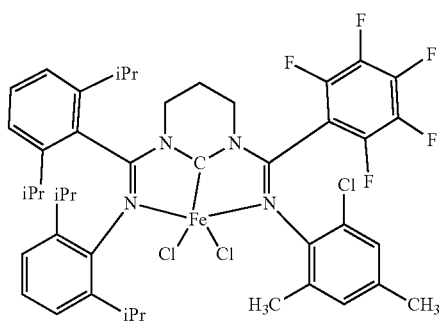

-continued
52
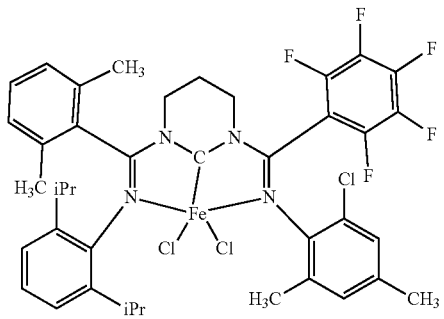
53
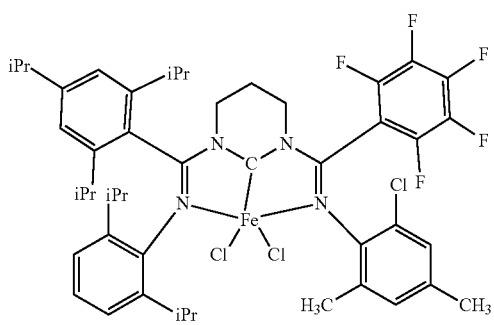
54
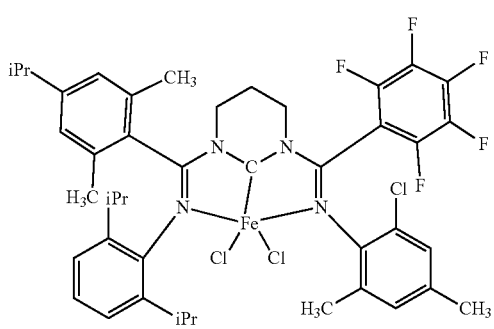
55
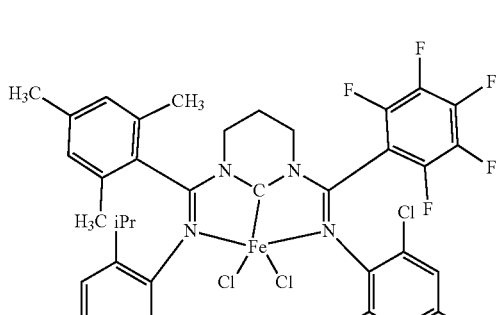
56
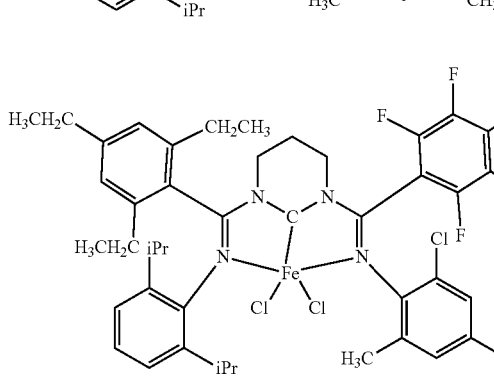
-continued
57
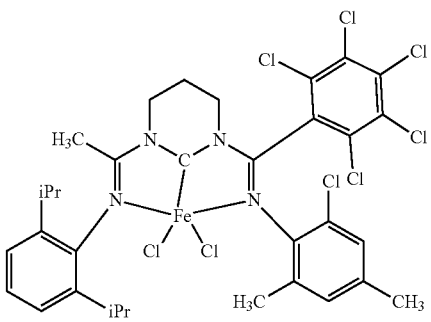
58
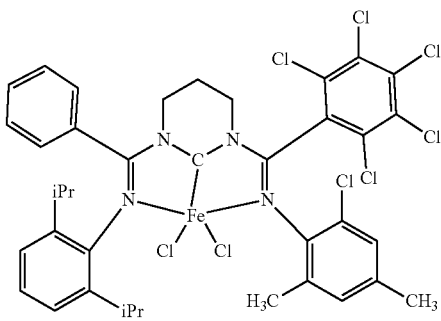
59
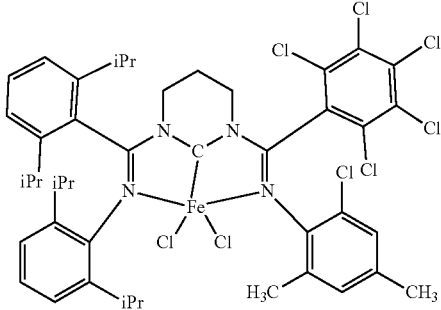
60
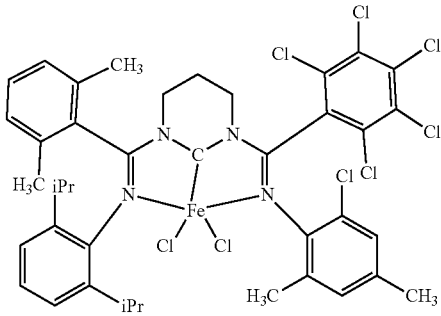
61
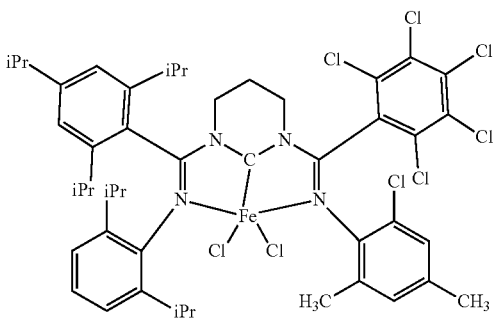

62
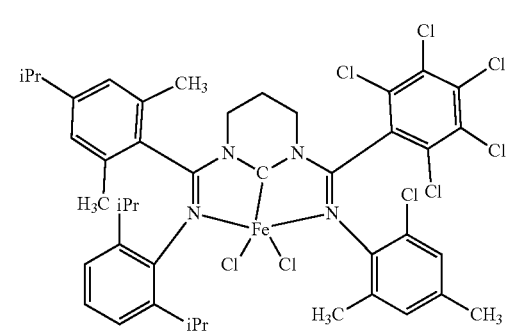
63
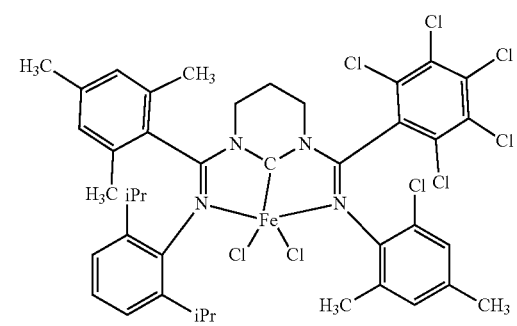
64
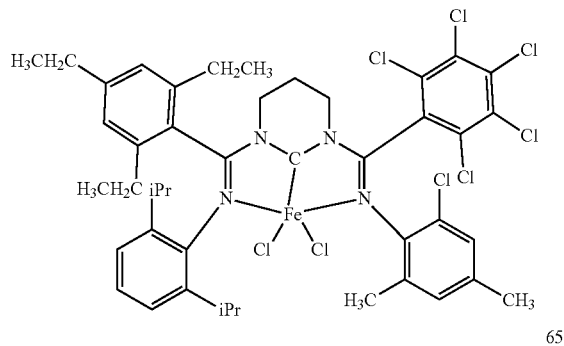
65
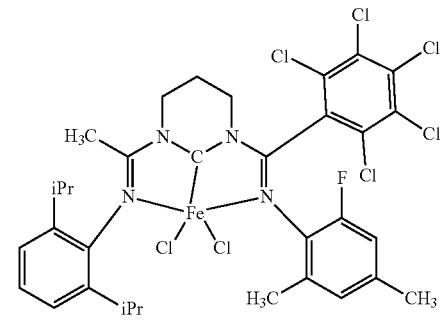
66
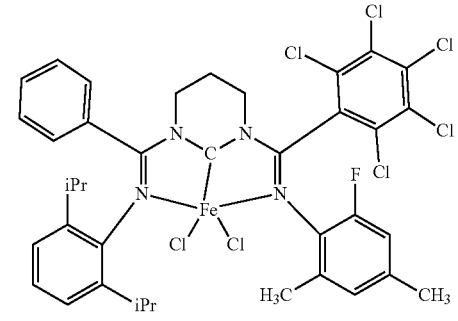
67
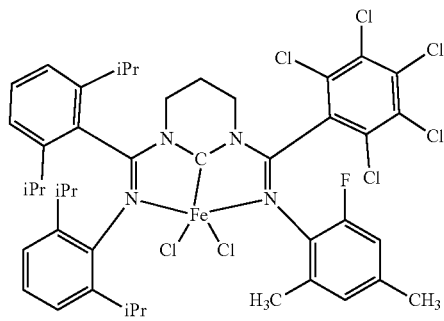
68
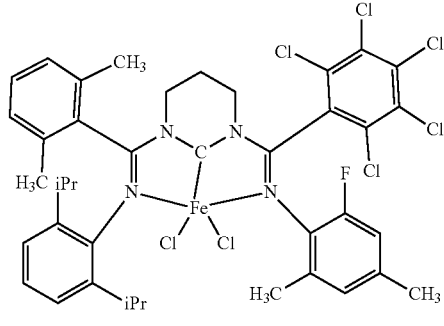
69
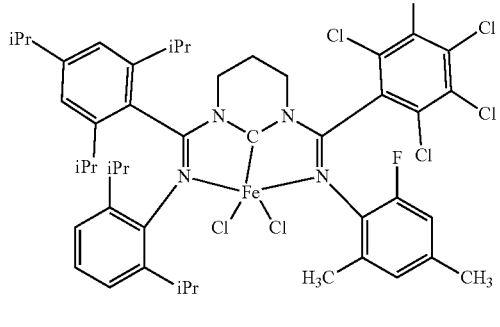
70
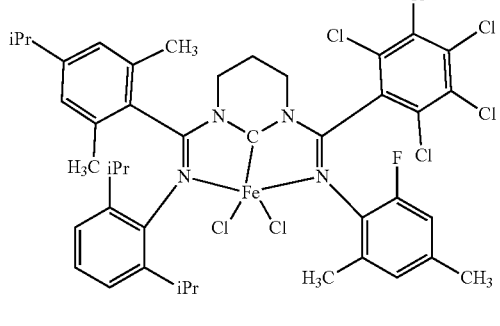
71
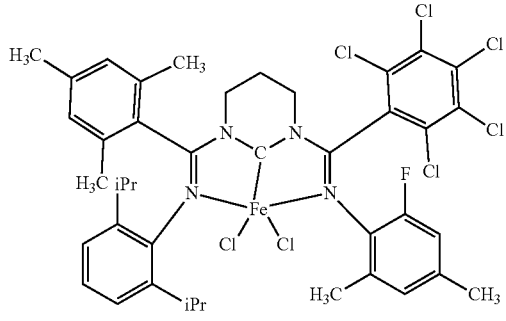

72
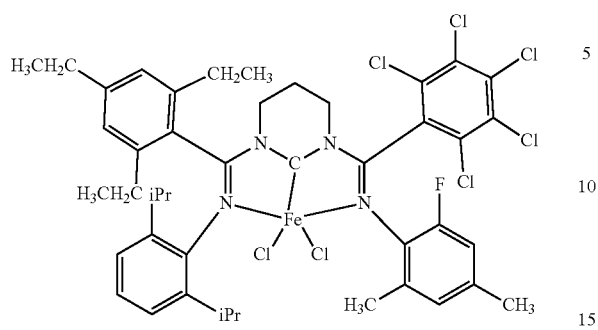
73
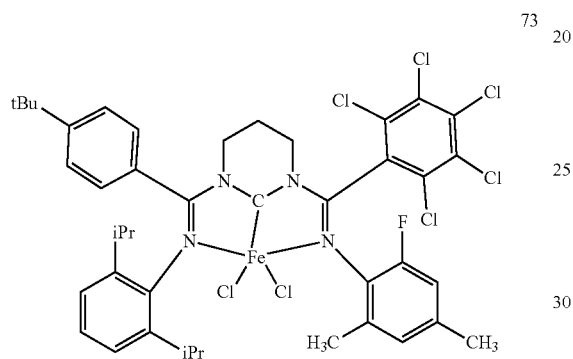
74
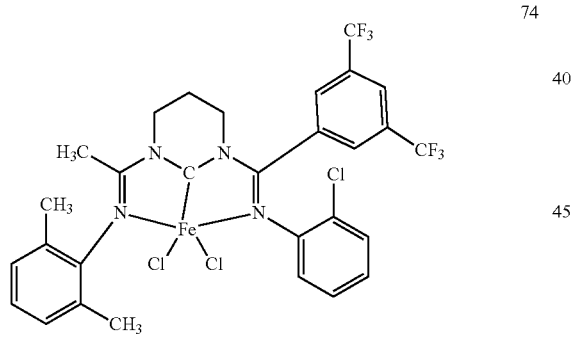
75
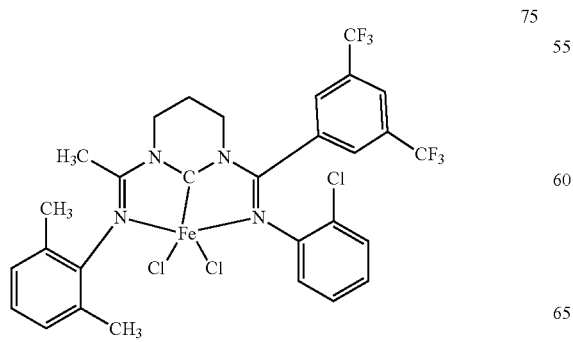
76
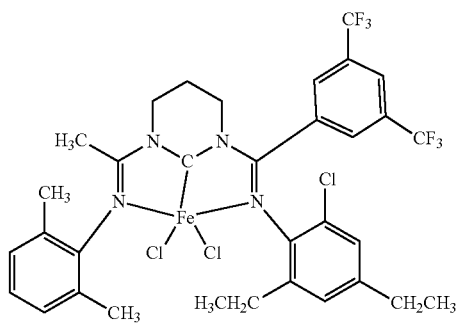
77
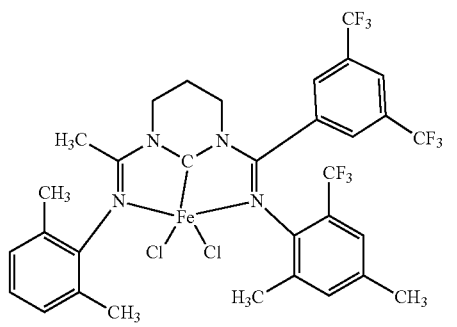
78
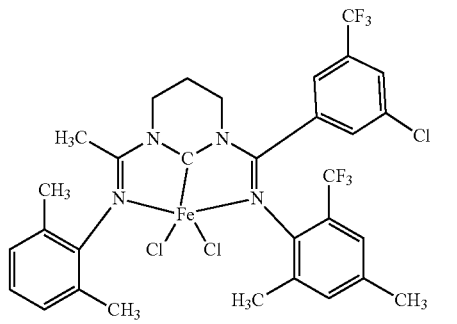
79
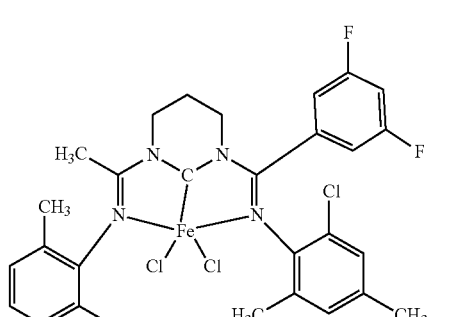

81 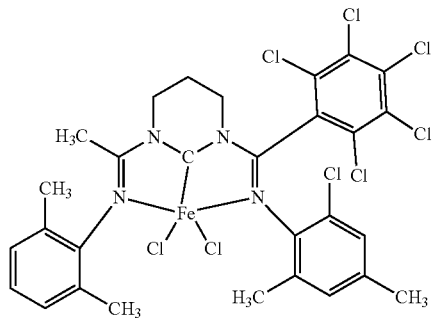
82 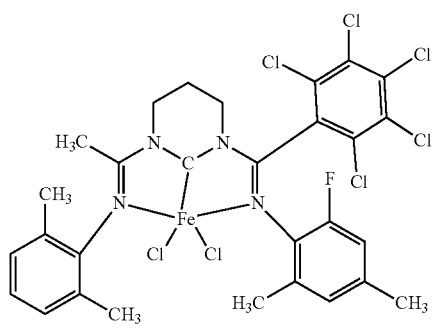
83 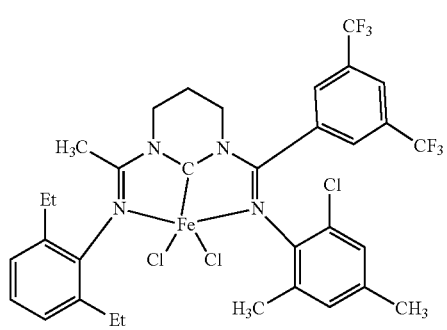
84 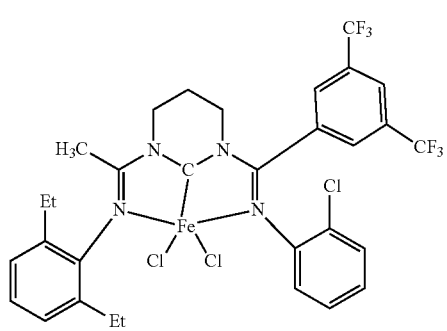
85 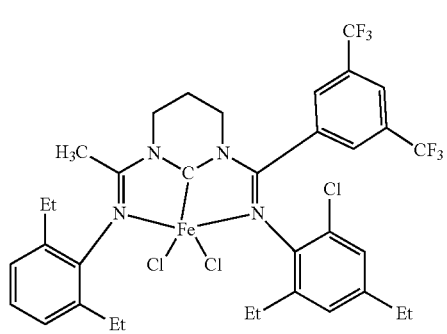
86 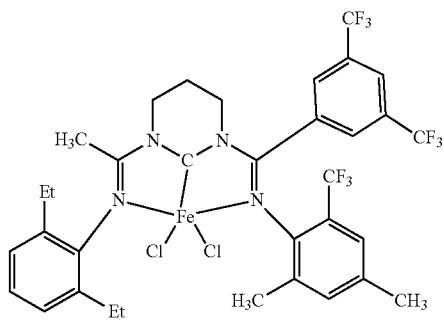
87 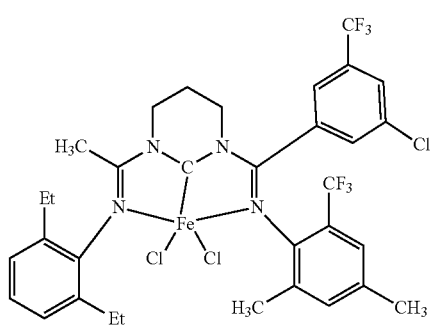
88 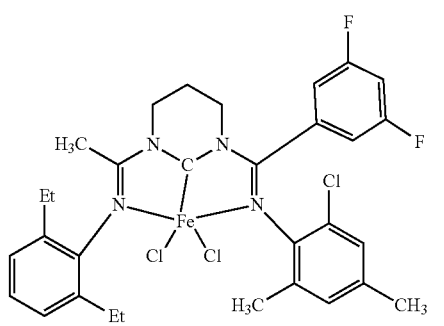
89 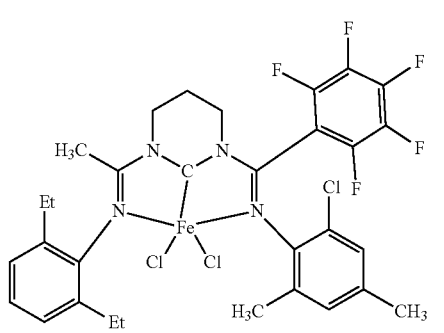
90 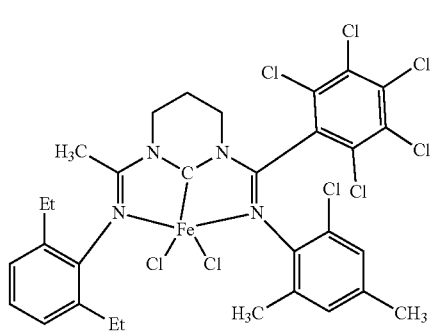

91
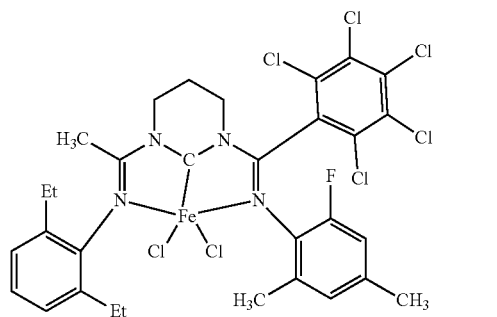
92
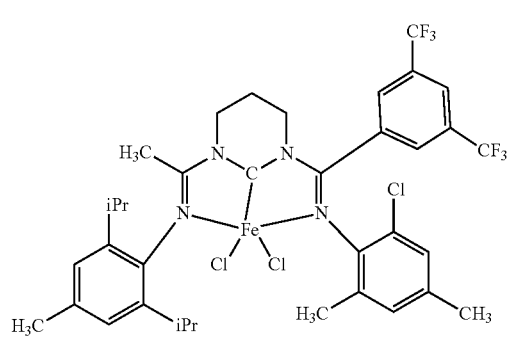
93
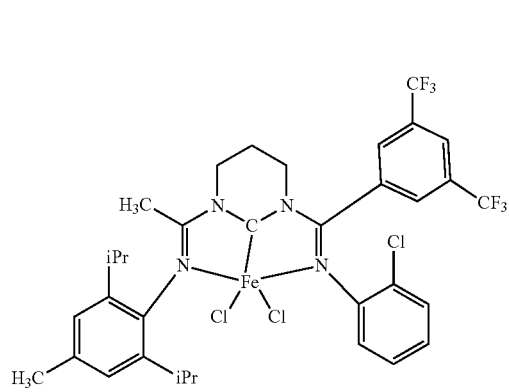
94
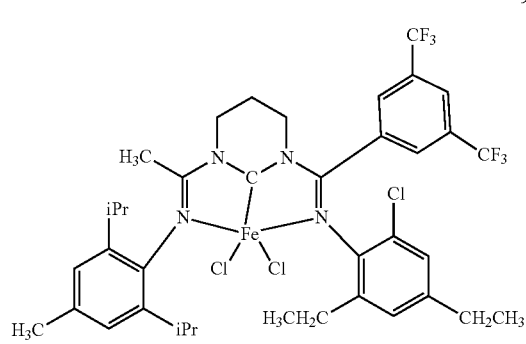
95
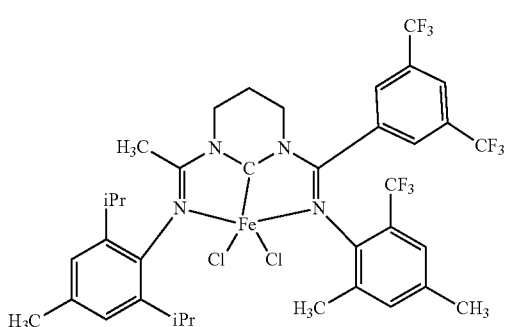
96
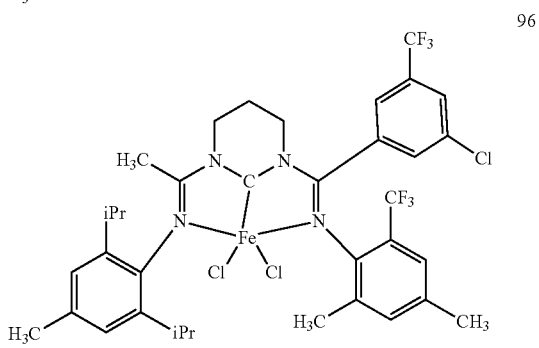
97
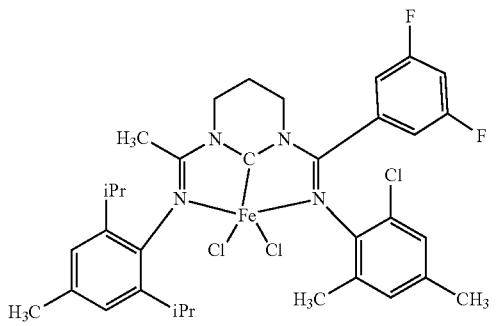
98
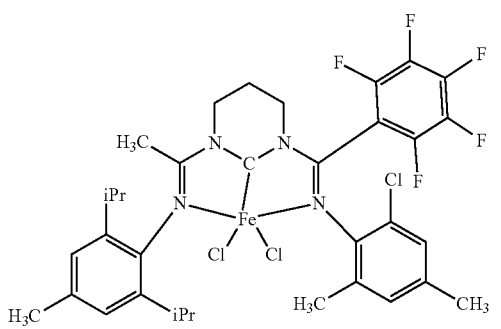
99
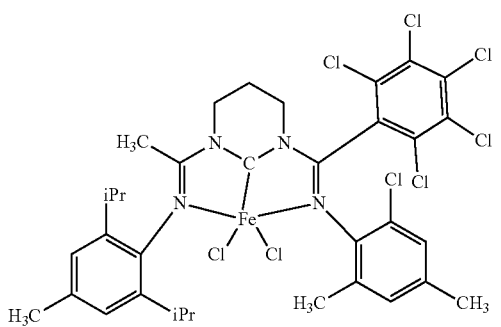

100
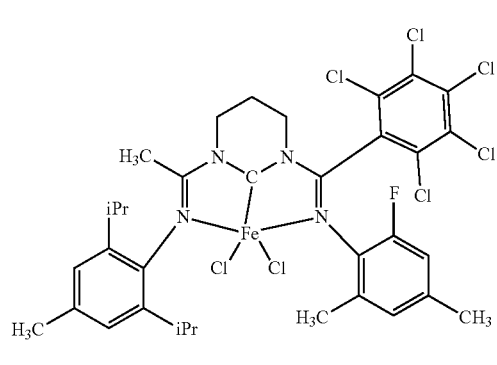
101
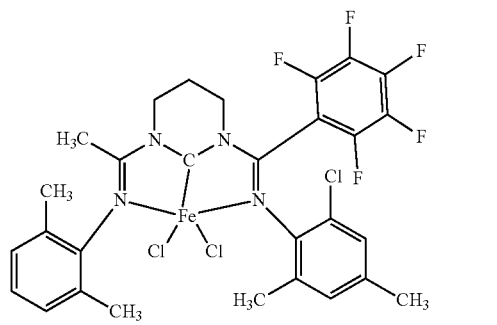
102
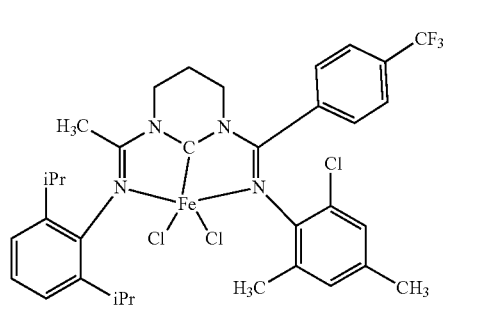
103
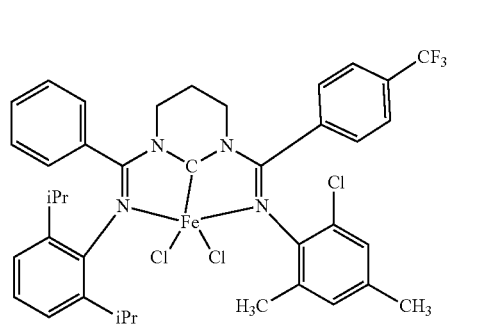
104
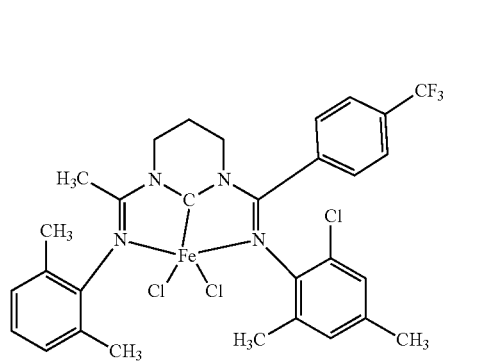
105
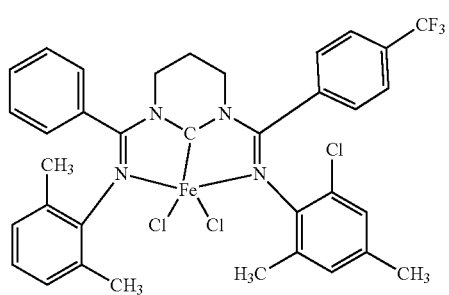
106
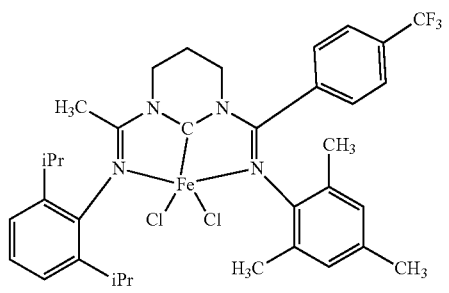
107
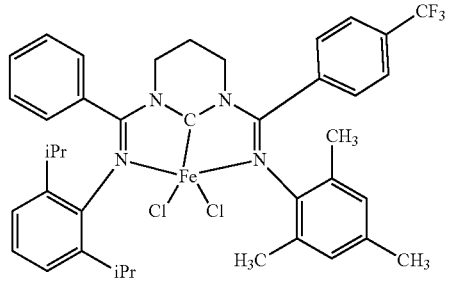
108
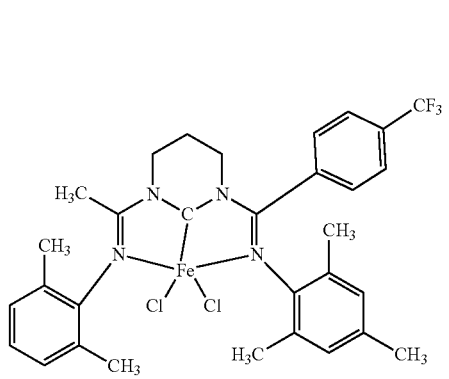
109
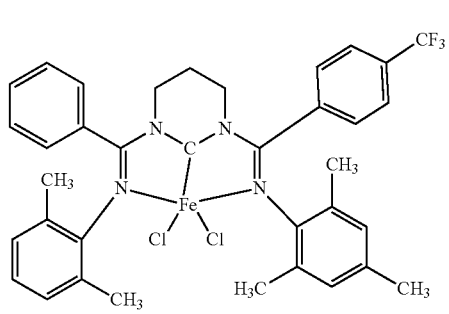

-continued
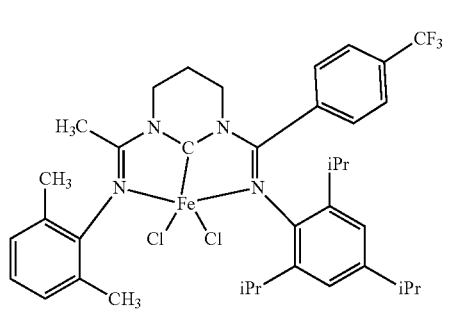 110
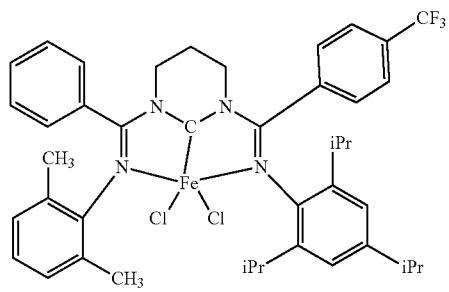 111
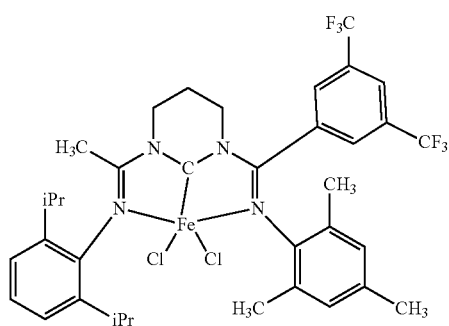 112
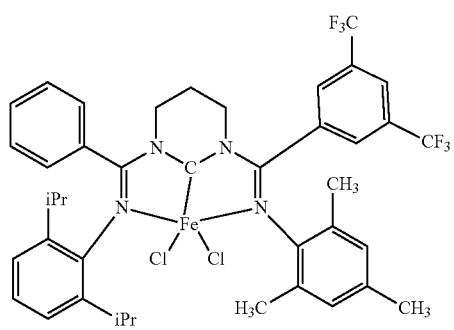 113
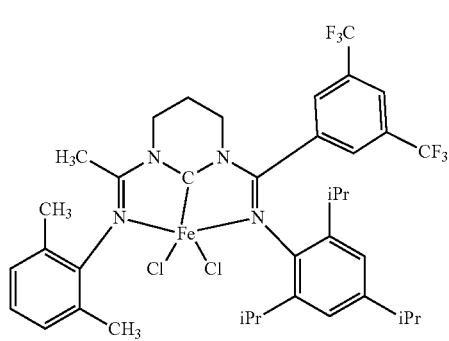 114
-continued
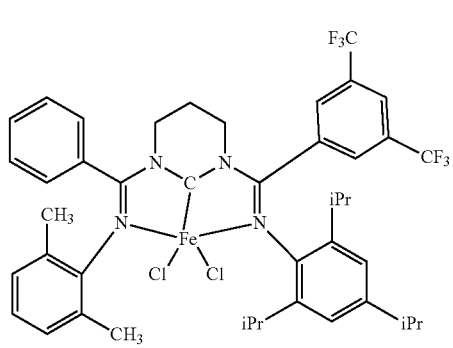 115
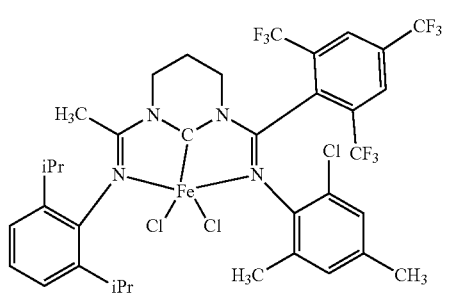 116
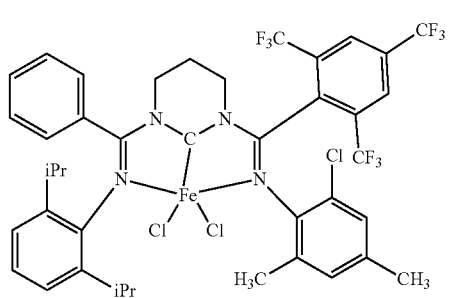 117
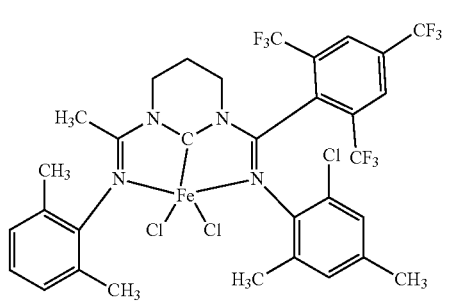 118
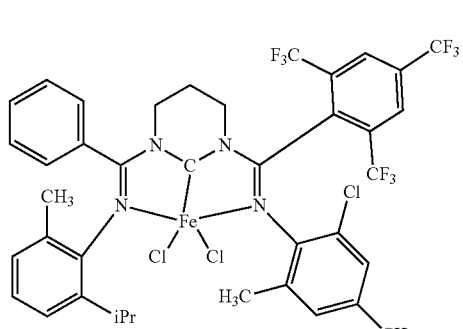 119

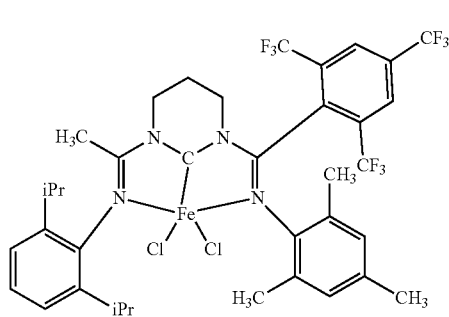
120
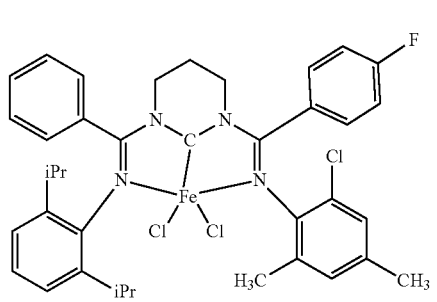
125
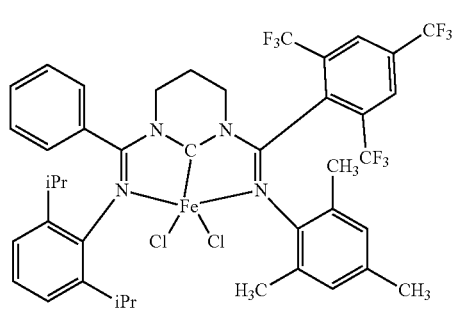
121
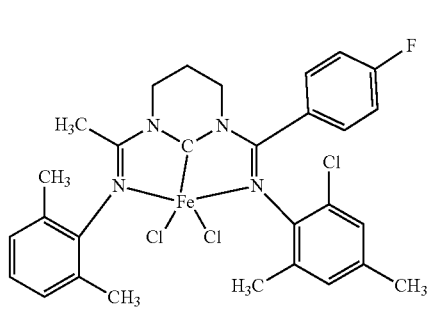
126
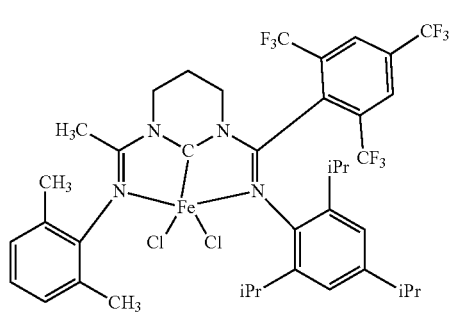
122
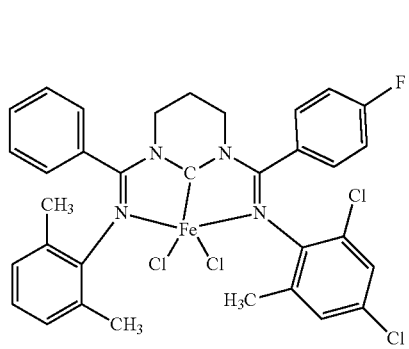
127
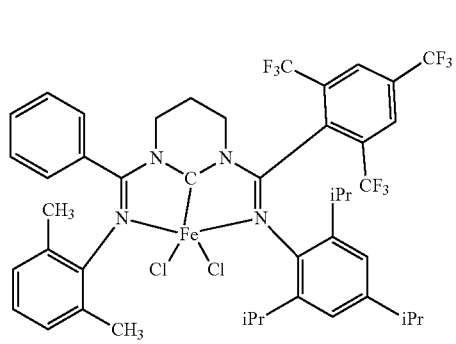
123
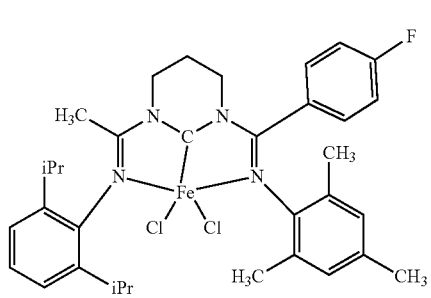
128
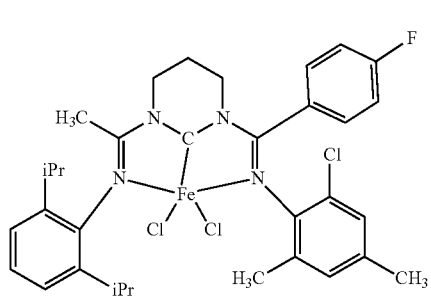
124
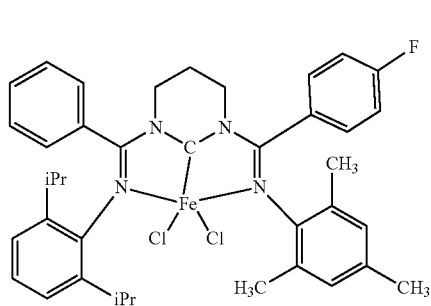
129

130
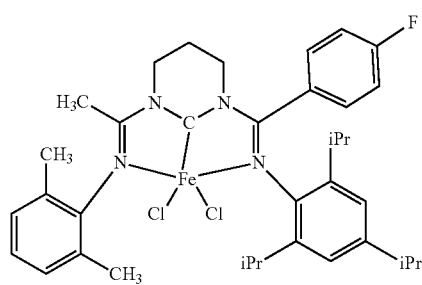
131
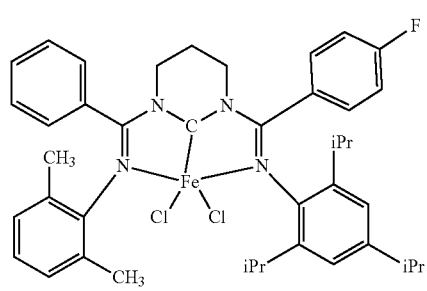
132
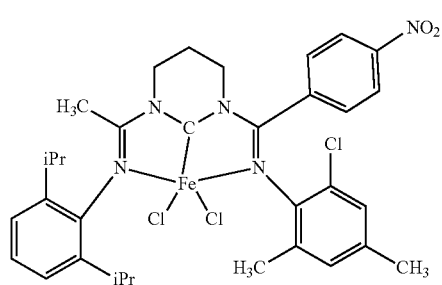
133
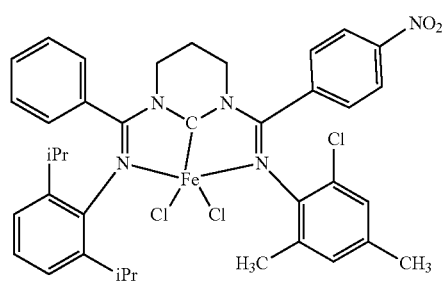
134
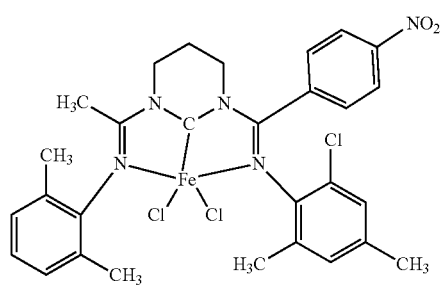
135
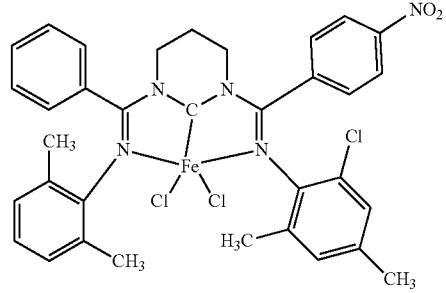
136
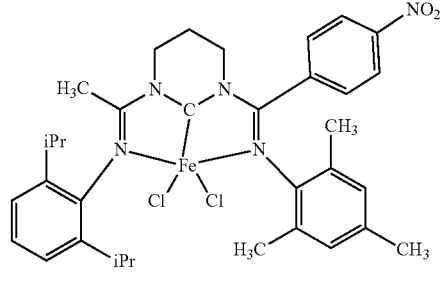
137
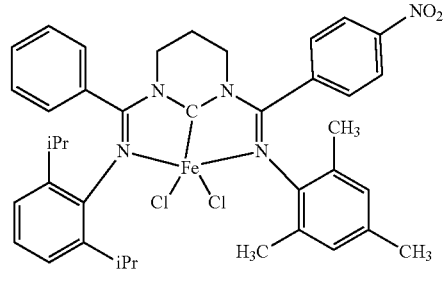
138
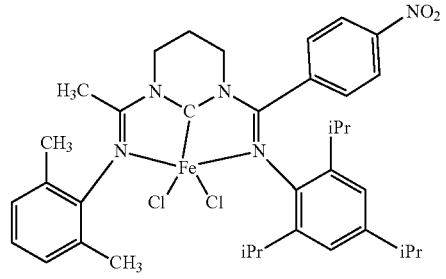
139
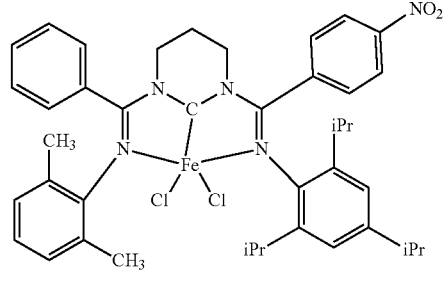

Preferably, the catalyst compound represented by formula (I) or formula (II) is one or more of:

1

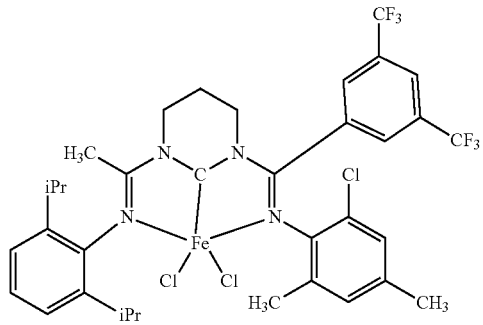

2

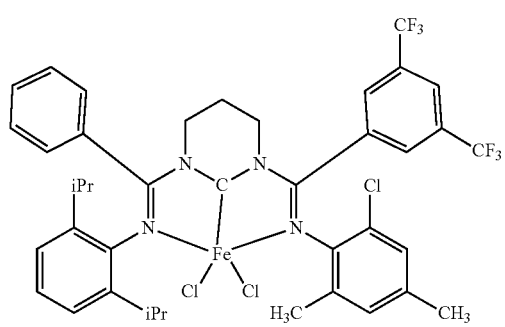

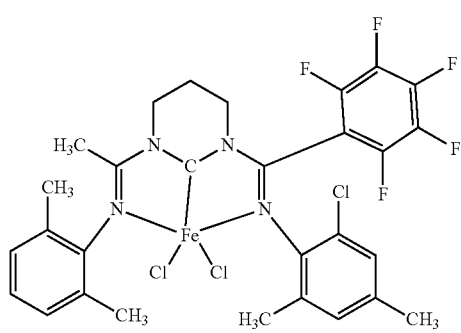

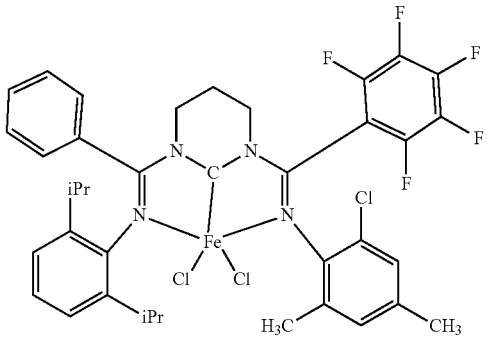

In at least one embodiment, the compound represented by formula (I), formula (II), or formula (III) can be an alkyl migration product formed in situ during formation of a catalyst system upon contact with an alkyl alumoxane, such as methylalumoxane. For example, a compound represented by formula (I) can form an alkyl migration product (e.g., a compound represented by formula (Ia)). Without being bound by theory, it is thought that alkyl migration from an alkyl alumoxane can occur upon contact of a compound represented by formula (I), formula (II), or formula (III) and an alkyl alumoxane. For simplicity, a plausible mechanism of alkyl migration from an alkyl alumoxane to a compound represented by formula (I), formula (II), or formula (III) is shown in Scheme 1. Alkyl migration can occur on a minor fraction, a major fraction, or the entirety of the total amount of a compound represented by formula (I), formula (II), or formula (III) that contacts an alkyl alumoxane during formation of a catalyst system of the present disclosure. Alternatively, alkyl migration does not occur on any fraction of the total amount of a compound represented by formula (I), formula (II), and or formula (III) that contacts an alkyl alumoxane during formation of a catalyst system of the present disclosure.

Scheme 1

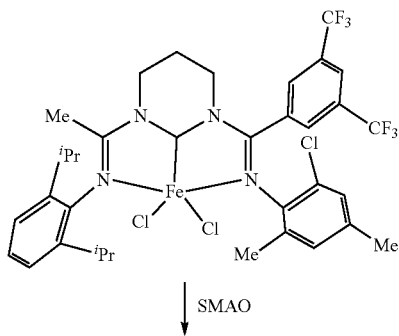 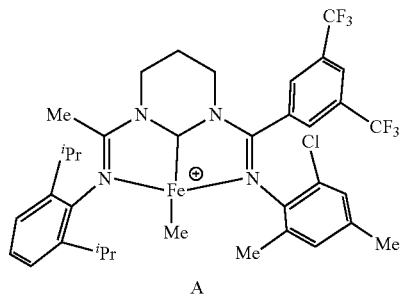

SMAO

A

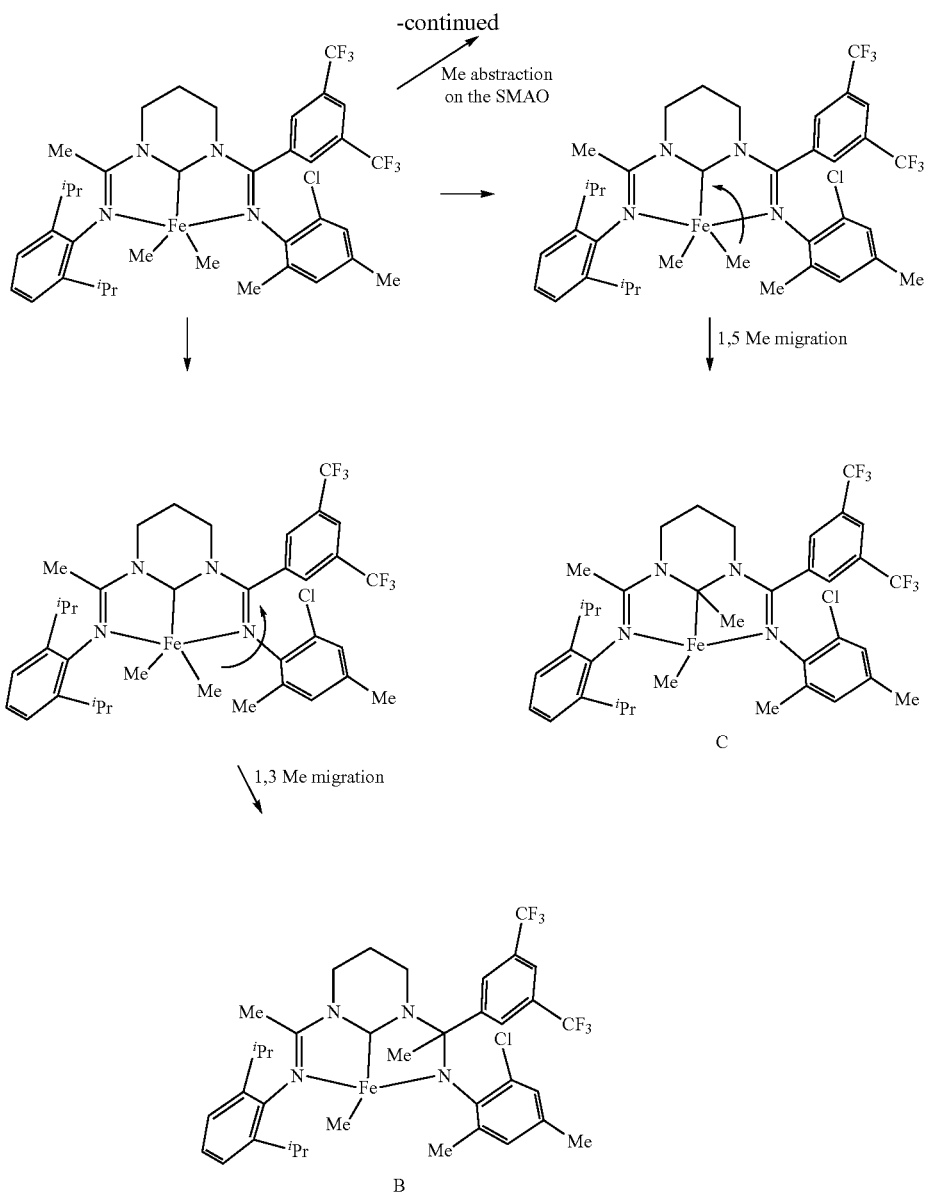
Preferably, the alkyl migration product or neutral radical anion of formula (I) (or compound represented by formula (Ia)) is one or more of:
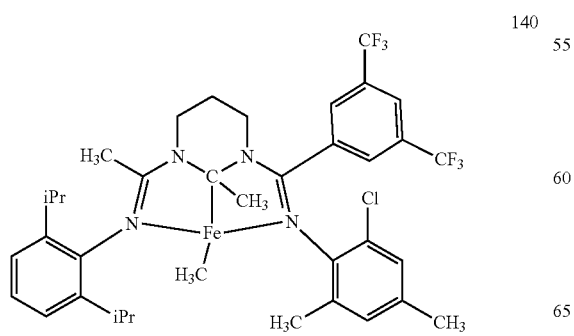

141
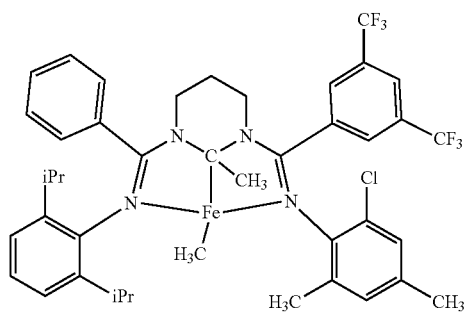

142
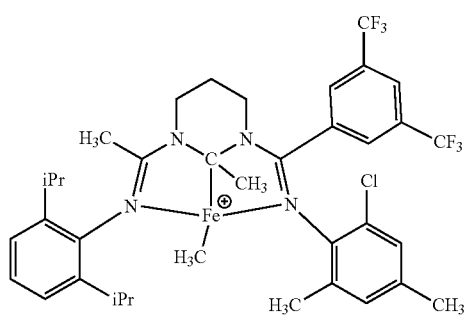

143
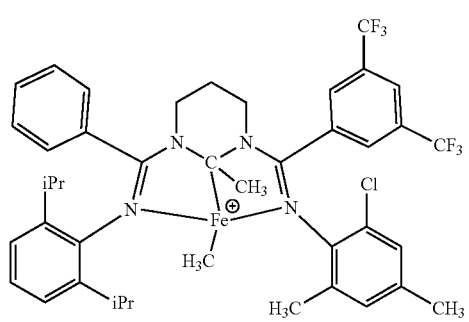

144
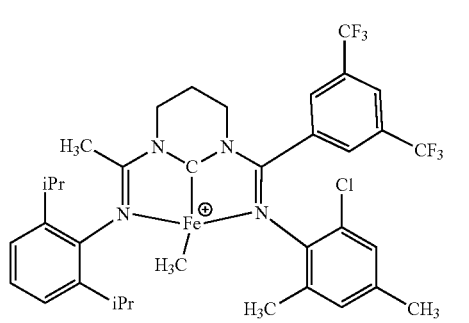

145
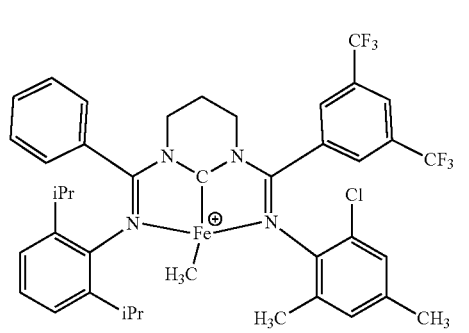

146
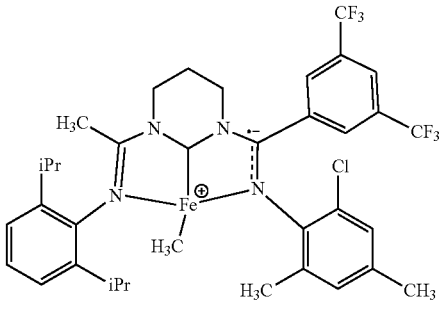

147
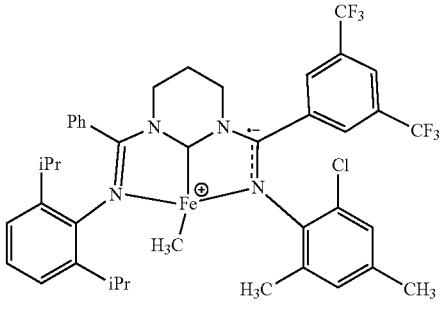

148
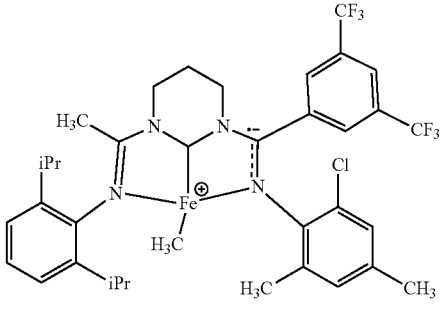

149
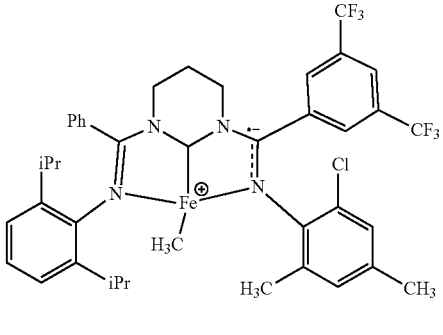

In at least one embodiment, one catalyst compound is used, e.g., the catalyst compounds are not different. For purposes of the present disclosure one catalyst compound is considered different from another if they differ by at least one atom. For example "bisindenyl $ZrCl_2$" is different from "(indenyl)(2-methylindenyl) $ZrCl_2$" which is different from "(indenyl)(2-methylindenyl) $HfCl_2$." Catalyst compounds that differ only by isomer are considered the same for purposes of the present disclosure, e.g., rac-dimethylsilylbis (2-methyl 4-phenyl)Hf(Me)$_2$ is considered to be the same as meso-dimethylsilylbis(2-methyl 4-phenyl)Hf(Me)$_2$.

Methods to Prepare the Catalyst Compounds

All air sensitive syntheses are carried out in nitrogen purged dry boxes. All solvents are available from commercial sources. Substituted anilines; acyl chlorides; phosphorous pentachloride; nBuLi; 1,4,5,6-Tetrahydropyrimidine; iron (II) chloride; and potassium hexamethyl disilane are available from commercial sources.

Generally, catalysts of Formula (I), Formula (II), or Formula (III) can be synthesized according to the schematic reaction procedure described in Scheme 2 below. As shown in Scheme 2: (i) an aniline compound is treated with an acyl chloride under basic conditions to form an aryl amide; (ii) the aryl amide is treated with phosphorous pentachloride to form an imidoyl chloride; (iii) 1,4,5,6-Tetrahydropyrimidine is treated with n-butyl lithium to form a lithium salt that is then contacted with the imidoyl chloride to form a dihydropyrimidinyl methanimine; (iv) the methanimine is then treated with an imidoyl chloride to provide an imino tetrahydropyridinium compound; (v) the imino tetrahydropyridinium compound is then treated with iron (II) chloride in the presence of potassium hexamethyldisilane to form a compound represented by Formula (I), Formula (II), or Formula (III).

The final products are obtained by extraction of crude materials in dichloromethane.

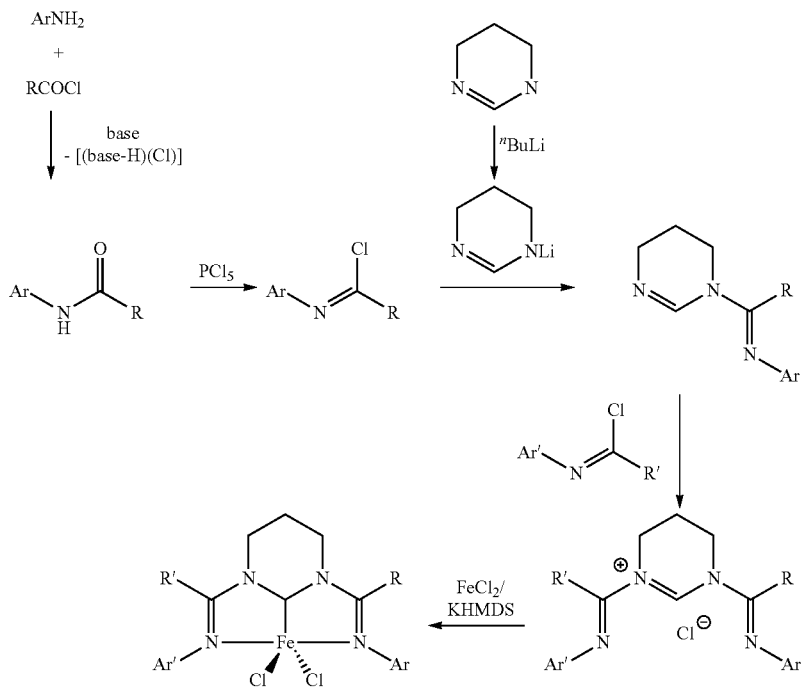

Scheme 2

In at least one embodiment, R and R' are methyl and Ar and Ar' are 2,6-(iPr)Ph. In at least one embodiment, R=methyl, R'=3,5-($CF_3$)Ph, Ar=2,6-(iPr)Ph, and Ar'=2-Cl-4,6-($CH_3$)Ph.

Activators

The terms "cocatalyst" and "activator" are used herein interchangeably and are defined to be any compound which can activate any one of the catalyst compounds described above by converting the neutral catalyst compound to a catalytically active catalyst compound cation.

After the catalysts have been synthesized, catalyst systems may be formed by combining the catalysts with activators in any suitable manner, including by supporting them for use in slurry or gas phase polymerization. The catalyst systems may also be added to or generated in solution polymerization or bulk polymerization (in the monomer, i.e., no solvent).

Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

Alumoxane Activators

In one embodiment, alumoxane activators are utilized as an activator in the catalyst system. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584). Aluminum alkyls are available as hydrocarbon solutions from commercial sources. Methylalumoxane ("MAO") is available from Albemarle as a 30 wt % solution in toluene.

The catalyst system typically comprises a transition metal complex as described above and an activator such as alumoxane or a non-coordinating anion activator. Activation may be performed using alumoxane solution including an alkylalumoxane such as methyl alumoxane, referred to as MAO, as well as modified MAO, referred to herein as MMAO, which contains some higher alkyl groups to improve the solubility. MAO can be purchased from Albemarle Corporation, Baton Rouge, La., typically in a 10 wt % solution in toluene. The catalyst system employed in the present disclosure can use an activator selected from alumoxanes, such as methyl alumoxane, modified methyl alumoxane, ethyl alumoxane, iso-butyl alumoxane, TEAL (triethyl aluminum) and the like.

When an alumoxane or modified alumoxane is used, the catalyst-to-activator molar ratio is from 1:3000 to 10:1; such as 1:2000 to 10:1; such as 1:1000 to 10:1; such as 1:500 to 1:1; such as 1:300 to 1:1; such as 1:200 to 1:1; such as 1:100 to 1:1; such as 1:50 to 1:1; such as 1:10 to 1:1. When the activator is an alumoxane (modified or unmodified), some embodiments select the maximum amount of activator at a 5000-fold molar excess over the catalyst (per metal catalytic site). The minimum activator-to-catalyst ratio can be 1:1 molar ratio.

Non-Coordinating Anion Activators

A non-coordinating anion (NCA) is an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals can include aluminum, gold, and platinum. Suitable metalloids can include boron, aluminum, phosphorus, and silicon. A stoichiometric activator can be either neutral or ionic. The terms ionic activator, and stoichiometric ionic activator can be used interchangeably. Likewise, the terms neutral stoichiometric activator, and Lewis acid activator can be used interchangeably. The term non-coordinating anion includes neutral stoichiometric activators, ionic stoichiometric activators, ionic activators, and Lewis acid activators.

"Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization.

Activation may be performed using non-coordinating anions (NCAs) of the type, for example, described in EP 277 003 A1 and EP 277 004 A1. NCA may be added in the form of an ion pair using, for example, [DMAH]+[NCA]– in which the N,N-dimethylanilinium ("DMAH") cation reacts with a basic leaving group on the transition metal complex to form a transition metal complex cation and [NCA]–. The cation in the precursor may, alternatively, be trityl. Alternatively, the transition metal complex may be reacted with a neutral NCA precursor, such as $B(C_6F_5)_3$, which abstracts an anionic group from the complex to form an activated species. Useful activators include N,N-dimethylanilinium tetrakis (pentafluorophenyl)borate (i.e., $[PhNMe_2H]B(C_6F_5)_4$) and N,N-dimethylanilinium tetrakis (heptafluoronaphthyl) borate, where Ph is phenyl, and Me is methyl.

Additionally activators useful herein include those described in U.S. Pat. No. 7,247,687 at column 169, line 50 to column 174, line 43, particularly column 172, line 24 to column 173, line 53.

In an embodiment of the present disclosure, the non-coordinating anion activator is represented by the following formula (1):

$$(Z)^{d+}(A^{d-}) \tag{1}$$

wherein Z is (L-H) or a reducible Lewis acid, L is a neutral Lewis base, H is hydrogen and $(L-H)^+$ is a Bronsted acid; $A^{d-}$ is a non-coordinating anion having the charge d–; and d is an integer from 1 to 3.

When Z is (L-H) such that the cation component is $(L-H)^{d+}$, the cation component may include Bronsted acids such as protonated Lewis bases capable of protonating a moiety, such as an alkyl or aryl, from the catalyst precursor, resulting in a cationic transition metal species, or the activating cation $(L-H)^{d+}$ is a Bronsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, it may be represented by the formula: $(Ar_3C+)$, where Ar is aryl or aryl substituted with a heteroatom, or a $C_1$ to $C_{40}$ hydrocarbyl, the reducible Lewis acid may be represented by the formula: $(Ph_3C+)$, where Ph is phenyl or phenyl substituted with a heteroatom, and/or a $C_1$ to $C_{40}$ hydrocarbyl. In an embodiment, the reducible Lewis acid is triphenyl carbenium.

Embodiments of the anion component $A^{d-}$ include those having the formula $[M^k+Q^n]^{d-}$ wherein k is 1, 2, or 3; n is 1, 2, 3, 4, 5 or 6, or 3, 4, 5 or 6; n–k=d; M is an element selected from Group 13 of the Periodic Table of the Elements, or boron or aluminum, and Q is independently a hydride, bridged or unbridged dialkylamido, halide, alkoxide, aryloxide, hydrocarbyl radicals, the Q having up to 20 carbon atoms with the proviso that in not more than one occurrence is Q a halide, and two Q groups may form a ring structure. Each Q may be a fluorinated hydrocarbyl radical having 1 to 20 carbon atoms, or each Q is a fluorinated aryl radical, or each Q is a pentafluoryl aryl radical. Examples of suitable $A^{d-}$ components also include diboron compounds as disclosed in U.S. Pat. No. 5,447,895, which is fully incorporated herein by reference.

Illustrative examples of boron compounds which may be used as an activating cocatalyst are the compounds described as (and particularly those specifically listed as) activators in U.S. Pat. No. 8,658,556, which is incorporated by reference herein.

In an embodiment in any of the NCA's represented by Formula 1 described above, the anion component $A^{d-}$ is represented by the formula $[M^*k^*+Q^*n^*]d^*-$ wherein k* is 1, 2, or 3; n* is 1, 2, 3, 4, 5, or 6 (or 1, 2, 3, or 4); n*–k*=d*; M* is boron; and Q* is independently selected from hydride, bridged or unbridged dialkylamido, halogen, alkoxide, aryloxide, hydrocarbyl radicals, the Q* having up to 20 carbon atoms with the proviso that in not more than 1 occurrence is Q* a halogen.

The present disclosure also provides a method to polymerize olefins comprising contacting olefins (such as ethylene or propylene) with a catalyst complex as described above and an NCA activator represented by the Formula (2):

$$R_n M^{**}(ArNHal)^{4-n} \quad (2)$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula 2 also comprises a suitable cation that is essentially non-interfering with the ionic catalyst complexes formed with the transition metal compounds, or the cation is Zd+ as described above.

In an embodiment in any of the NCA's comprising an anion represented by Formula 2 described above, R is selected from the group consisting of $C_1$ to $C_{30}$ hydrocarbyl radicals. In an embodiment, $C_1$ to $C_{30}$ hydrocarbyl radicals may be substituted with one or more $C_1$ to $C_{20}$ hydrocarbyl radicals, halide, hydrocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyl radicals; —SRa, —NRa$_2$, and —PRa$_2$, where each Ra is independently a monovalent $C_4$ to $C_{20}$ hydrocarbyl radical comprising a molecular volume greater than or equal to the molecular volume of an isopropyl substitution or a $C_4$ to $C_{20}$ hydrocarbyl substituted organometalloid having a molecular volume greater than or equal to the molecular volume of an isopropyl substitution.

In an embodiment in any of the NCA's comprising an anion represented by Formula 2 described above, the NCA also comprises cation comprising a reducible Lewis acid represented by the formula: (Ar$_3$C+), where Ar is aryl or aryl substituted with a heteroatom, and/or a $C_1$ to $C_{40}$ hydrocarbyl, or the reducible Lewis acid represented by the formula: (Ph$_3$C+), where Ph is phenyl or phenyl substituted with one or more heteroatoms, and/or $C_1$ to $C_{40}$ hydrocarbyls.

In an embodiment in any of the NCA's comprising an anion represented by Formula 2 described above, the NCA may also comprise a cation represented by the formula, (L-H)$^{d+}$, wherein L is an neutral Lewis base; H is hydrogen; (L-H) is a Bronsted acid; and d is 1, 2, or 3, or (L-H)$^{d+}$ is a Bronsted acid selected from ammoniums, oxoniums, phosphoniums, siliyliums, and mixtures thereof.

Further examples of useful activators include those disclosed in U.S. Pat. Nos. 7,297,653 and 7,799,879, which are fully incorporated by reference herein.

In an embodiment, an activator useful herein comprises a salt of a cationic oxidizing agent and a noncoordinating, compatible anion represented by the Formula (3):

$$(OX^{e+})_d(A^{d-})_e \quad (3)$$

wherein $OX^{e+}$ is a cationic oxidizing agent having a charge of e+; e is 1, 2, or 3; d is 1, 2, or 3; and $A^{d-}$ is a non-coordinating anion having the charge of d– (as further described above). Examples of cationic oxidizing agents include: ferrocenium, hydrocarbyl-substituted ferrocenium, Ag+, or Pb$^{+2}$. Suitable embodiments of Ad– include tetrakis(pentafluorophenyl)borate.

Activators useful in catalyst systems herein include: trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, and the types disclosed in U.S. Pat. No. 7,297,653, which is fully incorporated by reference herein.

Particularly suitable activators include: N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph$_3$C+][B(C$_6$F$_5$)$_4$$^-$], [Me$_3$NH+][B(C$_6$F$_5$)$_4$$^-$]; 1-(4-(tris(pentafluorophenyl)borate)-2,3,5,6-tetrafluorophenyl)pyrrolidinium; and 4-(tris(pentafluorophenyl)borate)-2,3,5,6-tetrafluoropyridine.

In at least one embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

In at least one embodiment, an activator is one or more of: N,N-dimethylanilinium tetrakis(perfluorophenyl)borate; N,N-dimethylanilinium tetrakis(perfluoronaphthyl)borate; N,N-dimethylanilinium tetrakis(perfluorobiphenyl)borate; N,N-dimethylanilinium tetrakis(3,5-bis(trifluoromethyl)phenyl)borate; triphenylcarbenium tetrakis(perfluoronaphthyl)borate; triphenylcarbenium tetrakis(perfluorobiphenyl)borate; triphenylcarbenium tetrakis(3,5-bis(trifluoromethyl)phenyl)borate; triphenylcarbenium tetra(perfluorophenyl)borate; trimethylammonium tetrakis(perfluoronaphthyl)borate; triethylammonium tetrakis(perfluoronaphthyl)borate; tripropylammonium tetrakis(perfluoronaphthyl)borate; tri(n-butyl)ammonium tetrakis(perfluoronaphthyl)borate; tri(t-butyl)ammonium tetrakis(perfluoronaphthyl)borate; N,N-diethylanilinium tetrakis(perfluoronaphthyl)

borate; N,N-dimethyl-(2,4,6-trimethylanilinium) tetrakis(perfluoronaphthyl)borate; and tropillium tetrakis(perfluoronaphthyl)borate.

Bulky activators are also useful herein as NCAs. "Bulky activator" as used herein refers to anionic activators represented by the formula:

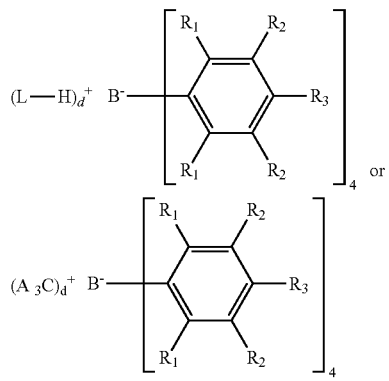

where:
each $R_1$ is, independently, a halide, preferably a fluoride;
Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring); and
L is an neutral Lewis base; (L-H)$^+$ is a Bronsted acid; d is 1, 2, or 3;
wherein the anion has a molecular weight of greater than 1020 g/mol;
wherein at least three of the substituents on the B atom each have a molecular volume of greater than 250 cubic Å, alternately greater than 300 cubic Å, or alternately greater than 500 cubic Å.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3 $V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators please see U.S. Pat. No. 8,658,556, which is incorporated by reference herein.

In at least one embodiment, two NCA activators may be used in the polymerization and the molar ratio of the first NCA activator to the second NCA activator can be any ratio. In at least one embodiment, the molar ratio of the first NCA activator to the second NCA activator is 0.01:1 to 10,000:1, or 0.1:1 to 1000:1, or 1:1 to 100:1.

In at least one embodiment, the NCA activator-to-catalyst ratio is a 1:1 molar ratio, or 0.1:1 to 100:1, or 0.5:1 to 200:1, or 1:1 to 500:1 or 1:1 to 1000:1. In at least one embodiment, the NCA activator-to-catalyst ratio is 0.5:1 to 10:1, or 1:1 to 5:1.

In at least one embodiment, the catalyst compounds can be combined with combinations of alumoxanes and NCA's (see for example, U.S. Pat. Nos. 5,153,157, 5,453,410, EP 0 573 120 B1, WO 94/07928, and WO 95/14044 which discuss the use of an alumoxane in combination with an ionizing activator, all of which are incorporated by reference herein).

In at least one embodiment, when an NCA (such as an ionic or neutral stoichiometric activator) is used, the catalyst-to-activator molar ratio is typically from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2.

Likewise, a co-activator, such as a group 1, 2, or 13 organometallic species (e.g., an alkyl aluminum compound such as tri-n-octyl aluminum), may be used in the catalyst system herein. The catalyst-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Support Materials

In embodiments herein, the catalyst system may comprise an inert support material. In at least one embodiment, the support material is a porous support material, for example, talc, or inorganic oxides. Other support materials include zeolites, clays, organoclays, or any other suitable organic or inorganic support material and the like, or mixtures thereof.

In at least one embodiment, the support material is an inorganic oxide. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, functionalized polyolefins, such as polyethylene. Supports include magnesia, titania, zirconia, montmorillonite, phyllosilicate, zeolites, talc, clays, and the like. Also, combinations of these support materials may be used, for example, silica-chromium, silica-alumina, silica-titania, and the like. Support materials include $Al_2O_3$, $ZrO_2$, $SiO_2$, $SiO_2/Al_2O_3$, $SiO_2/TiO_2$, silica clay, silicon oxide/clay, or mixtures thereof.

The support material, such as an inorganic oxide, can have a surface area in the range of from 10 to 700 $m^2/g$, pore volume in the range of from 0.1 to 4.0 cc/g and average particle size in the range of from 5 to 500 m. In at least one embodiment, the surface area of the support material is in the range of from 50 to 500 $m^2/g$, pore volume of from 0.5 to 3.5 cc/g and average particle size of from 10 to 200 m. In at least one embodiment, the surface area of the support material is in the range is from 100 to 400 $m^2/g$, pore volume from 0.8 to 3.0 cc/g and average particle size is from 5 to 100 m. The average pore size of the support material useful in the present disclosure is in the range of from 10 to 1000 Å, such as 50 to 500 Å, such as 75 to 350 Å. In some embodiments, the support material is a high surface area, amorphous silica (surface area=300 $m^2/gm$; pore volume of 1.65 $cm^3/gm$). Silicas are marketed under the tradenames of Davison 952 or Davison 955 by the Davison Chemical Division of W.R. Grace and Company. In other embodiments DAVISON 948 is used.

The support material should be dry, that is, substantially free of absorbed water. Drying of the support material can be effected by heating or calcining at 100° C. to 1000° C., such as at least about 600° C. When the support material is silica, it is heated to at least 200° C., such as 200° C. to 850° C., such as at about 600° C.; and for a time of 1 minute to about 100 hours, from 12 hours to 72 hours, or from 24 hours to 60 hours. The calcined support material should have at least some reactive hydroxyl (OH) groups to produce supported catalyst systems of the present disclosure. The calcined support material is then contacted with at least one polymerization catalyst comprising at least one catalyst compound and an activator.

The support material, having reactive surface groups, typically hydroxyl groups, is slurried in a non-polar solvent and the resulting slurry is contacted with a solution of a catalyst compound and an activator. In some embodiments, the slurry of the support material is first contacted with the activator for a period of time in the range of from 0.5 hours to 24 hours, from 2 hours to 16 hours, or from 4 hours to 8 hours. The solution of the catalyst compound is then contacted with the isolated support/activator. In some embodiments, the supported catalyst system is generated in situ. In at least one embodiment, the slurry of the support material is first contacted with the catalyst compound for a period of time in the range of from 0.5 hours to 24 hours, from 2 hours to 16 hours, or from 4 hours to 8 hours. The slurry of the supported catalyst compound is then contacted with the activator solution.

The mixture of the catalyst, activator and support is heated to 0° C. to 70° C., such as to 23° C. to 60° C., such as at room temperature. Contact times typically range from 0.5 hours to 24 hours, from 2 hours to 16 hours, or from 4 hours to 8 hours.

Suitable non-polar solvents are materials in which all of the reactants used herein, e.g., the activator, and the catalyst compound, are at least partially soluble and which are liquid at room temperature. Non-limiting example non-polar solvents are alkanes, such as isopentane, hexane, n-heptane, octane, nonane, and decane, cycloalkanes, such as cyclohexane, aromatics, such as benzene, toluene, and ethylbenzene.

In at least one embodiment, the support material comprises a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

The electron-withdrawing component used to treat the support material can be any component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, or any combination thereof, at least one embodiment of this disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof. In at least one embodiment, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, H+, [H(OEt$_2$)$_2$]+, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, typically a salt or an acid of an electron-withdrawing anion, can include gelling, co-gelling, impregnation of one compound onto another, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Polymerization Processes

In embodiments herein, the present disclosure provides polymerization processes where monomer (such as propylene or ethylene), and optionally comonomer, are contacted with a catalyst system comprising an activator and at least one catalyst compound, as described above. The catalyst compound and activator may be combined in any order, and are combined typically prior to contacting with the monomer.

In at least one embodiment, a polymerization process includes a) contacting one or more olefin monomers with a catalyst system comprising: i) an activator and ii) a catalyst compound of the present disclosure. The activator may be an alumoxane or a non-coordination anion activator. The one or more olefin monomers may be propylene and/or ethylene and the polymerization process further comprises heating the one or more olefin monomers and the catalyst system to 70° C. or more to form propylene polymers or ethylene polymers, preferably ethylene polymers.

Monomers useful herein include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer comprises ethylene and an optional comonomers comprising one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer comprises ethylene and an optional comonomers comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

In at least one embodiment, one or more dienes are present in the polymer produced herein at up to 10 wt %, such as at 0.00001 to 1.0 wt %, such as 0.002 to 0.5 wt %, such as 0.003 to 0.2 wt %, based upon the total weight of the composition. In some embodiments 500 ppm or less of diene is added to the polymerization, such as 400 ppm or less, such as 300 ppm or less. In other embodiments at least 50 ppm of diene is added to the polymerization, or 100 ppm or more, or 150 ppm or more.

Diene monomers include any hydrocarbon structure, such as $C_4$ to $C_{30}$, having at least two unsaturated bonds, wherein at least two of the unsaturated bonds are readily incorporated into a polymer by either a stereospecific or a non-stereospecific catalyst(s). The diene monomers can be selected from alpha, omega-diene monomers (i.e. di-vinyl monomers). The diolefin monomers are linear di-vinyl monomers, such as those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes and slurry processes can be performed. (A useful homogeneous polymerization process is one where at least 90 wt % of the product is soluble in the reaction media.) A bulk homogeneous process can be used. (A preferred bulk process is one where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In at least one embodiment, the process is a slurry polymerization process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$-$C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In at least one embodiment, the solvent is not aromatic, such that aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feedstream. The polymerization can be performed in a bulk process.

Polymerizations can be performed at any temperature and/or pressure suitable to obtain the desired polymers, such as ethylene and or propylene polymers. Typical temperatures and/or pressures include a temperature in the range of from 0° C. to 300° C., such as 20° C. to 200° C., such as 35° C. to 150° C., such as 40° C. to 120° C., such as 45° C. to 80° C., for example about 74° C., and at a pressure in the range of from 0.35 MPa to 10 MPa, such as 0.45 MPa to 6 MPa, such as 0.5 MPa to 4 MPa.

In a typical polymerization, the run time of the reaction is up to 300 minutes, such as in the range of from 5 to 250 minutes, such as 10 to 120 minutes.

In at least one embodiment, hydrogen is present in the polymerization reactor at a partial pressure of 0.001 to 50 psig (0.007 to 345 kPa), such as from 0.01 to 25 psig (0.07 to 172 kPa), such as 0.1 to 10 psig (0.7 to 70 kPa).

In at least one embodiment, the productivity of a catalyst of the present disclosure is from 500 gPgcat$^{-1}$hr$^{-1}$ to 20,000 gPgcat$^{-1}$hr$^{-1}$, such as from 2,000 gPgcat$^{-1}$hr$^{-1}$ to 15,000 gPgcat$^{-1}$hr$^{-1}$, such as from 4,000 gPgcat$^{-1}$hr$^{-1}$ to 14,000 gPgcat$^{-1}$hr$^{-1}$, such as from 6,000 gPgcat$^{-1}$hr$^{-1}$ to 13,000 gPgcat$^{-1}$hr$^{-1}$, such as from 8,000 gPgcat$^{-1}$hr$^{-1}$ to 12,000 gPgcat$^{-1}$hr$^{-1}$. In at least one embodiment, the activity of the catalyst is from 50 gP/mmolCat/hour to 40,000 gP/mmolCat/hr, such as from 500 gP/mmolCat/hr to 20,000 gP/mmolCat/hr, such as from 5,000 gP/mmolCat/hr to 15,000 gP/mmolCat/hr, such as about 10,000 gP/mmolCat/hr or more, such as 11,000 gP/mmolCat/hr or more. In at least one embodiment, the conversion of olefin monomer is at least 10%, based upon polymer yield and the weight of the monomer entering the reaction zone, such as 20% or more, such as 30% or more, such as 50% or more, such as 80% or more. In at least one embodiment, a catalyst of the present disclosure has an activity of from 150,000 to 300,000 gP/mmolCat/hour.

In at least one embodiment, a catalyst of the present disclosure is capable of producing ethylene polymers having an Mw from 40,000 to 1,500,000, such as from 70,000 to 1,000,000, such as from 90,000 to 1,000,000, such as from 100,000 to 600,000, such as from 100,000 to 300,000.

In at least one embodiment, a catalyst of the present disclosure is capable of producing ethylene polymers having an Mn from 5,000 to 1,000,000, such as from 20,000 to 60,000, such as from 20,000 to 70,000, such as from 10,000 to 80,000. In at least one embodiment, a catalyst of the present disclosure is capable of producing ethylene polymers having an Mw/Mn value from 1 to 10, such as from 3 to 9, such as from 4 to 8, such as from 5 to 8, such as from 2.5 to 8, for example about 3.5.

In at least one embodiment, for catalyst systems of the present disclosure comprising a catalyst of formula (I), formula (II), or formula (III) and one or more second catalysts (such as a metallocene catalyst), as described above, a polyethylene formed by the catalyst system can have an Mw/Mn value from 1 to 10, such as from 2 to 8, such as from 3 to 8.

In at least one embodiment, little or no alumoxane is used in the process to produce the polymers. Alumoxane can be present at zero mol %, alternatively the alumoxane is present at a molar ratio of aluminum to transition metal less than 500:1, such as less than 300:1, such as less than 100:1, such as less than 1:1.

In at least one embodiment, little or no scavenger is used in the process to produce the ethylene polymer. Scavenger (such as trialkyl aluminum) can be present at zero mol %, alternately the scavenger is present at a molar ratio of scavenger metal to transition metal of less than 100:1, such as less than 50:1, such as less than 15:1, such as less than 10:1.

In at least one embodiment, the polymerization: 1) is conducted at temperatures of 0 to 300° C. (such as 25 to 150° C., such as 40 to 120° C., such as 70 to 110° C.); 2) is conducted at a pressure of atmospheric pressure to 10 MPa (such as 0.35 to 10 MPa, such as from 0.45 to 6 MPa, such as from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, where aromatics are present in the solvent at less than 1 wt %, such as less than 0.5 wt %, such as at 0 wt % based upon the weight of the solvents); and 4) the productivity of the catalyst compound is at least 80,000 gP/mmolCat/hr (such as at least 150,000 gP/mmolCat/hr, such as at least 200,000 gP/mmolCat/hr, such as at least 250,000 gP/mmolCat/hr, such as at least 300,000 gP/mmolCat/hr). In at least one embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Useful chain transfer agents are typically alkylalumoxanes, a compound represented by the formula $AlR_3$, $ZnR_2$ (where each R is, independently, a $C_1$-$C_8$ aliphatic radical, such as methyl, ethyl, propyl, butyl, phenyl, hexyl octyl or an isomer thereof) or a combination thereof, such as diethyl zinc, methylalumoxane, trimethylaluminum, triisobutylaluminum, trioctylaluminum, or a combination thereof.

Polyolefin Products

The present disclosure also provides compositions of matter which can be produced by the methods described herein.

In at least one embodiment, the process described herein produces ethylene homopolymers or ethylene copolymers, such as propylene-ethylene and/or ethylene-alphaolefin (such as $C_4$ to $C_{20}$) copolymers (such as ethylene-hexene copolymers or ethylene-octene copolymers) having an Mw/Mn of greater than 1 to 4 (such as greater than 1 to 3).

Likewise, the process of the present disclosure produces olefin polymers, such as polyethylene and polypropylene homopolymers and copolymers. In at least one embodiment, the polymers produced herein are homopolymers of ethylene or propylene, are copolymers of ethylene such as copolymer of ethylene having from 0 to 25 mol % (such as from 0.5 to 20 mol %, such as from 1 to 15 mol %, such as from 3 to 10 mol %) of one or more $C_3$ to $C_{20}$ olefin comonomer (such as $C_3$ to $C_{12}$ alpha-olefin, such as propylene, butene, hexene, octene, decene, dodecene, such as propylene, butene, hexene, octene), or are copolymers of propylene such as copolymers of propylene having from 0 to 25 mol % (such as from 0.5 to 20 mol %, such as from 1 to 15 mol %, such as from 3 to 10 mol %) of one or more of $C_2$ or $C_4$ to $C_{20}$ olefin comonomer (such as ethylene or $C_4$ to $C_{12}$ alpha-olefin, such as butene, hexene, octene, decene, dodecene, such as ethylene, butene, hexene, octene).

In at least one embodiment, the monomer is ethylene and the comonomer is hexene, at a comonomer content of from 1 wt % to 18 wt % hexene, such as from 5 wt % to 15 wt %, such as from 8 wt % to 13 wt %, such as from 9 wt % to 12 wt %, for example about 11 wt %.

In at least one embodiment, a polymer, such as polyethylene, has an Mw (g/mol) from 40,000 to 1,500,000, such as from 100,000 to 1,000,000, such as from 150,000 to 1,000,000, such as from 200,000 to 600,000, such as from 200,000 to 300,000.

In at least one embodiment, a copolymer, such as polyethylene, has an Mn (g/mol) from 10,000 to 1,000,000, such as from 20,000 to 300,000, such as from 20,000 to 200,000, such as from 20,000 to 100,000. In at least one embodiment, a polymer, such as polyethylene, has an Mw/Mn value from 1 to 10, such as from 3 to 9, such as from 3 to 8, for example about 3.

Polymers produced herein typically have an Mz/Mw from 1 to 10, such as from 2 to 7, such as from 2 to 5, such as from 2 to 3. Polymers produced herein typically have an Mz/Mn from 1 to 10, such as from 2 to 6, such as from 3 to 5.

Mz/Mn is an indicator of the viscosity of a polymer. For example, a high Mz/Mn value tends to indicate a low viscosity whereas a low Mz/Mn value tends to indicate a high viscosity. Accordingly, a polymer with a larger Mz/Mn ratio would be expected to have a lower viscosity at high shear rates than a polymer with a similar weight average molecular weight but a smaller Mz/Mn ratio.

In at least one embodiment, a polymer of the present disclosure has a high degree of internal unsaturation. In at least one embodiment, a polymer has an internal unsaturation of less than 50% of the total unsaturations, such as less than 40%, preferably less than 30%. Polymers having a high degree of internal unsaturation can provide a low content of long chain branching, such as g'vis of 0.95 or more. Internal unsaturation can disrupt the crystallization of ethylene chains and contribute to the amorphous phase of the PE resin which may contribute to stronger mechanical properties in the film.

Polymers of the present disclosure can have a high degree of terminal unsaturation, e.g. vinylogous end groups. In at least one embodiment, a polymer has a terminal unsaturation of 0.1% to 20% or more of the total unsaturations, such as from 1% to 15%, such as 3% to 8%, for example about 5%. Terminal unsaturation can provide reactive end groups of polymers for functionalization.

In at least one embodiment, a polymer of the present disclosure has a combination of internal and terminal unsaturation of greater than 0.2 unsaturations per 1000 carbon atoms, such as greater than 0.3, preferably greater than 0.35.

In at least one embodiment, a polymer of the present disclosure has a ratio of internal unsaturation to terminal unsaturation of from 1 to 4, such as from 1 to 3, preferably from 1 to 2.

Unsaturation (internal and terminal) in a polymer can be determined by $^1$H NMR with reference to *Macromolecules*, 2014, 47, 3782 and *Macromolecules*, 2005, 38, 6988, but in event of conflict *Macromolecules*, 2014, 47, 3782 shall control. Peak assignments are determined referencing the solvent of tetrachloroethane-1,2 $d_2$ at 5.98 ppm. Specifically, percent internal unsaturation is determined by adding Vy1+Vy2+trisubstituted olefins then dividing by total unsaturation.

In at least one embodiment, a polymer of the present disclosure has a g'vis of greater than 0.9, such as greater than 0.92, preferably greater than 0.95.

In at least one embodiment, the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

In at least one embodiment, a bimodal polymer, such as a bimodal polyethylene (e.g., formed by a catalyst system having a catalyst represented by formula (I), (II), or (III) and a second catalyst) has an Mw/Mn value from 1 to 10, such as from 1.5 to 8, such as from 2 to 6, such as from 3 to 6.

In at least one embodiment, the polymer produced herein has a composition distribution breadth index (CDBI) of 50% or more, such as 60% or more, such as 70% or more. CDBI is a measure of the composition distribution of monomer within the polymer chains and is measured by the procedure described in PCT publication WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

In at least one embodiment, a polymer of the present disclosure has an iron content of from about 0.001 parts per million by weight (ppm) to about 10 ppm, such as from about 0.005 ppm to about 7 ppm, such as from about 0.01 ppm to about 5 ppm.

Preferably the copolymer of the resent disclosure has a reversed comonomer index.

The reversed-co-monomer index (RCI,m) is computed from x2 (mol % co-monomer $C_3$, $C_4$, $C_6$, $C_8$, etc.), as a function of molecular weight, where x2 is obtained from the following expression in which n is the number of carbon atoms in the comonomer (3 for $C_3$, 4 for $C_4$, 6 for $C_6$, etc.):

$$x2 = -\frac{200\ w2}{-100\ n - 2\ w2 + n\ w2}.$$

Then the molecular-weight distribution, W(z) where $z = \log_{10} M$, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W is renormalized so that $$1 = \int_{-\infty}^{\infty} W' dz$$

and a modified weight-average molecular weight ($M_w'$) is calculated over the effectively reduced range of molecular weights as follows:

$$M_w' = \int_{-\infty}^{\infty} 10^{z} * W' dz$$

The RCI,m is then computed as:

$$\text{RCI}, m = \int_{-\infty}^{\infty} x2(10^{z} - M_w') W' dz$$

A reversed-co-monomer index (RCI,w) is also defined on the basis of the weight fraction co-monomer signal (w2/100) and is computed as follows:

$$RCI, w = \int_{-\infty}^{\infty} \frac{w2}{100}(10^{z} - M_w') W' dz.$$

Note that in the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR\text{-}1, w = \frac{w2(Mz)}{w2(Mw)}$$

$$CDR\text{-}2, w = \frac{w2(Mz)}{w2\left(\frac{Mw + Mn}{2}\right)}$$

$$CDR\text{-}3, w = \frac{w2\left(\frac{Mz + Mw}{2}\right)}{w2\left(\frac{Mw + Mn}{2}\right)}$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as:

$$CDR\text{-}1, m = \frac{x2(Mz)}{x2(Mw)}$$

$$CDR\text{-}2, m = \frac{x2(Mz)}{x2\left(\frac{Mw + Mn}{2}\right)}$$

$$CDR\text{-}3, m = \frac{x2\left(\frac{Mz + Mw}{2}\right)}{x2\left(\frac{Mw + Mn}{2}\right)}$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

In at least one embodiment of the present disclosure, the polymer produced by the processes described herein includes ethylene and one or more comonomers and the polymer has: 1) an RCI,m of 30 or more (alternatively from 30 to 250).

Blends

In another embodiment, the polymer (preferably the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as polyethylene or polypropylene) is present in the above blends, at from 10 to 99 wt %, based upon the weight of the polymers in the blend, such as 20 to 95 wt %, such as at least 30 to 90 wt %, such as at least 40 to 90 wt %, such as at least 50 to 90 wt %, such as at least 60 to 90 wt %, such as at least 70 to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; and talc.

Films

One or more of the foregoing polymers, such as the foregoing polyethylenes or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, such as between 5 and 7, and in the Transverse Direction (TD) at a ratio of up to 15, such as 7 to 9. However, in at least one embodiment the film is oriented to the same extent in both the MD and TD directions.

The films may vary in thickness depending on the intended application; however, films of a thickness from 1 to 50 m are usually suitable. Films intended for packaging are usually from 10 to 50 m thick. The thickness of the sealing layer is typically 0.2 to 50 μm. There may be a sealing layer on both the inner and outer surfaces of the film or the sealing layer may be present on only the inner or the outer surface.

In at least one embodiment, one or more layers may be modified by corona treatment, electron beam irradiation, gamma irradiation, flame treatment, or microwave. In at least one embodiment, one or both of the surface layers is modified by corona treatment.

EXPERIMENTAL $^1$H NMR for Compound Characterization:

Chemical structures are determined by $^1$H NMR. $^1$H NMR data are collected at room temperature (e.g., 23° C.) in a 5 mm probe using either a 400 or 500 MHz Bruker spectrometer with deuterated solvent, such as deuterated methylene chloride or deuterated benzene.

All anhydrous solvents were purchased from Fisher Chemical and were degassed and dried over molecular sieves prior to use. Deuterated solvents were purchased from Cambridge Isotope Laboratories and dried over molecular sieves prior to use. Acetyl chloride, 3,5-bis(trifluoromethyl) benzoyl chloride, n-butyllithium, 2-chloro-4,6-dimethylaniline, 2,6-diisopropylaniline, pyridine, phosphorus pentachloride (PCl$_5$), potassium bis(trimethylsilyl)amide (KHMDS), 1,4,5,6-tetrahydropyrimidine and triethylamine (Et$_3$N) were purchased from Sigma-Aldrich and used as received. Iron(II) chloride was procured from Strem Chemicals and dried under vacuum prior to use. [N,N-1,3-Bis[1-(2,6-diisopropylphenylimino)-ethyl]-4,5,6-trihydropyrimid-2-ylidine] iron dichloride was synthesized according to literature (H. Z. Kaplan, B. Li, J. A. Byers, *Organometallics*, 2012, 31, 7343-7350; J. Al Thagfi, G. C. Lavoie, *Organometallics*, 2012, 31, 7351-7358). The $^1$H NMR measurements were recorded on a 400 MHz Bruker spectrometer.

EXAMPLES

| Catalyst | Structure | Name |
|---|---|---|
| 1 | (structure shown) | {N,N-1-[(3,5-bis(trifluoromethyl)phenyl)-N-(2-chloro-4,6-dimethylphenyl)]-3-[1-(2,6-diisopropylphenylimino)-ethyl]-4,5,6-trihydropyrimid-2-ylidine}iron dichloride |

| Catalyst | Structure | Name |
|---|---|---|
| C1 | 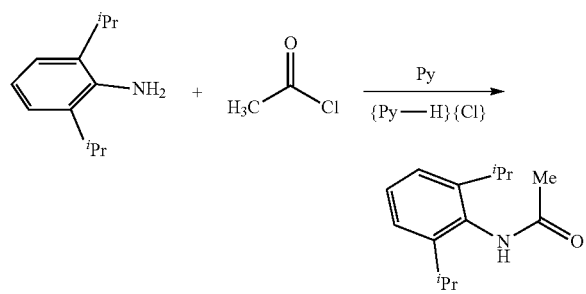 | [N,N-1,3-Bis[1-(2,6-diisopropylphenylimino)-ethyl]-4,5,6-trihydropyrimid-2-ylidine] iron dichloride |

Synthesis of Catalysts (and Catalyst Precursor Compounds)

Synthesis of N-(2,6-diisopropheylphenyl)acetamide

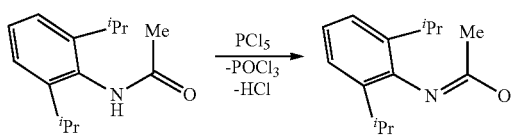 [SMILES: CC(=O)Nc1c(C(C)C)cccc1C(C)C ; "PCl5" ; "-POCl3-HCl" ; C/C(O)=N\c1c(C(C)C)cccc1C(C)C]

Neat acetyl chloride (8.855 g, 113 mmol) was added drop-wise to a pyridine (150 mL) solution of 2,6-diisopropyl aniline (20.0 g, 113 mmol) at −25° C. The resulting mixture was first gradually brought to room temperature and then refluxed for 3 hours. The reaction mixture was dried in vacuo to remove pyridine solvent. The crude materials were slurried in dichloromethane and washed with deionized water to remove pyridine hydrochloride salt. The dichloromethane layer was decanted and dried over magnesium sulphate, which was then filtered to remove the magnesium sulphate. Volatiles were removed in vacuo and the crude materials were re-dissolved in toluene and stored overnight at −25° C. to obtain highly crystalline colorless solid of N-(2,6-diisopropylphenyl)acetamide in 15.10 g (61.0%) yield. The $^1$H NMR spectrum further suggests that this compound has two structural isomers in a 2:1 ratio (see proton integral values). $^1$H NMR (400 MHz, $C_6D_6$): δ 1.14 ppm (2H, doublet ("d"), $^iPr-CH_3$), 1.18 ppm (8H, d, $^iPr-CH_3$), 1.22 ppm (2H, d, $^iPr-CH_3$), 1.73 ppm (1H, singlet ("s"), $CH_3$), 2.20 ppm (2H, s, $CH_3$), 3.06 ppm (1.3H, septet ("sept"), $^iPr-CH$), 3.18 ppm (0.7H, sept, $^iPr-CH$), 6.82 ppm (0.6H, broad singlet ("bs"), NH), 6.98 ppm (0.4H, broad singlet, NH), 7.17-7.20 ppm (1H, multiplet ("m"), Ar—CH), 7.25-7.34 ppm (2H, m, Ar—CH).

Synthesis of N-(2,6-diisopropylphenyl)acetimidoyl chloride

Neat N-(2,6-diisopropylphenyl)acetamide (14.89 g, 66 mmol) was dissolved in dry benzene and cooled to −25° C., to this solid $PCl_5$ (14.02 g, 67 mmol, 1.02 equ) was added slowly. The reaction mixture was gradually brought to room temperature and then heated at 60° C. for an hour. The reaction mixture solvents were removed in vacuo and the crude materials were vacuum distilled to obtain a colorless liquid of N-(2,6-diisopropylphenyl)acetimidoyl chloride in 14.10 g (89.8%) yield. Oil bath temperature was maintained at 110° C., the product distilled at 85° C. with 0.3-0.4 mbar vacuum. $^1$H NMR (400 MHz, $C_6D_6$): δ 1.24 ppm (12H, d, $^iPr-CH_3$), 2.23 ppm (3H, s, $CH_3$), 3.00 ppm (2H, sept, $^iPr-CH$), 7.17-7.24 ppm (3H, m, Ar—CH).

Synthesis of 1-[1-(2,6-diisopropylphenylimino) ethyl]-4,5,6-trihydropyrimidine

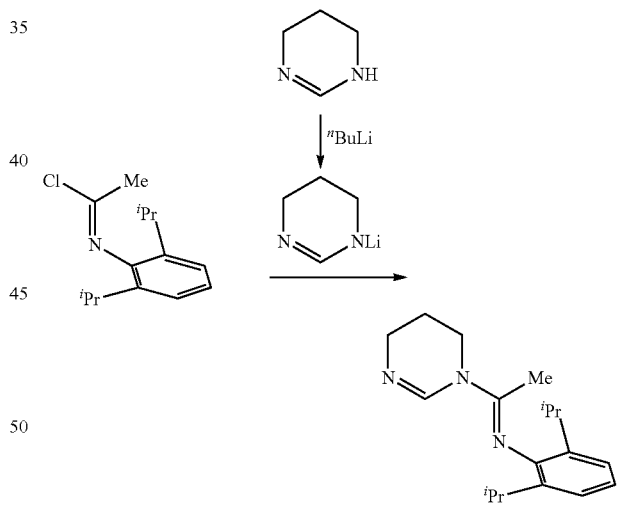

A solution of 1,4,5,6-tetrahydropyrimidine (0.71 g, 8.4 mmol) in THF was cooled to −25° C., and to this n-butyllithium (3.36 mL, 8.4 mmol, 2.5 M solution in hexane) was added drop-wise over a period of 5-10 minutes. As n-butyllithium addition progressed, a thick white precipitate was formed at first, and this mixture was stirred an additional two hours at room temperature to ensure completion of the deprotonation reaction. The mixture was again cooled to −25° C., and to this (E)-N-(2,6-diisopropylphenyl)acetimidoyl chloride in THF was added dropwise. The resulting mixture was stirred two hours at room temperature and solvents/volatiles were removed in vacuo. The crude materials were extracted into dichloromethane to remove byproduct LiCl and other insoluble materials. Solvent removal under reduced pressure resulted a colorless crystalline solid of the title compound in 2.7 g yield (112.5% due to some remaining solvent). $^1$H NMR (400 MHz, C$_6$D$_6$): δ 1.12 ppm (6H, d, $^i$Pr—CH$_3$), 1.17 ppm (6H, d, $^i$Pr—CH$_3$), 1.41 ppm (5H, bs, CH$_3$ and —CH$_2$), 2.81 ppm (2H, sept, $^i$Pr—CH), 3.32 ppm (2H, bs, —CH$_2$), 3.66 ppm (2H, bs, —CH$_2$), 7.07-7.17 ppm (3H, m, Ar—CH), 7.81 ppm (1H, bs, —CH).

Synthesis of N,N-1,3-Bis[1-(2,6-diisopropylphenylimino)-ethyl]-4,5,6-trihydropyrimidinium chloride

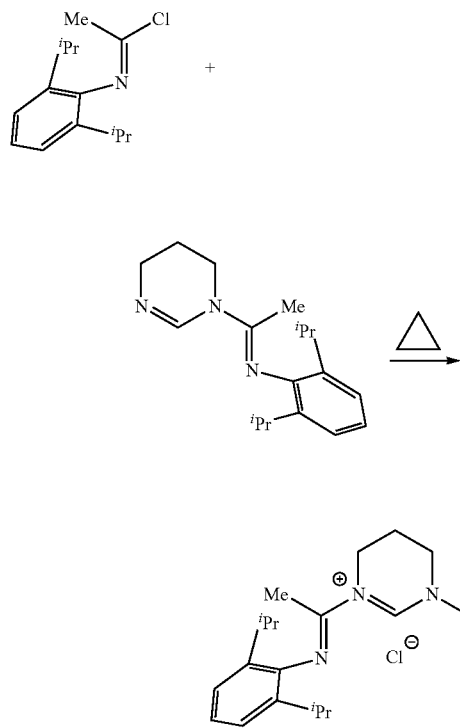

Solid 1-[1-(2,6-diisopropylphenylimino)ethyl]-4,5,6-trihydropyrimidine (2.76 g, 10.0 mmol) was dissolved in toluene and cooled to −25° C. To this solution, N-(2,6-diisopropylphenyl)acetimidoyl chloride (2.30 g, 10.0 mmol) in toluene was added. The reaction mixture was stirred at room temperature for an hour, and during this time colorless crystalline solid of title compound (N,N-1,3-Bis[1-(2,6-diisopropylphenylimino)-ethyl]-4,5,6-trihydropyrimidinium chloride) precipitated from solution. The product was filtered and washed with hexane to remove organic soluble impurities and unreacted starting materials to obtain spectroscopically pure N,N-1,3-Bis[1-(2,6-diisopropylphenylimino)-ethyl]-4,5,6-trihydropyrimidinium chloride as a colorless crystalline solid in 3.4 g (67.2%) yield. $^1$H NMR (400 MHz, CD$_2$Cl$_2$): δ 1.12 ppm (6H, d, $^i$Pr—CH$_3$), 1.19 ppm (6H, d, $^i$Pr—CH$_3$), 2.45 ppm (1H, m, —CH$_2$), 2.58 ppm (3H, s, CH$_3$), 2.77 ppm (2H, sept, $^i$Pr—CH), 4.30 ppm (2H, t, —CH$_2$), 7.10-7.18 ppm (3H, m, Ar—CH), 9.82 ppm (1H, s, —CH).

Synthesis of [N,N-1,3-Bis[1-(2,6-diisopropylphenylimino)-ethyl]-4,5,6-trihydropyrimid-2-ylidine] iron dichloride

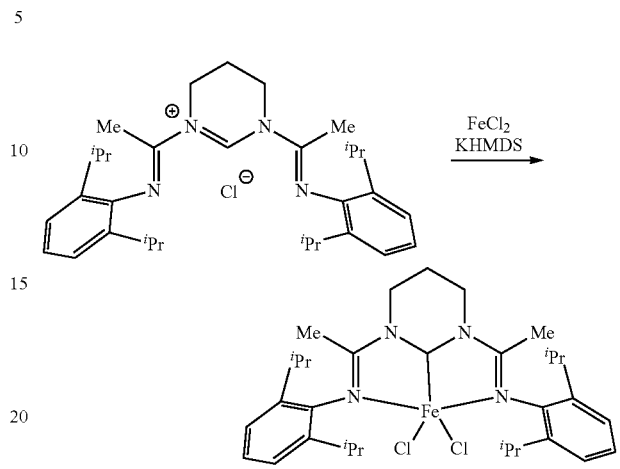

Solid FeCl$_2$ (0.24 g, 2.0 mmol) was slurried in THF and cooled to −25° C., followed by dropwise addition of a pre-cooled solution of KHMDS (0.38 g, 2.0 mmol) in THF. The resulting mixture was occasionally agitated over a time period of 3 hours. The mixture was then added to a pre-cooled THF solution of N,N-1,3-Bis[1-(2,6-diisopropylphenylimino)-ethyl]-4,5,6-trihydropyrimidinium chloride (1.0 g, 2.0 mmol), and stirred overnight at room temperature, and the reaction mixture was turned to a wine red color. The reaction mixture solvents were removed in vacuo and extracted into dichloromethane. The crude materials were finally washed with hexane to afford a burgundy red solid of title compound ([N,N-1,3-Bis[1-(2,6-diisopropylphenylimino)-ethyl]-4,5,6-trihydropyrimid-2-ylidine]iron dichloride) in 0.7 g (59.6%) yield. The dichloromethane dissolves the desired neutral Fe complexes, while remaining materials including by-products are insoluble. The title iron compound is insoluble in hexane. Thus, the title compound precipitates from the dichloromethane solution using hexane. $^1$H NMR spectrum of this compound displayed 8 broad resonances, suggested to be C$_2$ symmetric, paramagnetic Fe(II) complexes in solution. $^1$H NMR (400 MHz, CD$_2$Cl$_2$): δ −21.42 ppm, −10.8 ppm, −6.8 ppm, 1.2 ppm, 7.1 ppm, 11.0 ppm, 16.1 ppm (bs).

Synthesis of N-(2-chloro-4,6-dimethylphenyl)-3,5-bis(trifluoromethyl)benzamide

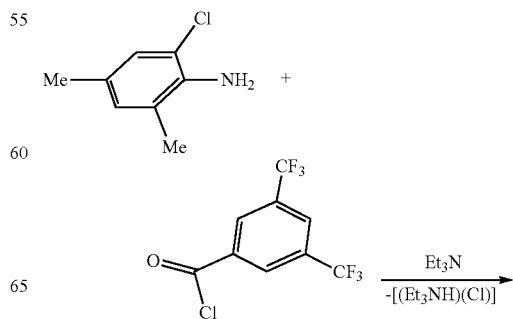

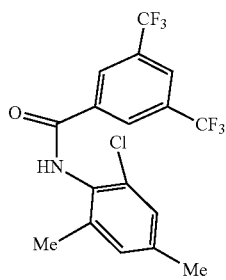

Neat 3,5-bis(trifluoromethyl)benzoyl chloride (2.516 g, 9.1 mmol) was added dropwise to a mixture of triethylamine (0.92 g, 9.1 mmol) and 2-chloro-4,6-dimethylaniline (1.416 g, 9.1 mmol) in dichloromethane at −25° C. The resulting mixture was first warmed to room temperature and then refluxed overnight. The reaction mixture solvents were removed in vacuo and dissolved in dichloromethane, and this mixture was then washed with deionized water. The organic layer (dichloromethane) was dried over magnesium sulphate, and the magnesium sulfate was then filtered, and the dichloromethane was removed in vacuo. The crude materials were again dissolved in toluene and stored at −25° C. Spectroscopically pure colorless crystalline materials of the title compound (N-(2-chloro-4,6-dimethylphenyl)-3,5-bis(trifluoromethyl)benzamide) were isolated in 3.6 g (54.7%) yield. $^1$H NMR (400 MHz, CDCl$_3$): δ 2.29 ppm (3H, s, CH$_3$), 2.34 ppm (3H, s, CH$_3$), 7.03 ppm (1H, s, Ar—CH), 7.15 ppm (1H, s, Ar—CH), 7.66 ppm (1H, s, —NH), 8.08 ppm (1H, s, Ar—CH), 8.38 ppm (2H, s, Ar—CH) ppm. $^{19}$F NMR (400 MHz, CDCl$_3$): δ −62.9 ppm (s).

Synthesis of N-(2-chloro-4,6-dimethylphenyl)-3,5-bis(trifluoromethyl)benzimidoyl chloride

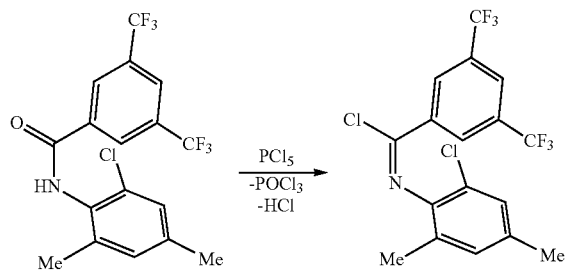

Neat N-(2-chloro-4,6-dimethylphenyl)-3,5-bis(trifluoromethyl)benzamide (1.97 g, 5.0 mmol) was slurried in dry toluene and cooled to −25° C., followed by addition of solid PCl$_5$ (1.037 g, 5.0 mmol) over a period of 5-10 minutes. Over the course of PCl$_5$ addition, HCl gas was evolved and the slurry gradually dissolved to become a clear yellow solution. The resulting mixture was stirred overnight at room temperature, after which solvents/volatiles were removed in vacuo. The crude materials were washed with cold pentane to remove organic soluble impurities to afford colorless crystalline materials of title compound in 1.6 g (77.6%) yield. There were no phosphorus impurities present in the final materials, which was confirmed by the absence of a phosphorus signal in the $^{31}$P NMR spectrum. $^1$H NMR (400 MHz, C$_6$D$_6$): δ 1.87 ppm (3H, s, CH$_3$), 1.94 ppm (3H, s, CH$_3$), 6.64 ppm (1H, s, Ar—CH), 7.00 ppm (1H, s, Ar—CH), 7.70 ppm (1H, s, Ar—CH), 8.51 ppm (2H, s, Ar—CH). $^{19}$F NMR (400 MHz, C$_6$D$_6$): δ −62.7 ppm (s).

Synthesis of 1-(3,5-bis(trifluoromethyl)phenyl)-N-(2-chloro-4,6-dimethylphenyl)-1-(5,6-dihydropyrimidin-1(4H)-yl)methanimine

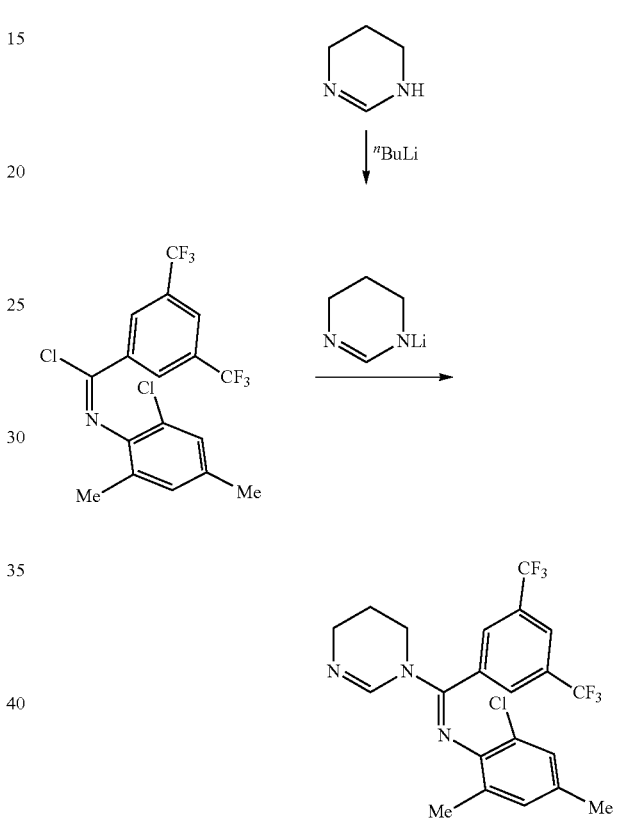

A solution of 1,4,5,6-tetrahydropyrimidine (0.156 g, 1.86 mmol) in THF was cooled to −25° C., followed by dropwise addition of a solution of n-butyllithium (0.74 mL, 1.86 mmol) over a period of 2-3 minutes. During this time, a thick white precipitate was formed. This mixture was stirred two hours at room temperature to ensure completion of ligand deprotonation reaction. The mixture was again cooled to −25° C., followed by dropwise addition of N-(2,6-diisopropylphenyl)acetimidoyl chloride (0.7 g, 1.69 mmol) in THF. The resulting mixture was stirred overnight at room temperature. Solvents were then removed in vacuo, and the dried material was extracted into dichloromethane. Solvent removal afforded the colorless crystalline solid of title compound in 0.85 g (52%) yield. $^1$H NMR (400 MHz, CD$_2$Cl$_2$): δ 1.81 (2H, bs, —CH$_2$), 2.06 (3H, bs, CH$_3$), 2.11 (3H, bs, CH$_3$), 3.47 (2H, bs, —CH$_2$), 3.95 (2H, bs, —CH$_2$), 6.75 (1H, s, Ar—CH), 6.83 (1H, s, Ar—CH), 7.29 (1H, bs, —CH), 7.72 (2H, bs, Ar—CH), 7.82 (1H, bs, Ar—CH) ppm. $^{19}$F NMR (400 MHz, CD$_2$Cl$_2$): 6−63.6 (s) ppm.

Synthesis of N,N-1-[(3,5-bis(trifluoromethyl)phenyl)-N-(2-chloro-4,6-dimethylphenyl)]-3-[1-(2,6-diisopropylphenylimino)-ethyl]-4,5,6-trihydropyrimidinium chloride Synthesis of {N,N-1-[(3,5-bis(trifluoromethyl)phenyl)-N-(2-chloro-4,6-dimethylphenyl)]-3-[1-(2,6-diisopropylphenylimino)-ethyl]-4,5,6-trihydropyrimid-2-ylidine}iron dichloride

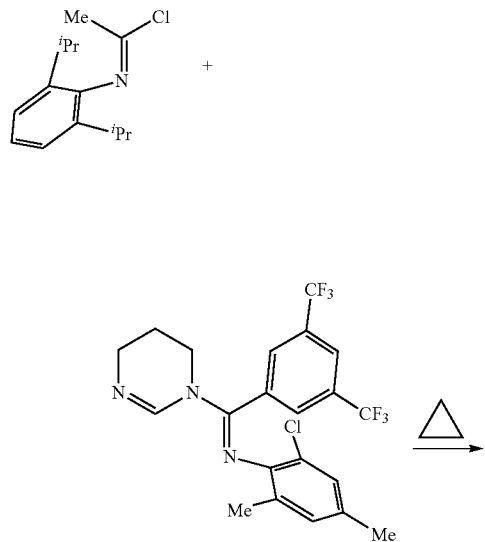

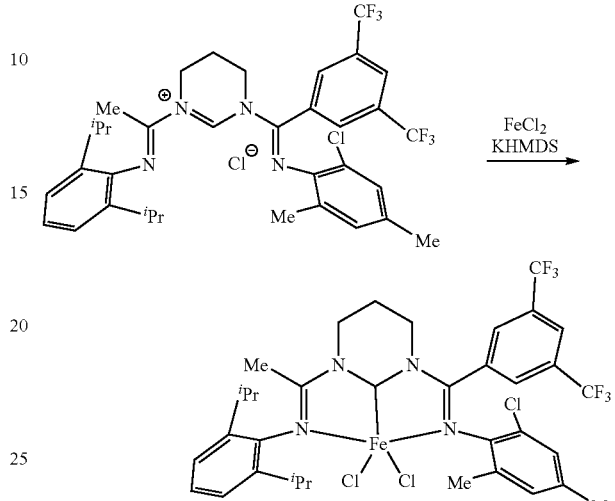

Solid 1-(3,5-bis(trifluoromethyl)phenyl)-N-(2-chloro-4,6-dimethylphenyl)-1-(5,6-dihydropyrimidin-1(4H)-yl)methanimine (0.38 g, 0.82 mmol) was dissolved in toluene and cooled to −25° C., followed by addition of N-(2,6-diisopropylphenyl)acetimidoyl chloride (0.196 g, 0.82 mmol) in toluene. The reaction mixture was gradually warmed to room temperature and then refluxed for 48 hours. Progress of the reaction was monitored by NMR spectroscopy ($^{19}$F and $^1$H). Volatiles/solvent from the reaction mixture were removed under vacuum and triturated with pentane. The product was then washed with cold pentane to remove of organic soluble impurities, filtered, and the product was dried under vacuum to obtain the colorless crystalline solid of title compound (N,N-1-[(3,5-bis(trifluoromethyl)phenyl)-N-(2-chloro-4,6-dimethylphenyl)]-3-[1-(2,6-diisopropylphenylimino)-ethyl]-4,5,6-trihydropyrimidinium chloride) in 0.35 g (61.1%) yield.

Solid FeCl$_2$ (0.07 g, 0.52 mmol) was slurried in THF and cooled to −25° C., followed by dropwise addition of KHMDS (0.11 g, 0.52 mmol) in THF. The resulting mixture was occasionally agitated for a time period of 3 hours. This mixture was added to a pre-cooled THF solution of a N,N-1-[(3,5-bis(trifluoromethyl)phenyl)-N-(2-chloro-4,6-dimethylphenyl)]-3-[1-(2,6-diisopropylphenylimino)-ethyl]-4,5,6-trihydropyrimidinium chloride (0.35 g, 0.52 mmol), and stirred overnight at room temperature, during which the reaction mixture turned a dark brown color. The reaction mixture solvents were removed in vacuo and extracted into dichloromethane. The crude materials were washed with hexane to afford a brown solid of title compound in 0.25 g (60.8%) yield. $^1$H NMR spectrum of {N,N-1-[(3,5-bis(trifluoromethyl)phenyl)-N-(2-chloro-4,6-dimethylphenyl)]-3-[1-(2,6-diisopropylphenylimino)-ethyl]-4,5,6-trihydropyrimid-2-ylidine}iron dichloride displayed very broad multiple resonances indicative of an asymmetric, paramagnetic Fe(II) complexes in solution.

Formation of Supported Catalysts

SMAO:

Methylalumoxane treated silica was prepared in a manner similar to the following: In a 4 L stirred vessel in a drybox methylalumoxane (MAO, 30 wt % in toluene, approx. 1000 grams) is added along with approx. 2000 g of toluene. This solution is then stirred at 60 RPM for 5 minutes. Next, approx. 800 grams of ES-70™ silica (PQ Corporation, Conshohocken, Pa.) that has been calcined at 875° C. (see below) is added to the vessel. This slurry is then heated at 100° C. and stirred at 120 RPM for 3 hours. The temperature is then reduced to 25° C. and cooled to temperature over 2 hours. Once cooled, the vessel is set to 8 RPM and placed under vacuum for 72 hours. After emptying the vessel and sieving the supported MAO, approximately 1100 g of supported MAO will be collected.

ES70™ silica that has been calcined at 875° C. is ES70™ silica that has been calcined at 880° C. for four hours after being ramped to 880° C. according to the following ramp rates:

| ° C.    | ° C./h | ° C. |
|---------|--------|------|
| ambient | 100    | 200  |
| 200     | 50     | 300  |
| 300     | 133    | 400  |
| 400     | 200    | 800  |
| 800     | 50     | 880  |

Supportation on SMAO
  Supported Catalyst 1:
  Catalyst 1 (0.0316 g, 40.0 mmol) was added to a slurry of 1.0 g SMAO in 10 mL toluene in a Celestir vessel. This slurry/mixture was stirred for about 3 hours and filtered, washed with toluene (1×10 mL) and then hexane (2×10 mL). The supported catalyst was then dried under vacuum overnight to obtain 0.90 g beige colored supported silica.
  Supported Catalyst C1:
  Catalyst C1 (0.0246 g, 40.0 mmol) was added to a slurry of 1.0 g SMAO in 10 mL toluene in a Celestir vessel. This slurry/mixture was stirred for about 3 hours and filtered, washed with toluene (1×10 mL) and then hexane (2×10 mL). The supported catalyst was then dried under vacuum overnight to obtain 0.91 g beige colored supported silica.
Polymerization
  A 2 L autoclave was heated to 110° C. and purged with $N_2$ for at least 30 minutes. It was then charged with dry NaCl (350 g; Fisher, S271-10 dehydrated at 180° C. and subjected to several pump/purge cycles and finally passed through a 16 mesh screen prior to use) and SMAO (5 g) at 105° C. and stirred for 30 minutes. The temperature was adjusted to 85° C. At a pressure of 2 psig $N_2$, dry, degassed 1-hexene was added to the reactor with a syringe then the reactor was charged with $N_2$ to a pressure of 20 psig. A mixture of $H_2$ and $N_2$ was flowed into reactor (10% $H_2$ in $N_2$) while stirring the bed. Precharges of $H_2$ and 1-hexene as well as flow ratios of each to ethylene, were as follows: 120 (ml) hydrogen, 1-hexene 2.5 ml.
  Thereafter, Supported Catalyst 1 or Supported Catalyst C1 was injected into the reactor with ethylene at a pressure of 220 psig; ethylene flow was allowed over the course of the run to maintain constant pressure in the reactor. 1-hexene was fed into the reactor as a ratio to ethylene flow (0.1 g/g). Hydrogen was fed to the reactor as a ratio to ethylene flow (0.5 mg/g). The hydrogen and ethylene ratios were measured by on-line GC analysis. Polymerizations were halted after 1 hour by venting the reactor, cooling to room temperature then exposing to air. The salt was removed by washing with water two times; the polymer was isolated by filtration, briefly washed with acetone and dried in air for at least two days.
NMR Spectroscopy of Polymer Samples
  $^1$H NMR data was collected at 393K in a 10 mm probe using a Bruker spectrometer with a $^1$H frequency of at least 400 MHz (available from Agilent Technologies, Santa Clara, Calif.). Data was recorded using a maximum pulse width of 45°, 5 seconds between pulses and signal averaging 512 transients. Spectral signals were integrated and the number of unsaturation types per 1000 carbons was calculated by multiplying the different groups by 1000 and dividing the result by the total number of carbons. The number average molecular weight (Mn) was calculated by dividing the total number of unsaturated species into 14,000, and is reported in units of g/mol.
GPC 4D Procedure: Molecular Weight, Comonomer Composition and Long Chain Branching Determination by GPC-IR Hyphenated with Multiple Detectors
  Unless otherwise indicated, the distribution and the moments of molecular weight (Mw, Mn, Mw/Mn, etc.), the comonomer content ($C_2$, $C_3$, $C_6$, etc.) and the branching index (g'vis) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1} \log M_{PS}$$

where the variables with subscript "PS" stand for polystyrene while those without a subscript are for the test samples. In this method, $\alpha_{PS}$=0.67 and $K_{PS}$=0.000175 while a and K are for other materials as calculated and published in literature (Sun, T. et al. *Macromolecules*, 2001, 34, 6812), except that for purposes of the present disclosure, α=0.695 and K=0.000579 for linear ethylene polymers, α=0.705 and K=0.0002288 for linear propylene polymers, α=0.695 and K=0.000181 for linear butene polymers, a is 0.695 and K is 0.000579*(1-0.0087*w2b+0.000018*(w2b)^2) for ethylene-butene copolymer where w2b is a bulk weight percent of butene comonomer, a is 0.695 and K is 0.000579*(1-0.0075*w2b) for ethylene-hexene copolymer where w2b is a bulk weight percent of hexene comonomer, and α is 0.695 and K is 0.000579*(1-0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3/1000TC$) as a function of molecular weight. The short-chain branch (SCB) content per 1000TC (SCB/1000TC) is then computed as a function of molecular weight by applying a chain-end correction to the $CH_3/1000TC$ function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$$w2 = f*SCB/1000TC.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained.

$$\text{Bulk IR ratio} = \frac{\text{Area of } CH_3 \text{ signal within integration limits}}{\text{Area of } CH_2 \text{ signal within integration limits}}$$

Then the same calibration of the $CH_3$ and $CH_2$ signal ratio, as mentioned previously in obtaining the $CH_3/1000TC$ as a function of molecular weight, is applied to obtain the bulk $CH_3/1000TC$. A bulk methyl chain ends per 1000TC (bulk $CH_3$end/1000TC) is obtained by weight-averaging the chain-end correction over the molecular-weight range. Then $$w2b = f*\text{bulk } CH_3/1000TC$$

$$\text{bulk } SCB/1000TC = \text{bulk } CH_3/1000TC - \text{bulk } CH3\text{end}/1000TC$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation [η]=$\eta_S$/c, where c is concentration and is determined from the IR5 broadband channel output. The viscosity MW at each point is calculated as $M=K_{PS}M^{\alpha_{PS}+1}/[\eta]$, where $\alpha_{PS}$ is 0.67 and $K_{PS}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromatographic slices, i, between the integration limits. The branching index $g'_{vis}$ defined as $$g'_{vis} = \frac{[\eta]_{avg}}{KM_v^\alpha},$$

where $M_V$ is the viscosity-average molecular weight based on molecular weights determined by LS analysis and the K and α are for the reference linear polymer, which are, for purposes of the present disclosure, α=0.695 and K=0.000579 for linear ethylene polymers, α=0.705 and K=0.0002288 for linear propylene polymers, α=0.695 and K=0.000181 for linear butene polymers, a is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted. Calculation of the w2b values is as discussed above.

All molecular weights are reported in g/mol unless otherwise noted.

Table 1 illustrates data of ethylene hexene copolymer formed by the catalyst systems containing catalyst C1 or 1. As shown in Table 1, the ethylene hexene copolymers formed by the catalyst systems having Catalyst C1 or 1 both produce highly linear polymers with high comonomer content. However, the ethylene hexene copolymer formed by the catalyst system having Catalyst 1 has a much higher Mw value and higher Mw/Mn value. Furthermore, Catalyst 1 has a higher productivity than Catalyst C1, with yields of the polymerizations being 28 g versus 2.5 g, respectively.

TABLE 1

| Catalyst | Yield (g) | Supported Cat. mgs | Prod. gPol./g support cat. | Mw (g/mol) | Mn (g/Mol) | g' vis |
|---|---|---|---|---|---|---|
| C1 | 5.6 | 12.5 | 448 | | | |
| 1 | 16.6 | 22.5 | 747 | | | |
| 1 | 28 | 52.8 | 530 | 130,675 | 34,150 | 1.00 |

| Catalyst | Mz (g/mol) | Mw/Mn | Hexene wt % |
|---|---|---|---|
| C1 | | | |
| 1 | | | |
| 1 | 546589 | 3.83 | 11.35 |

The FIGURE is a GPC spectrum of the ethylene hexene copolymer formed by the catalyst system containing catalyst 1. As shown in the FIGURE, comonomer content ranges from about 8 wt % to about 14 wt %, with an average of 12 wt %. The comonomer content line has a positive slope indicative of broad orthogonal composition distribution in which the comonomer is incorporated predominantly in the high molecular weight chains which can provide improved physical properties, for example toughness properties and environmental stress crack resistance (ESCR).

$^1$H NMR PE Unsaturation Analysis:

The polyolefins tested are unique with respect to higher levels of internal unsaturation structures, which even exceeds the amount of end groups previously thought possible for a polymer. Unsaturation along the chain provides a disruption in lamella crystals leading to an increased amorphous phase and thus can affect polymer properties. Also, the unsaturation moieties can optionally be used in later chemical transformations/functionalization. Without being bound by theory, a possible internal unsaturation structure formation mechanism is disclosed at *Macromolecules*, 2005, 38, 6988, where internal vinylenes have been proposed to occur through the following mechanism:

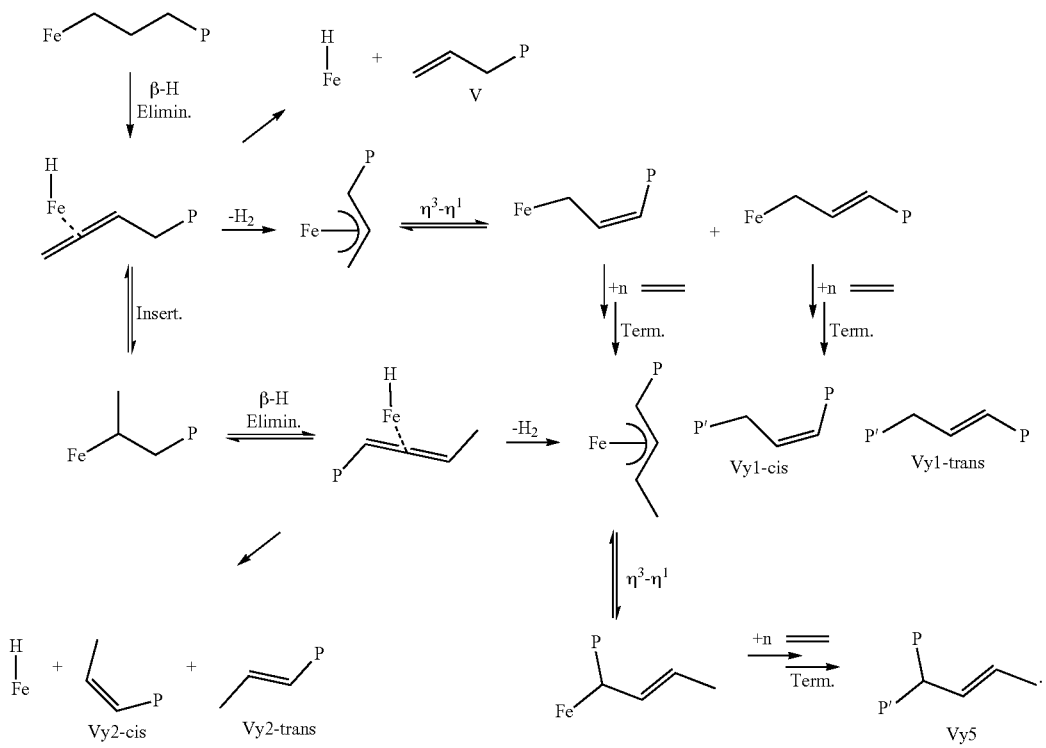

Trisubstituted olefins have been proposed to occur through the following mechanism:

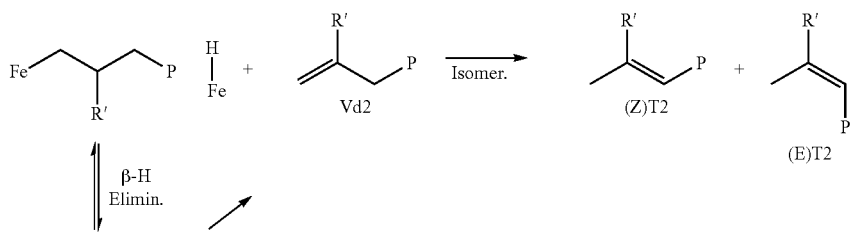

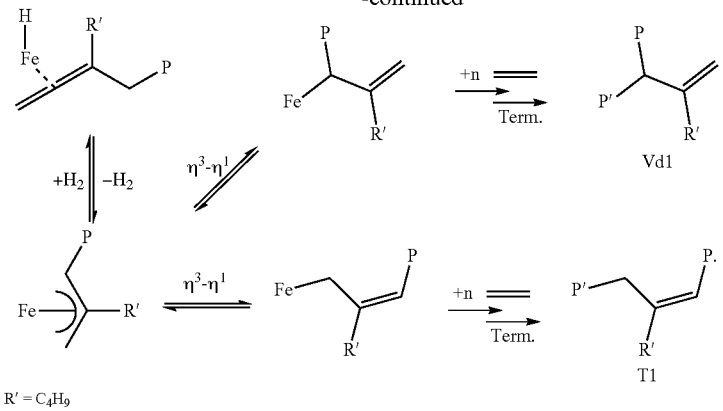

R' = C₄H₉

As noted above, for purposes of the present disclosure, unsaturations in a polymer and specifically percent internal unsaturation are determined by ¹H NMR with reference to: *Macromolecules*, 2005, 38, 6988 and *Macromolecules*, 2014, 47, 3782 (both incorporated by reference herein), including the NMR peak assignments used therein. (In the event of conflict *Macromolecules*, 2014, 47, 3782 shall control.) NMR peak assignments are determined referencing the solvent of tetrachloroethane-1,2 d₂ at 5.98 ppm. Specifically, percent internal unsaturation is determined by adding Vy1+Vy2+trisubstituted olefins then dividing by total unsaturation. For Example, for polymer 7.1 in Table 2 (of *Macromolecules*, 2014, 47, 3782), the percent internal unsaturation is [(0.17+0.07)/0.39]×100=61.5. Thus, the polymer produced in Example 7.1 has an internal unsaturation of 61.5%.

Table 2 illustrates unsaturation data of ethylene hexene copolymer formed by the catalyst system having catalyst 1. As shown in Table 2, the polymer has a high internal unsaturation of 0.24 per 1,000 carbons as measured by ¹H NMR.

TABLE 2

| Catalyst System | 1 |
| --- | --- |
| Vy1 and Vy2 (I) | 0.17 |
| Vy5 (T) | 0.07 |
| T1-Tri-substituted olefins (I) | 0.07 |
| Vinyls (T) | 0.05 |
| Vinylidenes (T) | 0.03 |
| Total internal unsaturations per 1000 C | 0.24 |
| Total unsaturation per 1000 C | 0.39 |

Overall, catalysts, catalyst systems, and methods of the present disclosure can provide catalyst productivity values of 500 gPgcat⁻¹hr⁻¹ or greater and polyolefins, such as polyethylene copolymers, having comonomer content of 8 wt % or greater, a g' vis value of 0.95 or greater, internal unsaturation content great than 0.2 unsaturations per 1,000 carbons or greater, broad orthogonal composition distribution, an Mn of 20,000 or greater, Mw of 200,000 or greater, and an Mz/Mw from 2 to 5 or greater.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A catalyst compound represented by Formula (II):

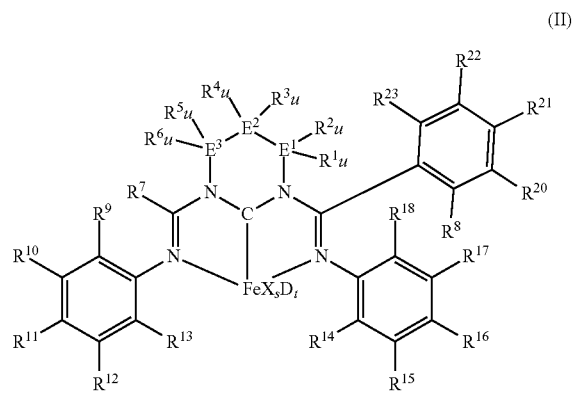

(II)

wherein:

each of $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{20}$, $R^{21}$, $R^{22}$, and $R^{23}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, alkylaryl wherein alkyl has from 1 to 10 carbon atoms and aryl has from 6 to 20 carbon atoms, —NR'₂, —OR', halogen, —NO₂, —SiR"₃ or five-, six-, or seven-membered heterocyclyl comprising at least one atom selected from N, P, O, and S; wherein $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{20}$, $R^{21}$, $R^{22}$, and $R^{23}$ are optionally substituted by halogen, —NO₂, —CF₃, —CF₂CF₃, —$CH_2CF_3$, —$NR'_2$, —OR', or —$SiR''_3$, wherein each R' is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —$SiR''_3$, wherein R' is optionally substituted by halogen, or two R' radicals optionally bond to form a five- or six-membered ring, wherein each R" is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two R" radicals optionally bond to form a five- or six-membered ring;

$R^7$ is hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or five-, six- or seven-membered heterocyclyl comprising at least one atom selected from N, P, O, and S; wherein $R^7$ is optionally substituted by halogen, —$NR'_2$, —OR', or —$SiR''_3$, or $R^7$ optionally bonds with $R^5$ or $R^6$ to independently form a five-, six-, or seven-membered ring;

each of $E^1$, $E^2$, and $E^3$ is independently carbon, nitrogen or phosphorus;

u is 1 for $R^1u$ and $R^2u$ if $E^1$ is carbon, u is 1 for $R^3u$ and $R^4u$ if $E^2$ is carbon, and u is 1 for $R^5u$ and $R^6u$ if $E^3$ is carbon;

u is 0 for $R^2u$ and 1 for $R^1u$ if $E^1$ is nitrogen or phosphorus, u is 0 for $R^4u$ and 1 for $R^3u$ if $E^2$ is nitrogen or phosphorus, and u is 0 for $R^6u$ and 1 for $R^5u$ if $E^3$ is nitrogen or phosphorus;

each X is independently fluorine, chlorine, bromine, iodine, hydrogen, $C_1$-$C_{20}$-alkyl, $C_2$-$C_{10}$-alkenyl, $C_6$-$C_{20}$-aryl, arylalkyl where alkyl has from 1 to 10 carbon atoms and aryl has from 6 to 20 carbon atoms, —$NR'''_2$, —OR''', —SR''', —$SO_3R''$—$OC(O)R'''$, —CN, —SCN, β-diketonate, —CO, —$BF_4^-$, —$PF_6^-$ or bulky non-coordinating anions, or the radicals X are bonded with one another, wherein each R''' is independently hydrogen, $C_1$-$C_{20}$-alkyl, $C_2$-$C_{20}$-alkenyl, $C_6$-$C_{20}$-aryl, arylalkyl where alkyl has from 1 to 10 carbon atoms and aryl has from 6 to 20 carbon atoms, or —$SiR''''_3$, wherein R''' can be substituted by halogen or nitrogen- or oxygen-containing groups or two R'''' radicals optionally bond to form a five- or six-membered ring, each R'''' is independently hydrogen, $C_1$-$C_{20}$-alkyl, $C_2$-$C_{20}$-alkenyl, $C_6$-$C_{20}$-aryl or arylalkyl where alkyl has from 1 to 10 carbon atoms and aryl has from 6 to 20 carbon atoms, wherein R'''' can be substituted by halogen or nitrogen- or oxygen-containing groups or two R'''' radicals optionally bond to form a five- or six-membered ring;

s is 1, 2, or 3;

D is a neutral donor; and t is 0, 1, or 2.

2. The catalyst compound of claim 1, wherein each of $E^1$, $E^2$, and $E^3$ is carbon, u is 1 for $R^1u$, $R^2u$, $R^3u$, $R^4u$, $R^5u$, and $R^6u$; and each of $R^1$, $R^2$, $R^3$, $R^4$, $R^5$, and $R^6$ is hydrogen.

3. The catalyst compound of claim 1, wherein each X is independently fluorine, chlorine, bromine, iodine, or $C_1$-$C_{20}$-alkyl.

4. The catalyst compound of claim 1, wherein t is 0.

5. The catalyst compound of claim 1, wherein each of $R^9$, $R^{10}$, $R^{11}$, $R^{12}$, and $R^{13}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or alkylaryl wherein alkyl has from 1 to 10 carbon atoms and aryl has from 6 to 20 carbon atoms, and $R^9$, $R^{10}$, $R^{11}$, $R^{12}$, and $R^{13}$ are optionally substituted by —$NR'_2$, —OR', or $SiR''_3$, wherein each R' is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or $SiR''_3$, wherein R' is optionally substituted by halogen, or two R' radicals optionally bond to form a five- or six-membered ring, wherein each R" is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two R" radicals optionally bond to form a five- or six-membered ring.

6. The catalyst compound of claim 1, wherein $R^7$ is substituted phenyl, unsubstituted phenyl, or $C_1$-$C_{10}$-alkyl.

7. The catalyst compound of claim 6, wherein $R^7$ is methyl.

8. The catalyst compound of claim 1, wherein $R^7$ is substituted phenyl represented by the structure:

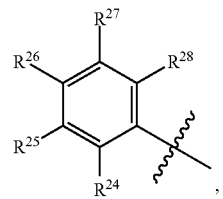

wherein each of $R^{24}$, $R^{25}$, $R^{26}$, $R^{27}$, and $R^{28}$ is independently hydrogen, $C_1$-$C_{10}$-alkyl, —OR', wherein R' is hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or —$SiR''_3$, wherein R' is optionally substituted by halogen, or two R' radicals optionally bond to form a five- or six-membered ring, wherein each R" is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or two R" radicals optionally bond to form a five- or six-membered ring.

9. The catalyst compound of claim 8, wherein each of $R^{24}$, $R^{25}$, $R^{26}$, $R^{27}$, and $R^{28}$ is independently hydrogen or $C_1$-$C_{10}$-alkyl.

10. The catalyst compound of claim 1, wherein each of $R^8$, $R^{14}$, $R^{15}$, $R^{16}$, $R^{17}$, $R^{18}$, $R^{20}$, $R^{21}$, $R^{22}$, and $R^{23}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, alkylaryl wherein alkyl has from 1 to 10 carbon atoms and aryl has from 6 to 20 carbon atoms, —$NR'_2$, —OR', halogen, —$NO_2$, —$SiR''_3$ or five-, six-, or seven-membered heterocyclyl comprising at least one atom selected from N, P, O, and S.

11. The catalyst compound of claim 10, wherein each of $R^8$, $R^{14}$, $R^{15}$, $R^{16}$, $R^{17}$, $R^{18}$, $R^{20}$, $R^{21}$, $R^{22}$, and $R^{23}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or alkylaryl wherein alkyl has from 1 to 10 carbon atoms and aryl has from 6 to 20 carbon atoms, wherein at least one of $R^8$, $R^{14}$, $R^{15}$, $R^{16}$, $R^{17}$, $R^{18}$, $R^{20}$, $R^{21}$, $R^{22}$, and $R^{23}$ is substituted by —$NO_2$, —$CF_3$, —$CF_2CF_3$, —$CH_2CF_3$, halogen, —$NR'_2$, —OR', or —$SiR''3$.

12. The catalyst compound of claim 10, wherein $R^8$, $R^{14}$, $R^{15}$, $R^{16}$, $R^{17}$, $R^{18}$, $R^{20}$, $R^{21}$, $R^{22}$, and $R^{23}$ is independently halogen, hydrogen, or $C_1$-$C_{22}$-alkyl, wherein $C_1$-$C_{22}$-alkyl is substituted with one or more halogen atoms.

13. The catalyst compound of claim 10, wherein each of $R^8$, $R^{20}$, $R^{21}$, $R^{22}$, and $R^{23}$ is halogen or trihalomethyl and each of $R^{14}$, $R^{15}$, $R^{16}$, $R^{17}$, and $R^{18}$ is hydrogen, $C_1$-$C_{10}$ alkyl, or halogen.

14. The catalyst compound of claim 10, wherein at least one of $R^8$, $R^{20}$, $R^{21}$, $R^{22}$, and $R^{23}$ is halogen or trihalomethyl and at least one of $R^{14}$, $R^{15}$, $R^{16}$, $R^{17}$, and $R^{18}$ is $C_1$-$C_{10}$ alkyl or halogen.

15. The catalyst compound of claim 1, wherein the catalyst compound is one or more of:

1
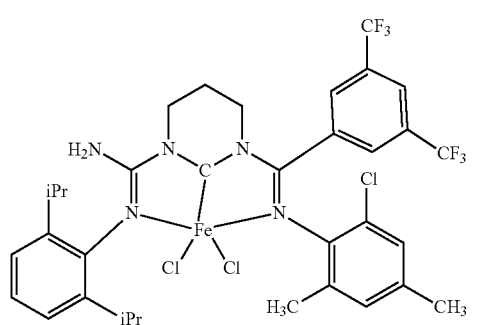

2
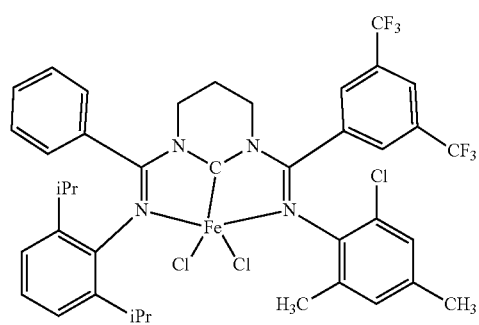

3
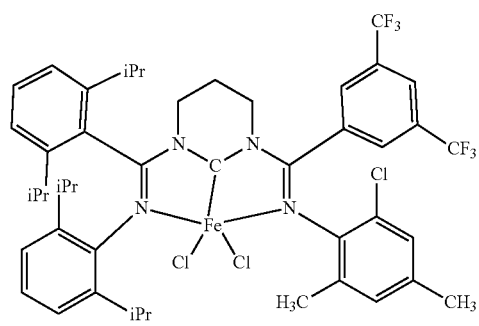

4
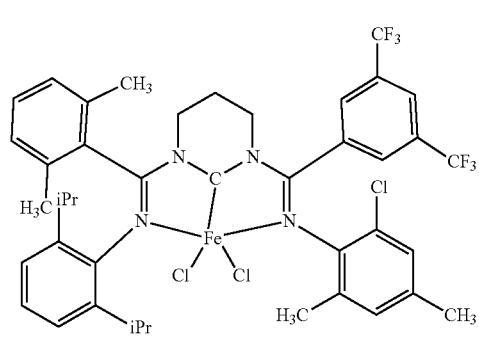

-continued

5
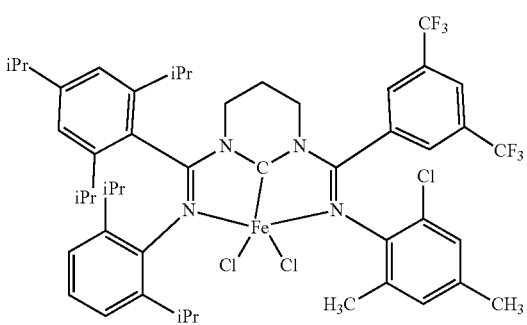

6
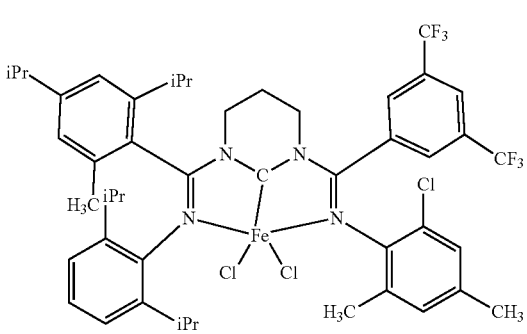

7
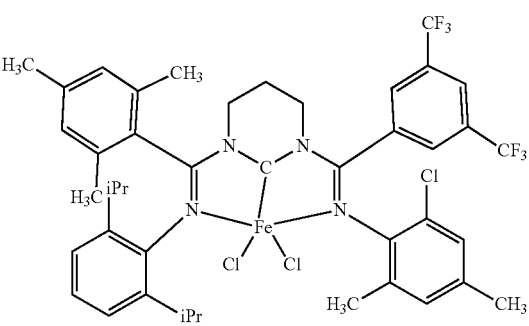

8
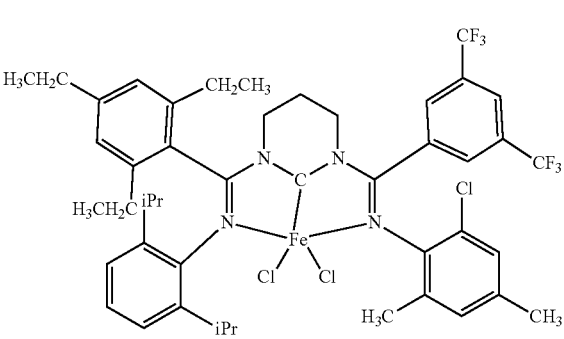

9
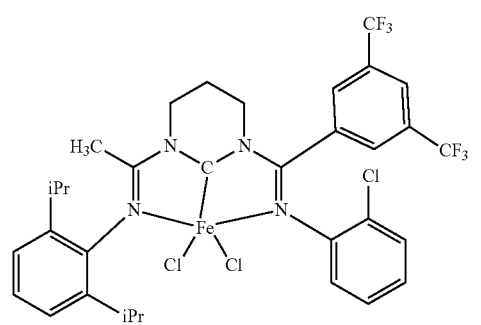
10
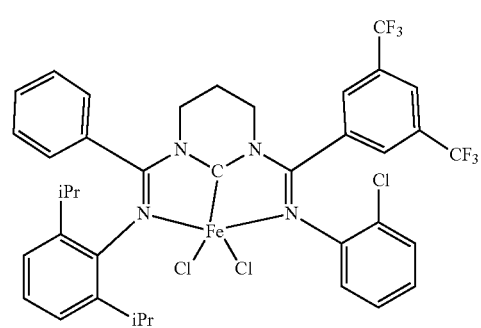
11
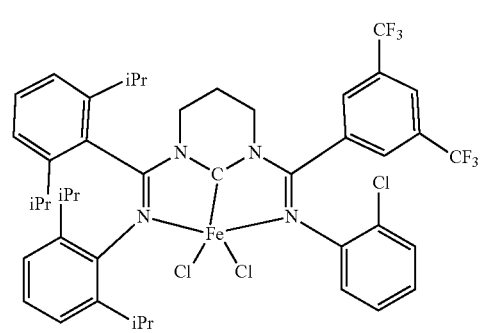
12
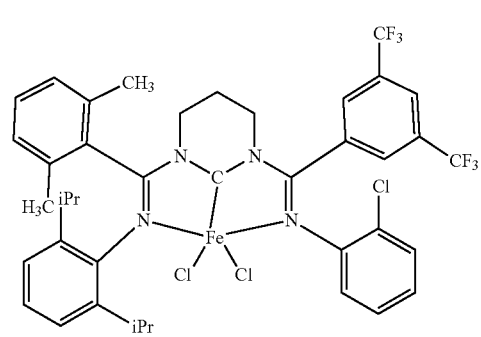
13
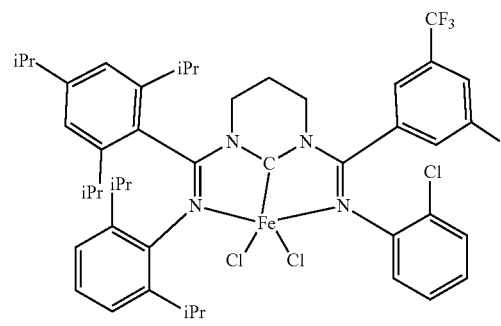
14
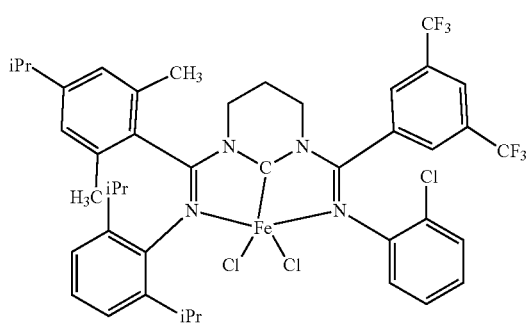
15
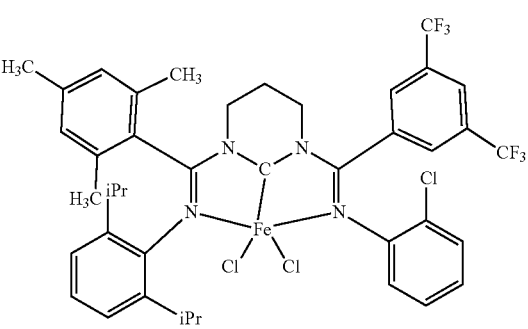
16
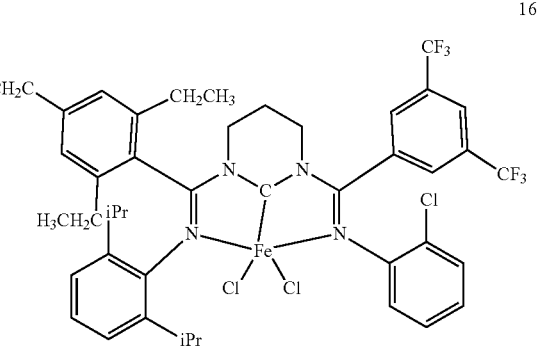
17
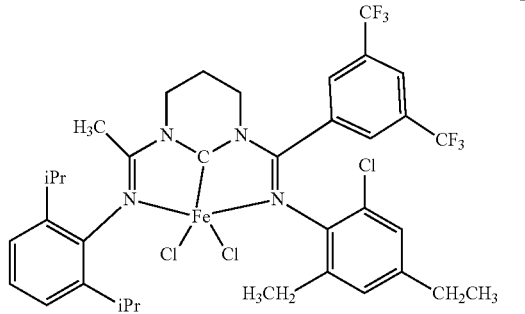

18
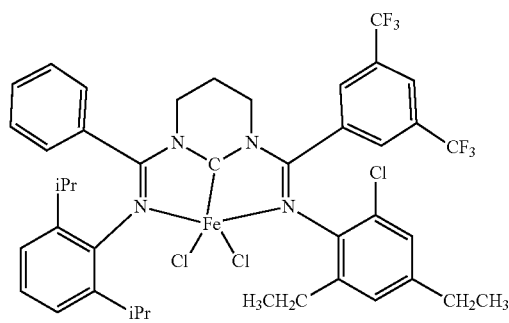
19
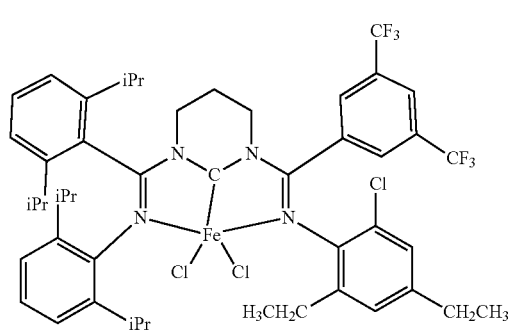
20
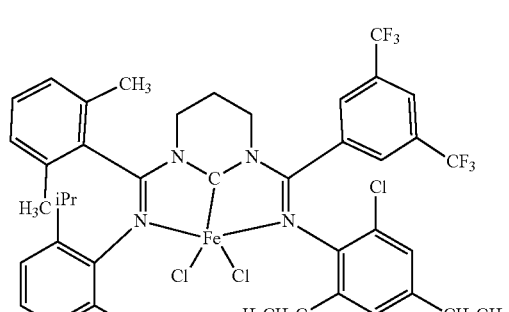
21
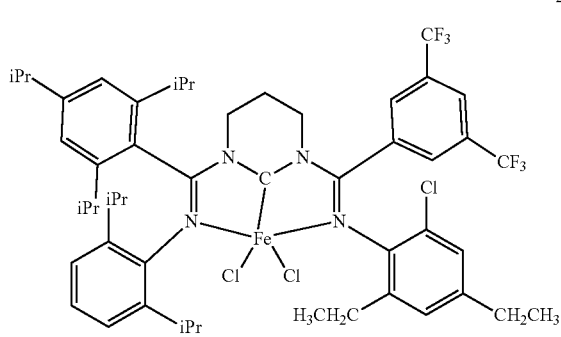
22
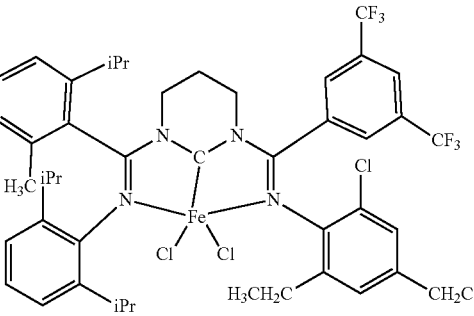
23
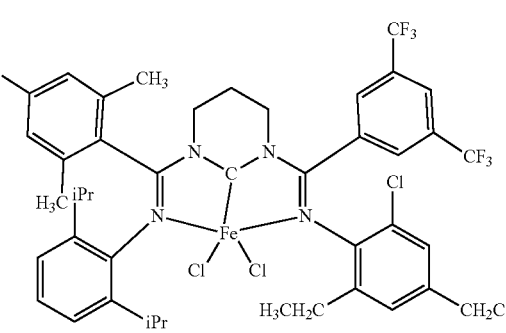
24
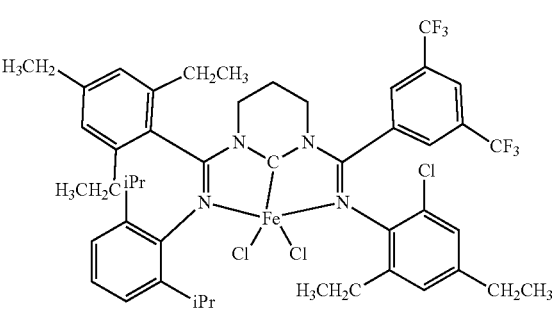
25
25
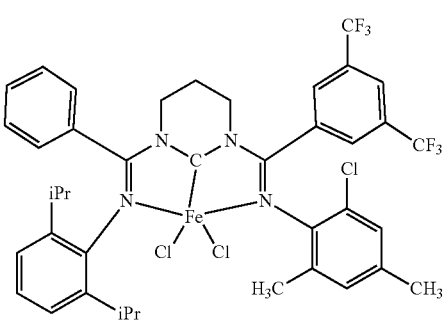
26

27
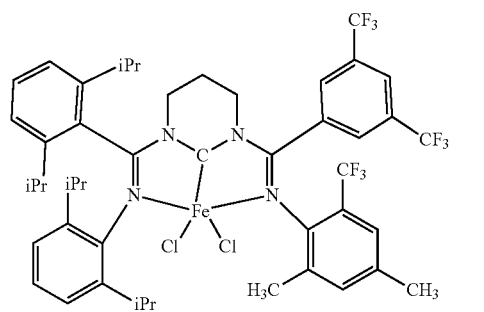
28
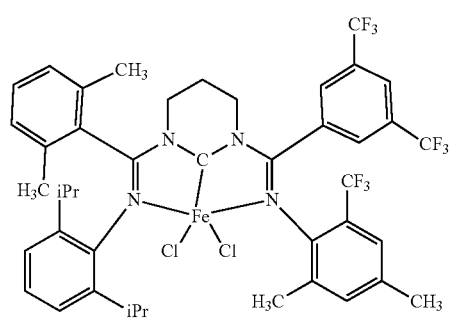
29
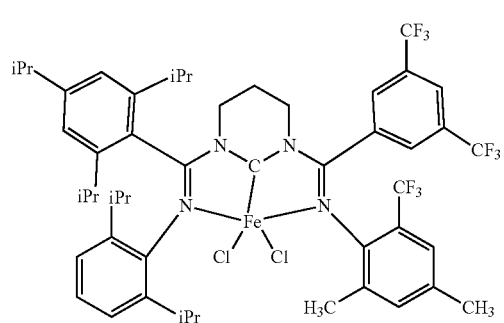
30
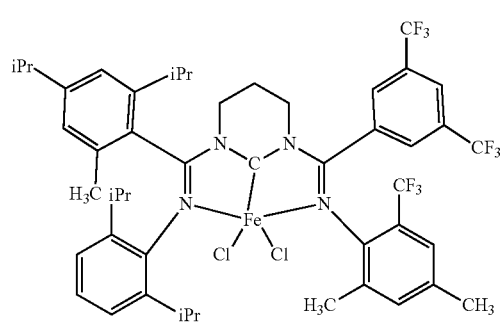
31
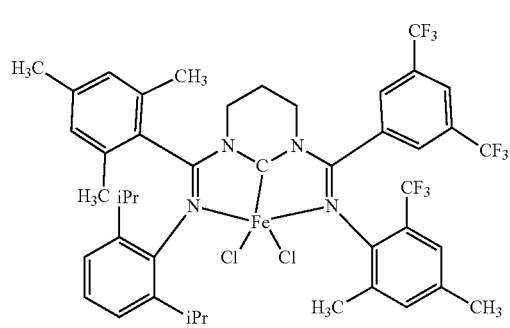
32
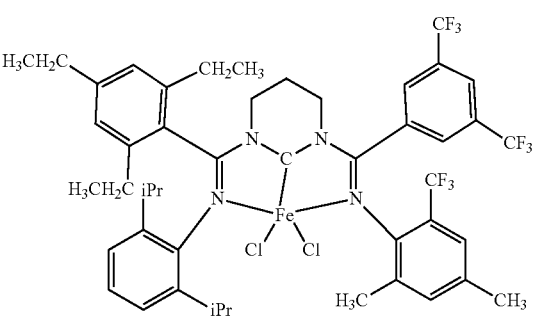
33
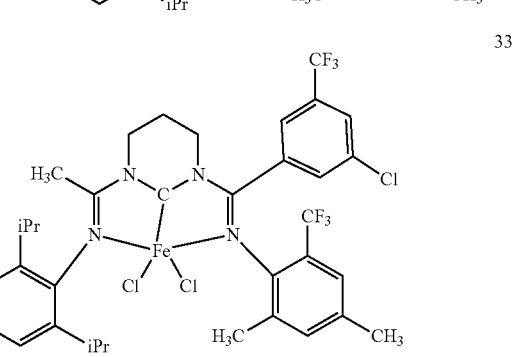
34
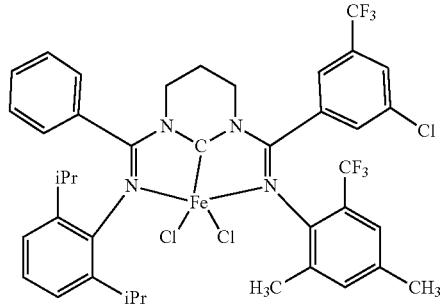
35
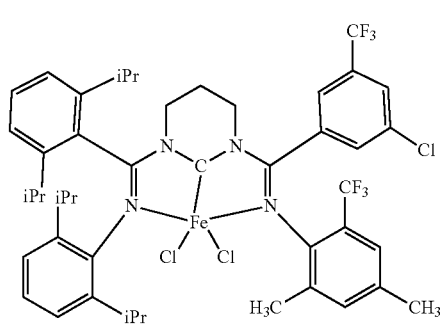
36
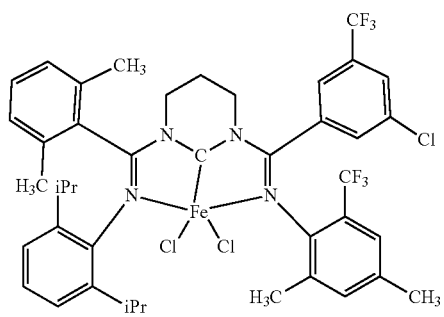

37
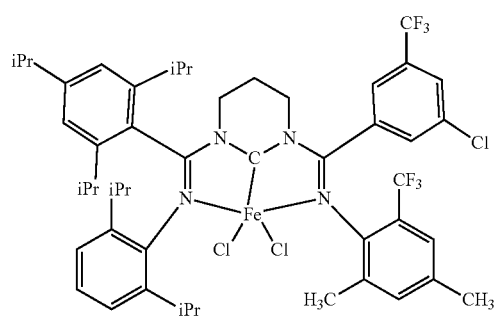
38
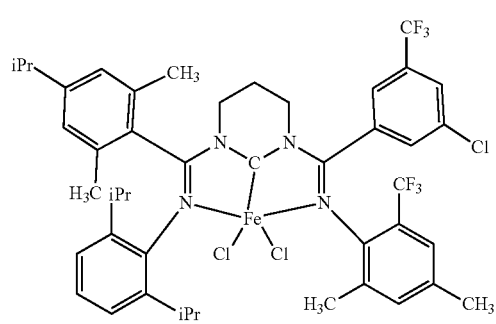
39
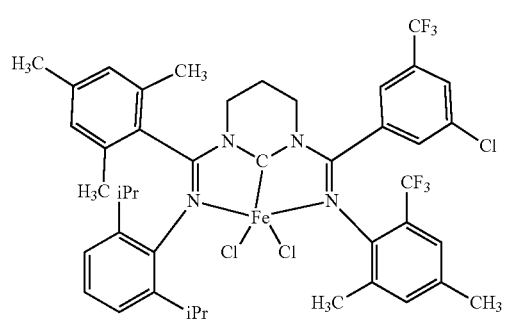
40
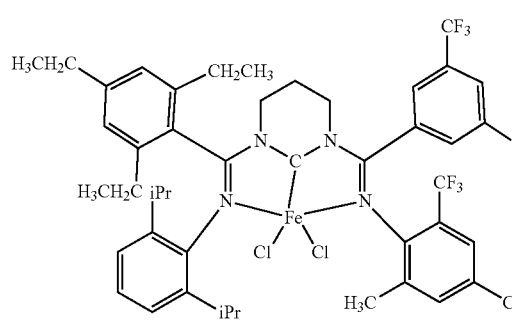
41
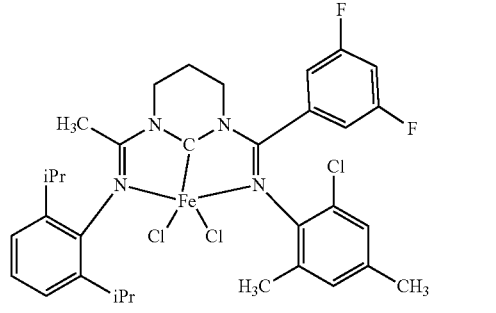
42
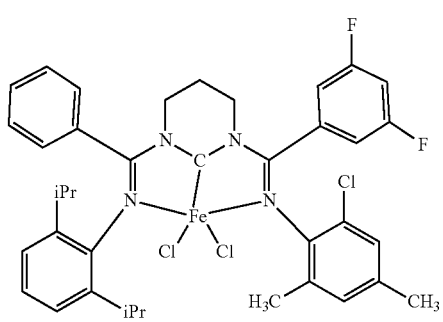
43
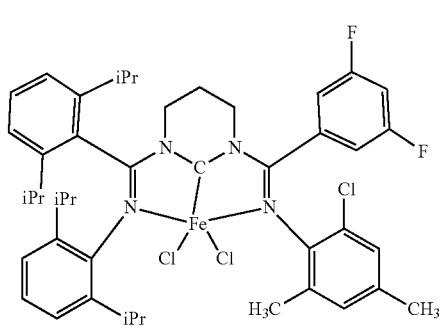
44
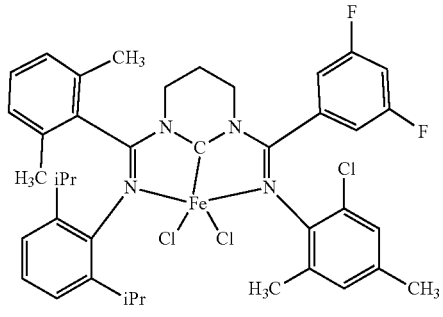
45
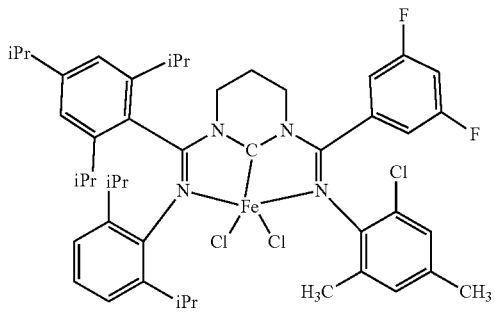
46
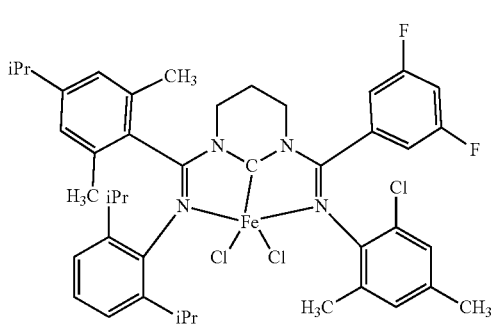

47
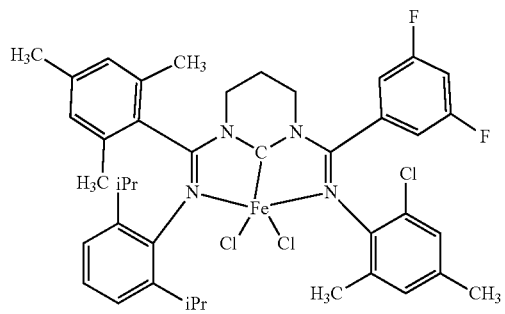
48
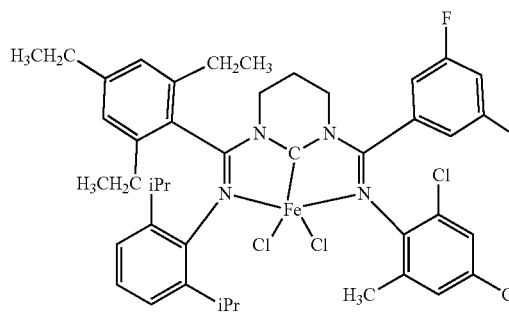
49
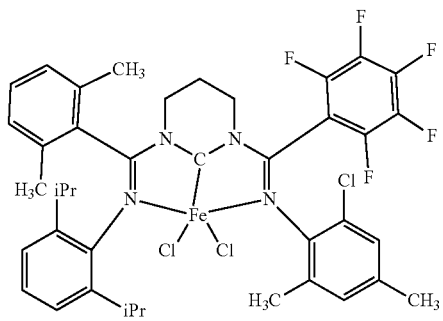
50
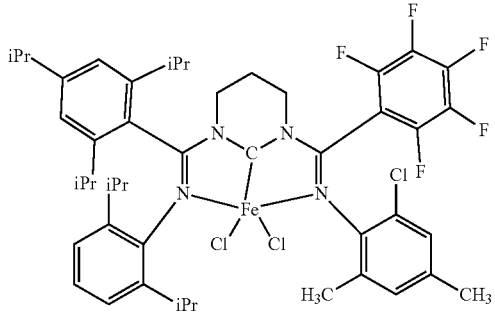
51
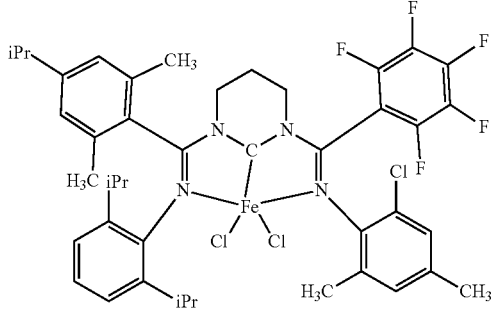
52
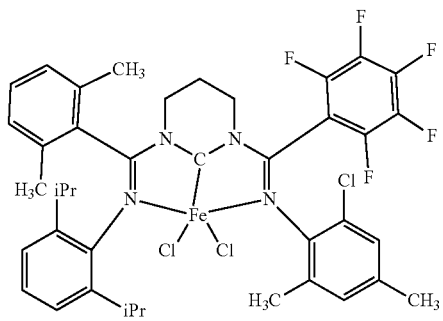
53
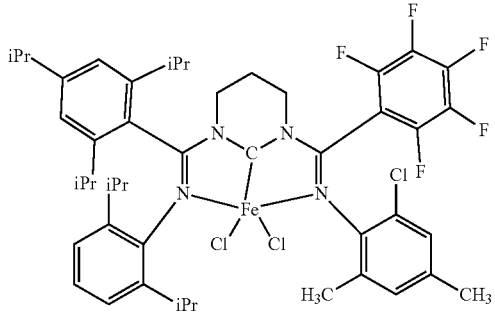
54
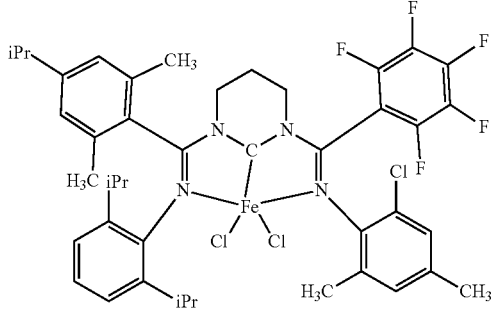
55
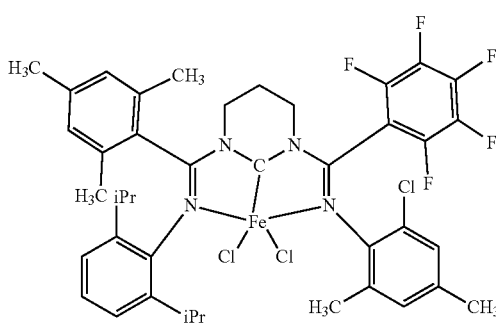
56
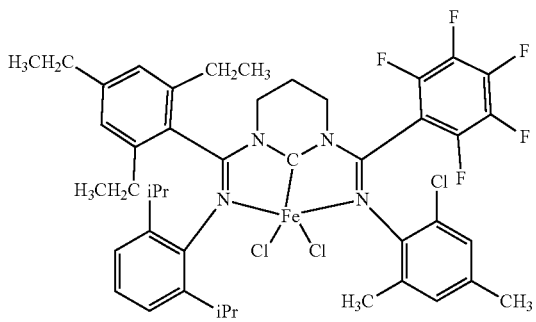

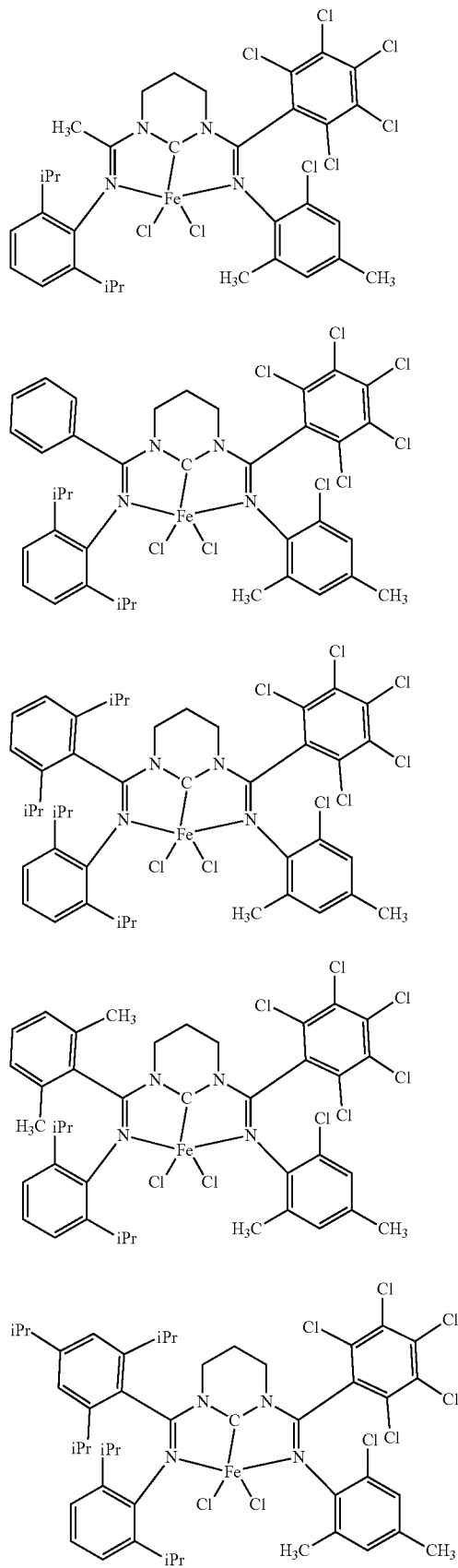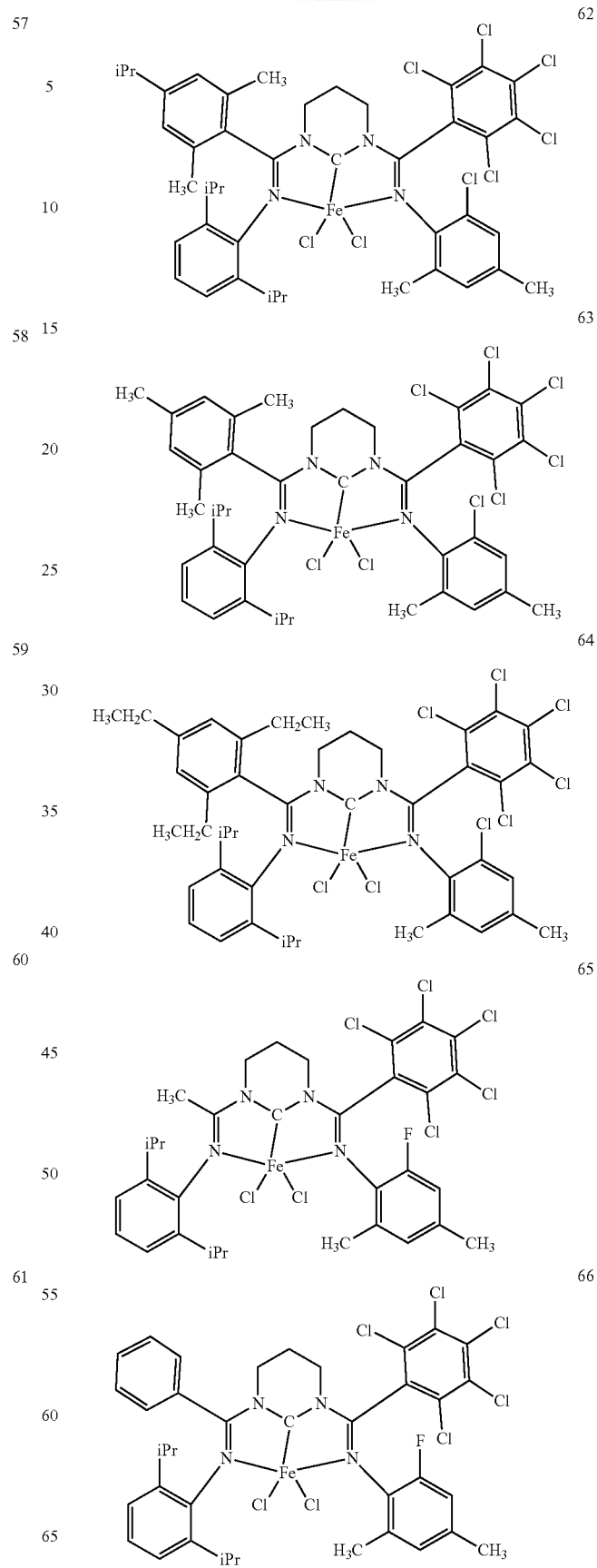

-continued
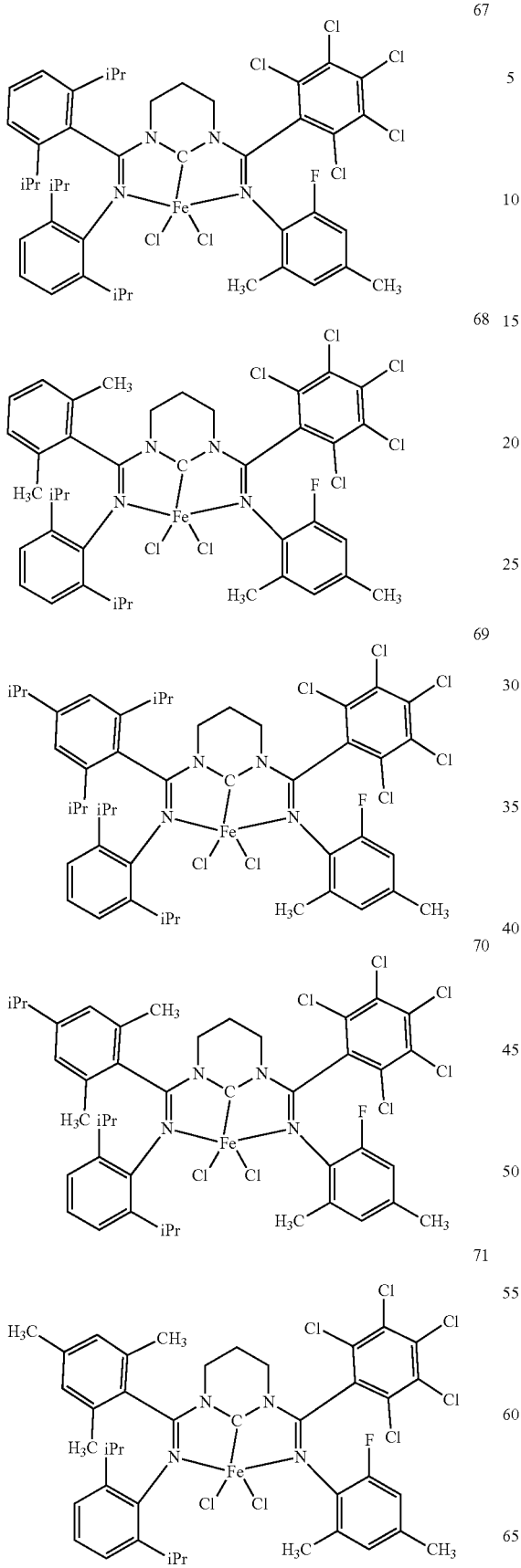
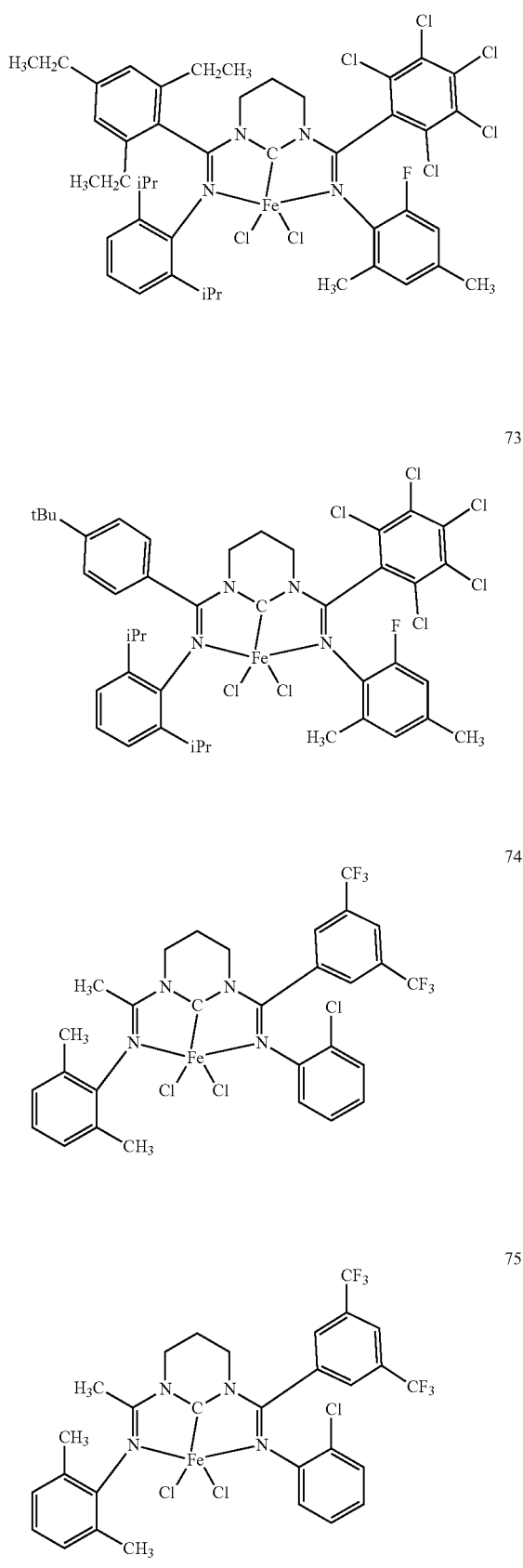

76
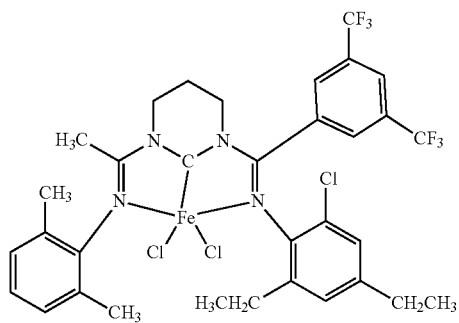
81
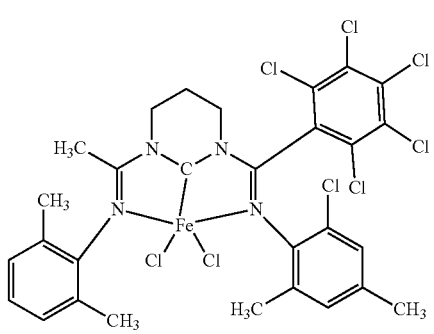
77
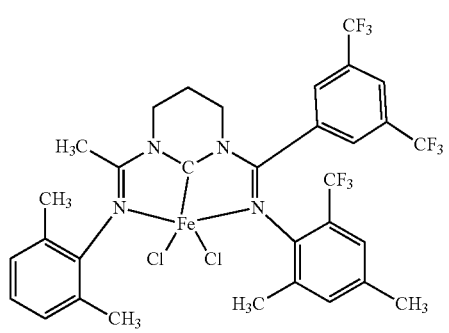
82
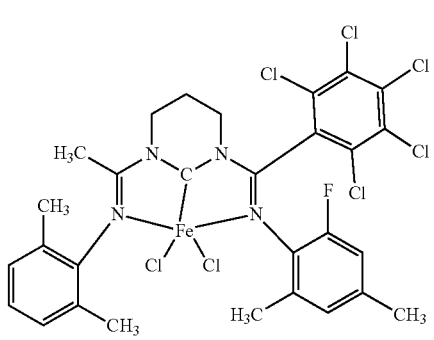
78
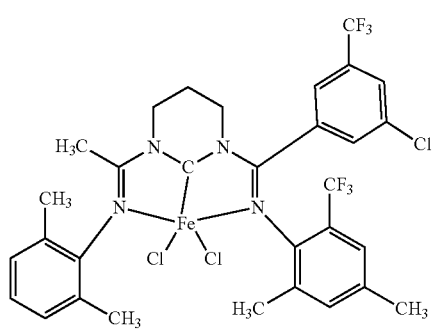
83
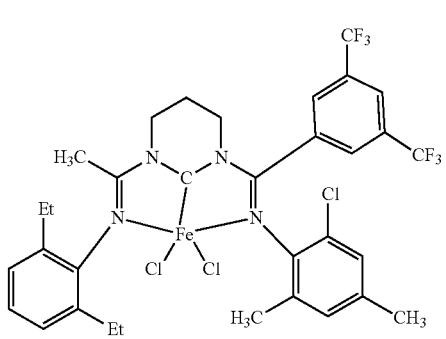
79
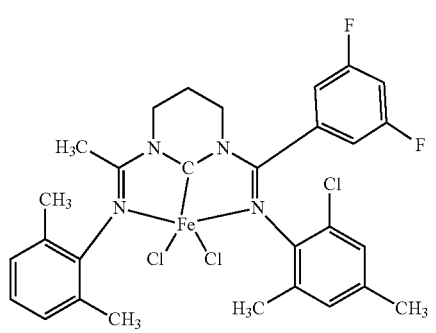
84
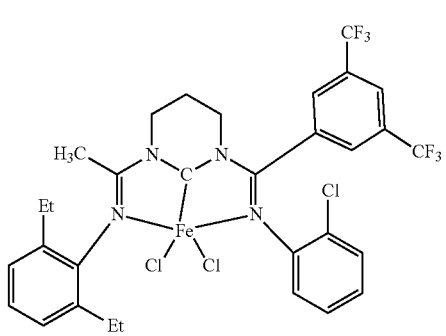
80
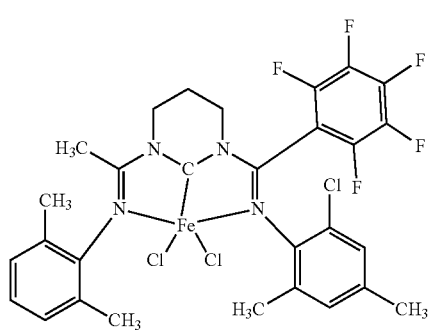
85
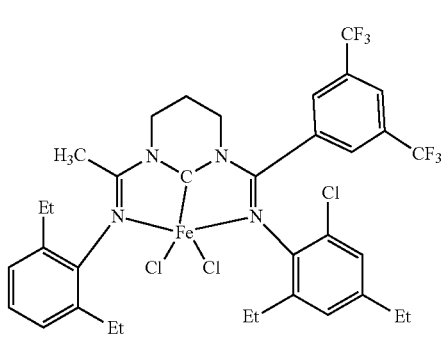

86
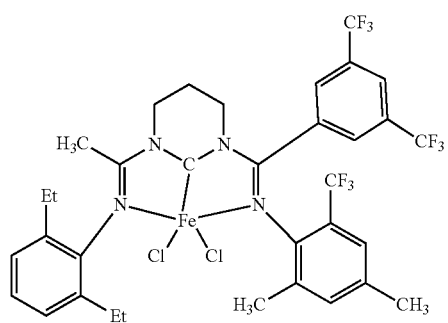
87
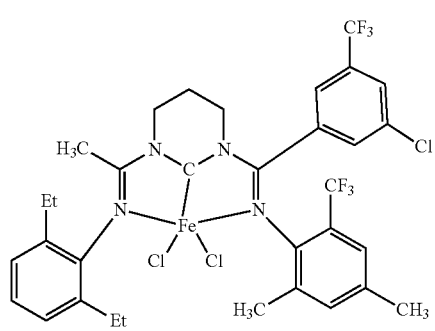
88
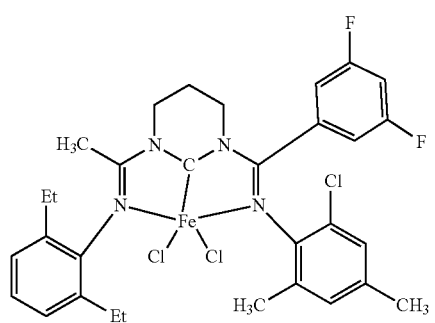
89
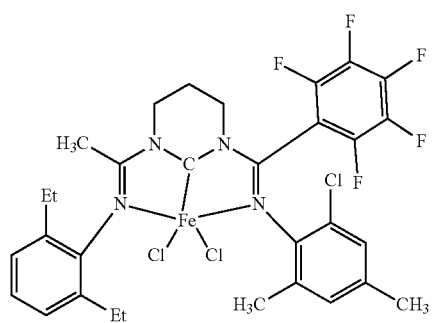
90
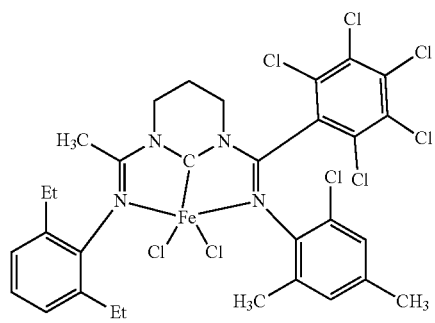
91
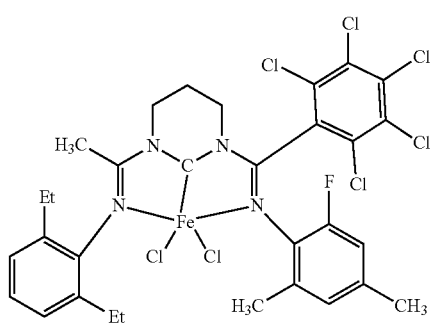
92
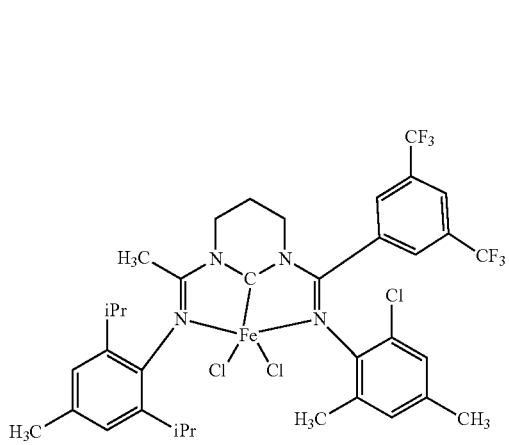
93
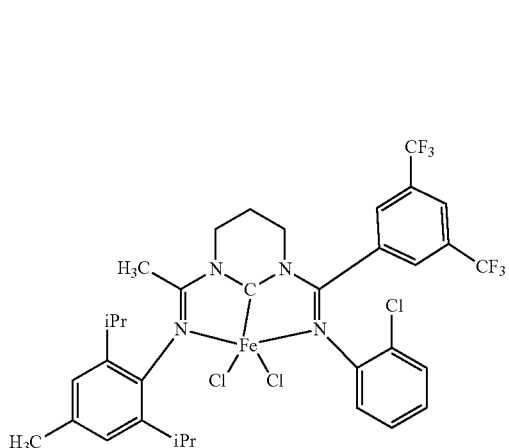
94
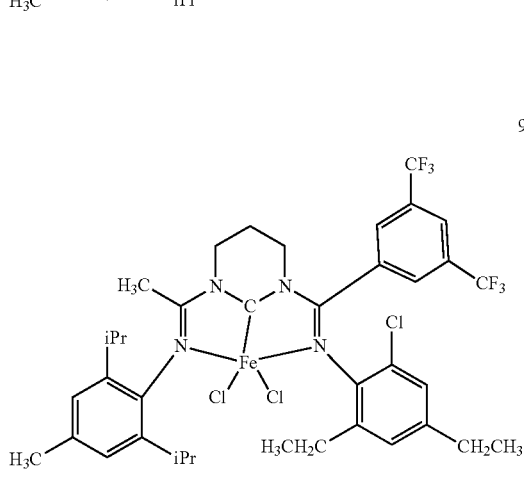

95
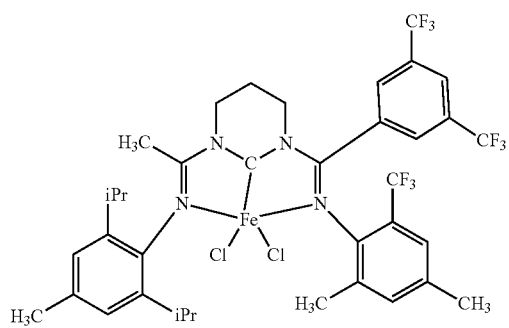
96
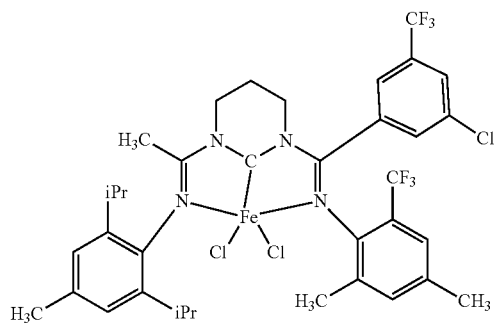
97
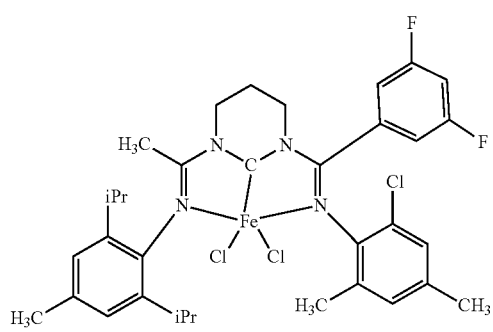
98
99
100
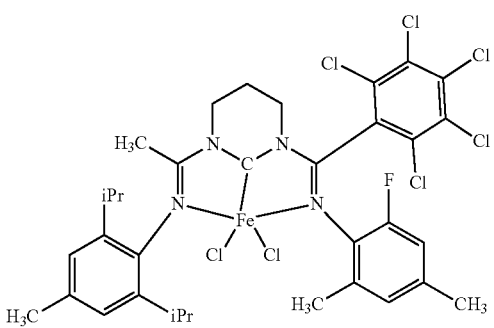
101
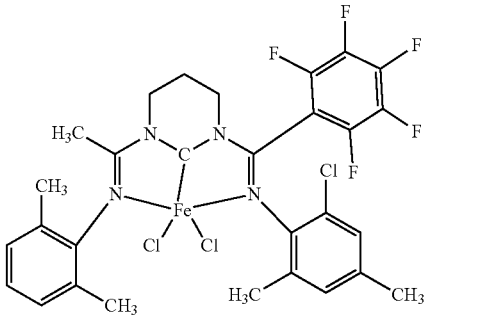
102
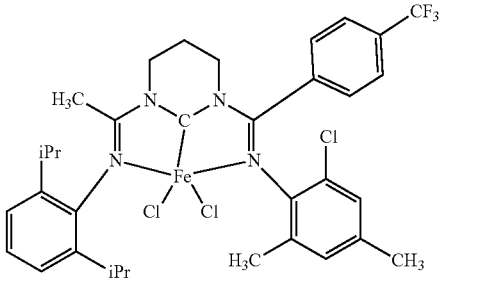
103
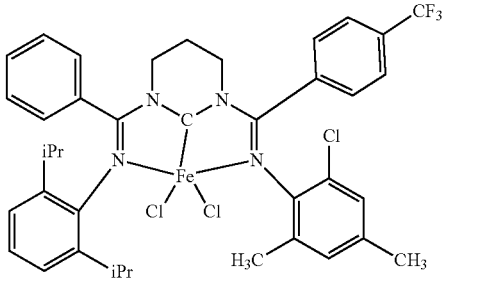
104
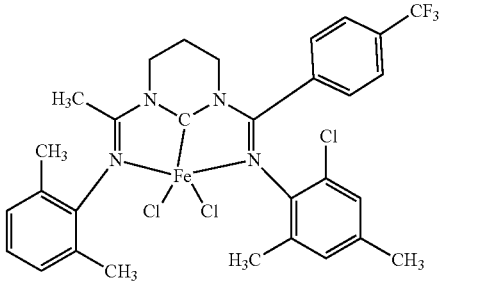

-continued
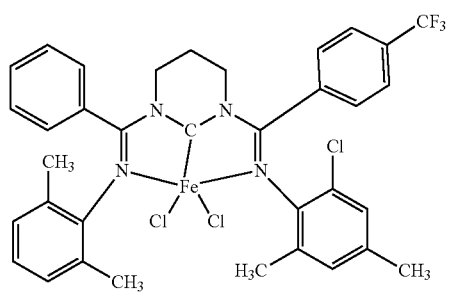
105
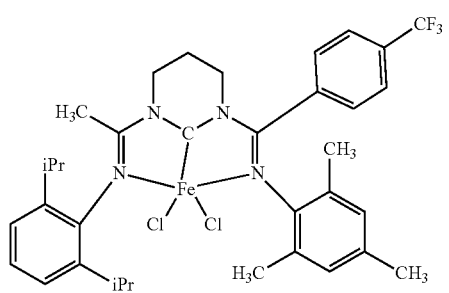
106
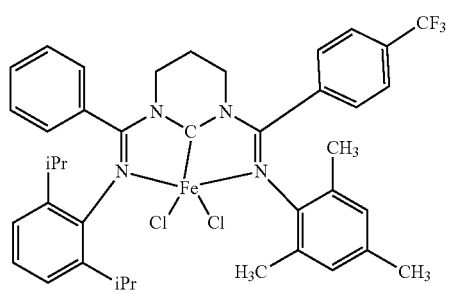
107
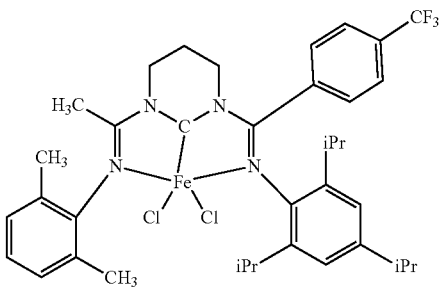
108
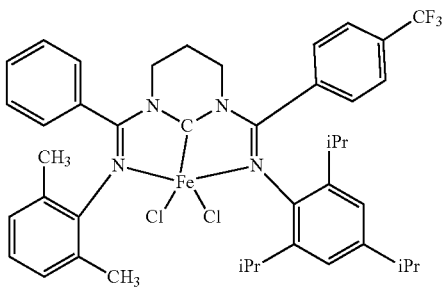
109
-continued
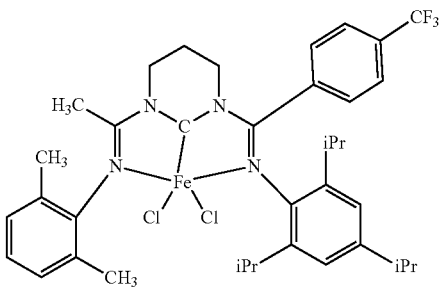
110
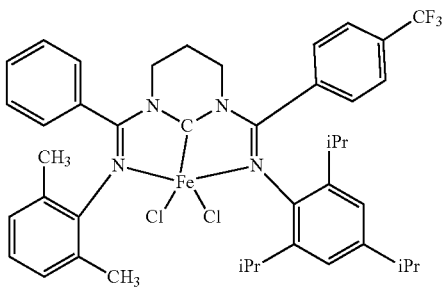
111
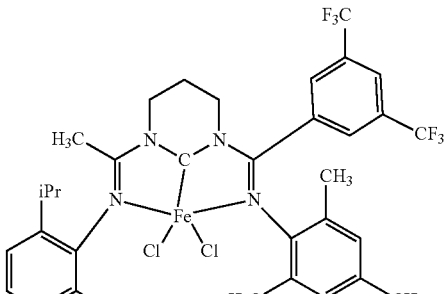
112
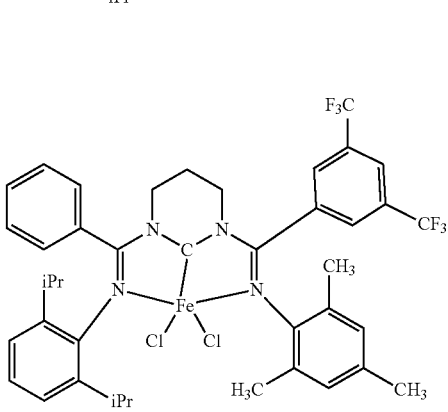
113
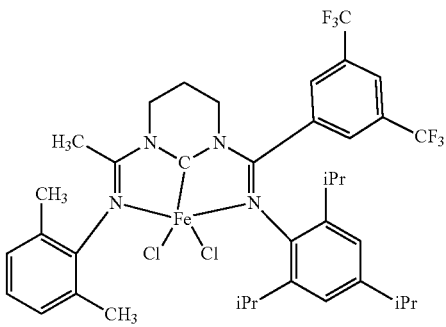
114

115
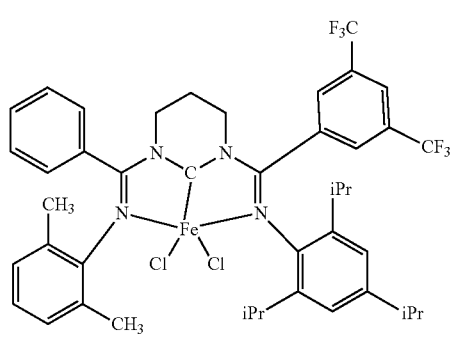
116
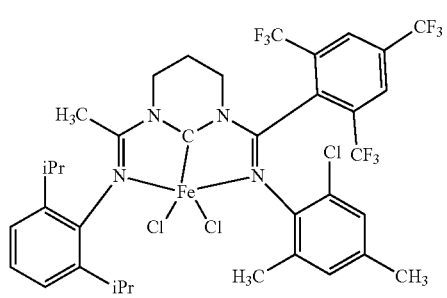
117
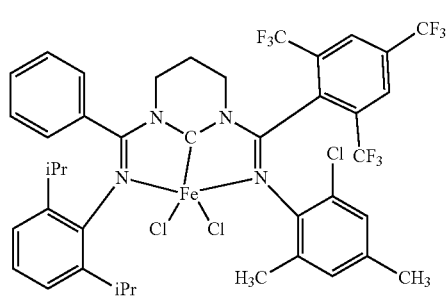
118
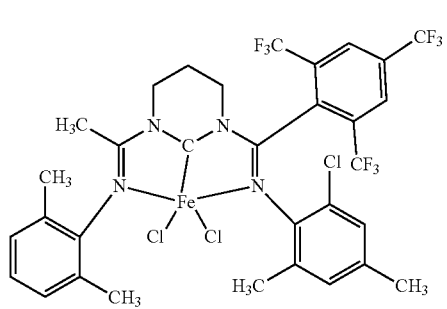
119
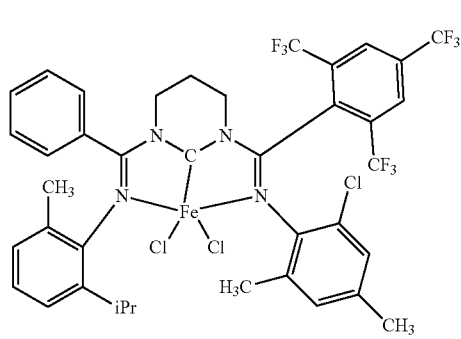
120
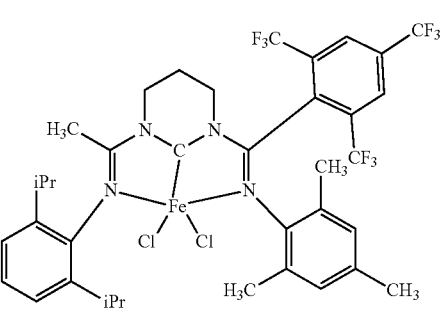
121
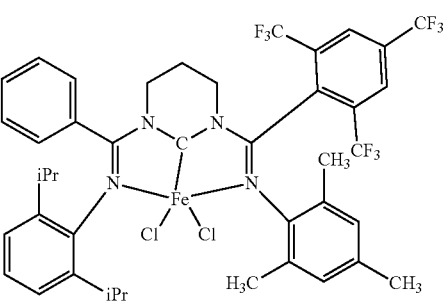
122
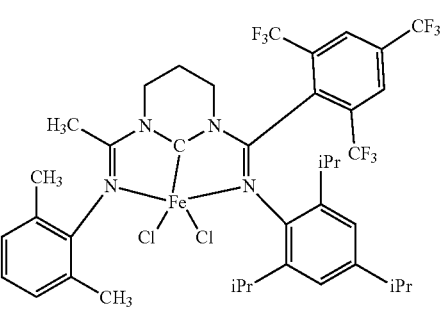
123
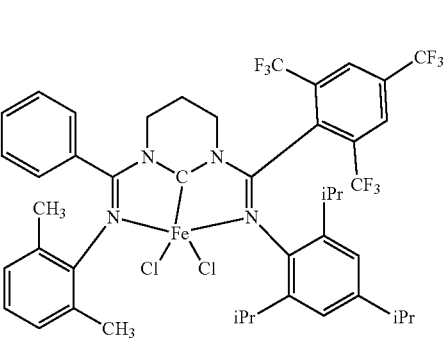
124
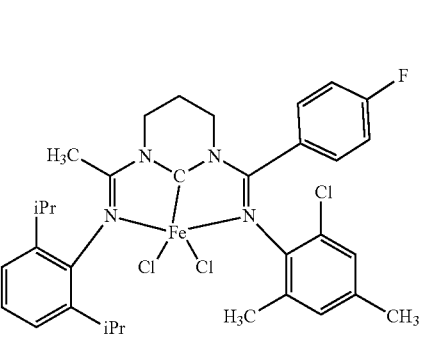

125 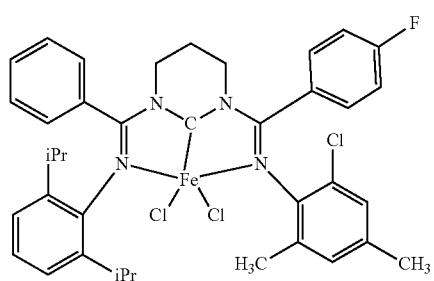
126 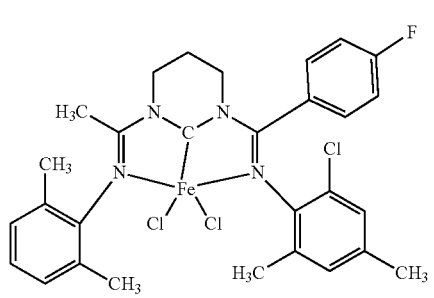
127 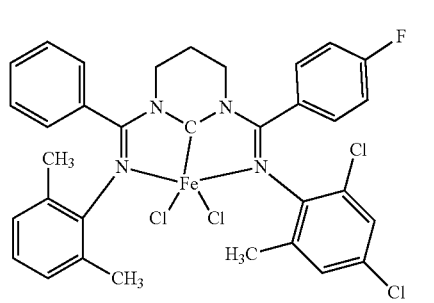
128 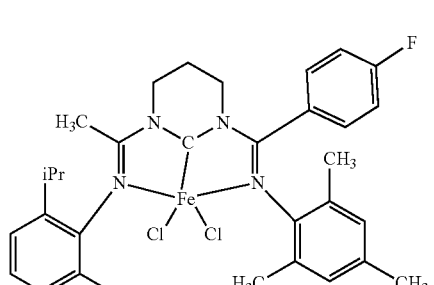
129 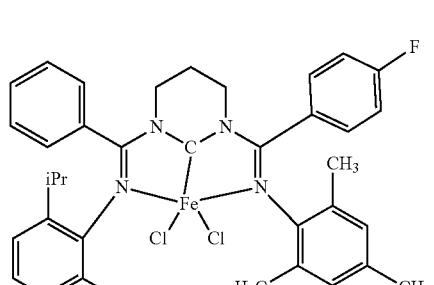
130 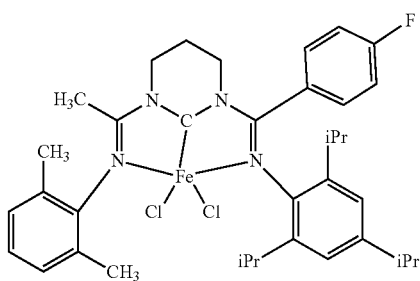
131 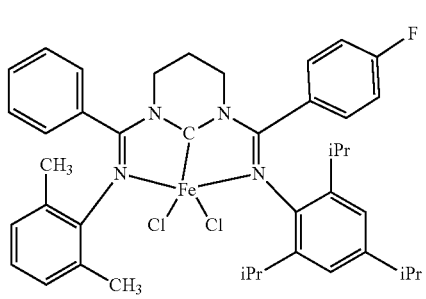
132 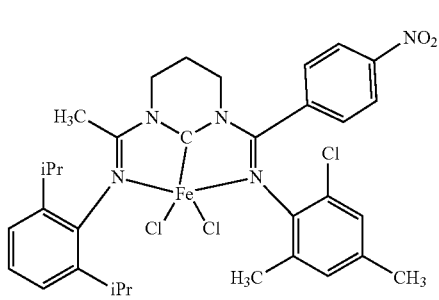
133 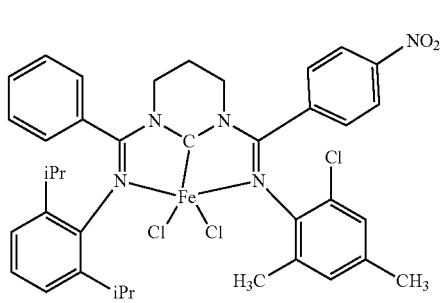
134 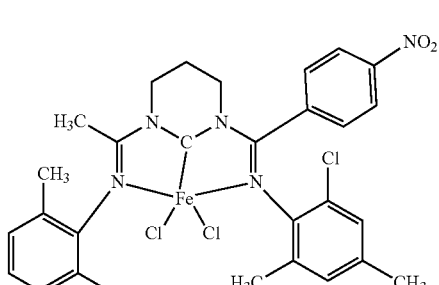

-continued

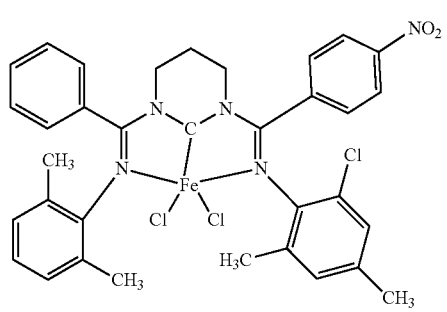

135

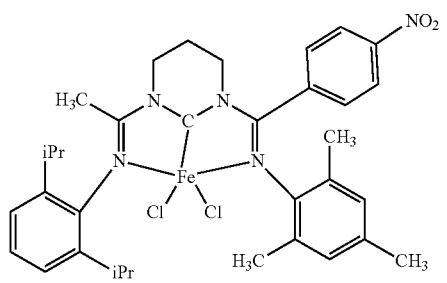

136

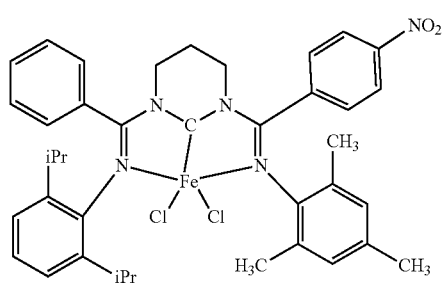

137

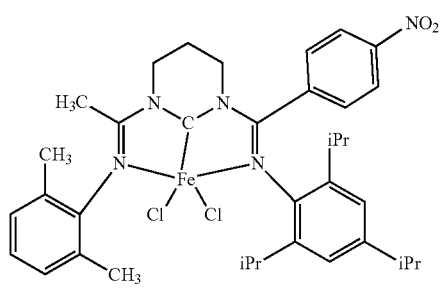

138

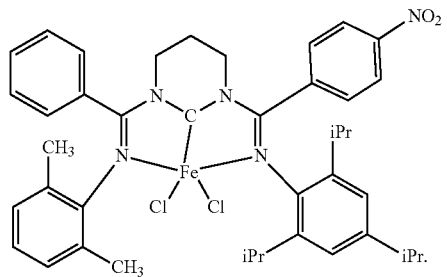

139

16. The catalyst compound of claim 15, wherein the catalyst compound is one or more of:

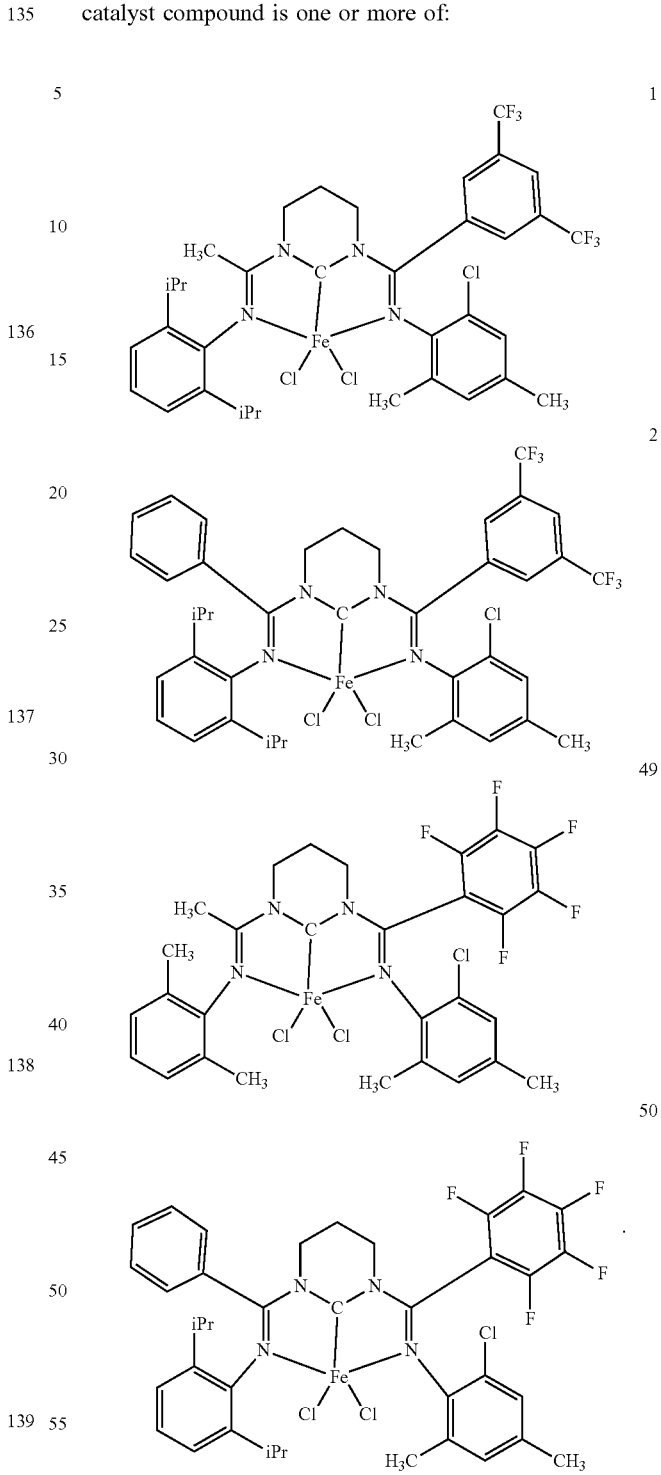

17. A catalyst system comprising an activator and the catalyst compound of claim 1.

18. The catalyst system of claim 17, further comprising a support material.

19. The catalyst system of claim 18, wherein the support material is selected from $Al_2O_3$, $ZrO_2$, $SiO_2$, $SiO_2/Al_2O_3$, $SiO_2/TiO_2$, silica clay, silicon oxide/clay, or mixtures thereof.

20. The catalyst system of claim 17, wherein the activator comprises an alkylalumoxane.

21. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with the catalyst system of claim 18 in at least one gas phase reactor at a reactor pressure of from 0.7 to 70 bar and a reactor temperature of from 20° C. to 150° C. to form an ethylene alpha-olefin copolymer.

22. The process of claim 21, wherein the catalyst has a productivity from 500 $gPgcat^{-1}hr^{-1}$ to 13,000 $gPgcat^{-1}hr^{-1}$.

23. The process of claim 21, wherein the catalyst has an activity from 50,000 gP/mmolCat/hour to 300,000 gP/mmolCat/hour.

24. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of claim 18 in at least one slurry phase reactor at a reactor pressure of from 0.7 to 70 bar and a reactor temperature of from 20° C. to 150° C. to form an ethylene alpha-olefin copolymer.

25. The process of claim 24, wherein the catalyst has a productivity from 500 $gPgcat^{-1}hr^{-1}$ to 13,000 $gPgcat^{-1}hr^{-1}$.

26. The process of claim 24, wherein the catalyst has an activity from 150,000 gP/mmolCat/hour to 300,000 gP/mmolCat/hour.

27. A catalyst system comprising an activator and the catalyst compound of claim 16.

28. A catalyst system comprising an activator and the catalyst compound of claim 15.

29. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with the catalyst system of claim 27 in at least one gas phase reactor at a reactor pressure of from 0.7 to 70 bar and a reactor temperature of from 20° C. to 150° C. to form an ethylene alpha-olefin copolymer.

30. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with the catalyst system of claim 28 in at least one gas phase reactor at a reactor pressure of from 0.7 to 70 bar and a reactor temperature of from 20° C. to 150° C. to form an ethylene alpha-olefin copolymer.

31. The catalyst system of claim 27, wherein the activator comprises an alkylalumoxane.

32. The catalyst system of claim 28, wherein the activator comprises an alkylalumoxane.

* * * * *